(12) United States Patent
Shannahan et al.

(10) Patent No.: US 10,527,218 B2
(45) Date of Patent: Jan. 7, 2020

(54) MECHANICAL SHOCK RESISTANT MOTORIZED DRIVE ASSEMBLY

(71) Applicant: THREAT SPECTRUM INC., Menlo Park, CA (US)

(72) Inventors: Michael Scott Shannahan, Menlo Park, CA (US); Peter Sargon Ray, Livermore, CA (US)

(73) Assignee: THREAT SPECTRUM INC., Menlo Park, CA (US)

( * ) Notice: Subject to any disclaimer, the term of this patent is extended or adjusted under 35 U.S.C. 154(b) by 245 days.

(21) Appl. No.: 15/711,046

(22) Filed: Sep. 21, 2017

(65) Prior Publication Data

US 2018/0010728 A1   Jan. 11, 2018

Related U.S. Application Data

(62) Division of application No. 14/874,450, filed on Oct. 4, 2015, which is a division of application No. 14/388,483, filed as application No. PCT/US2013/038961 on Apr. 30, 2013, now Pat. No. 9,182,070.

(Continued)

(51) Int. Cl.
| | |
|---|---|
| *F16M 11/04* | (2006.01) |
| *F16M 11/10* | (2006.01) |
| *F16M 11/18* | (2006.01) |
| *F16M 11/20* | (2006.01) |
| *F16C 19/16* | (2006.01) |
| *F16H 7/14* | (2006.01) |
| *F16B 2/18* | (2006.01) |
| *G03B 37/02* | (2006.01) |

(Continued)

(52) U.S. Cl.
CPC .............. *F16M 11/041* (2013.01); *F16B 2/18* (2013.01); *F16B 2/185* (2013.01); *F16C 19/166* (2013.01); *F16H 7/14* (2013.01); *F16M 11/043* (2013.01); *F16M 11/10* (2013.01); *F16M 11/18* (2013.01); *F16M 11/2014* (2013.01); *F16C 19/181* (2013.01); *F16C 33/581* (2013.01); *F16C 2300/14* (2013.01); *F16C 2322/39* (2013.01); *G03B 37/02* (2013.01); *Y10S 901/39* (2013.01)

(58) Field of Classification Search
CPC ........... F16H 2007/0806; F16H 7/0848; F16H 2007/0804; F16H 2007/0872; F16H 2007/0851
USPC .......................................................... 474/114
See application file for complete search history.

(56) References Cited

U.S. PATENT DOCUMENTS 2,210,276 A * 8/1940 Bremer ................. F16H 7/0848
474/110
2,762,663 A * 9/1956 Sloyan .................... F16C 29/04
384/49

(Continued)

*Primary Examiner* — Henry Y Liu
(74) *Attorney, Agent, or Firm* — Staniford Tomitall; Paul K. Tomita

(57) ABSTRACT

An electronic device can include a motor that rotates a shaft that is coupled to a gear. A belt or a chain can be placed in contract with the gear and other rotational devices. For optimum performance, the chain or chain should be adjusted to an optimum tension. The tension can be adjusted by moving the motor and securing the motor in a position the provided the optimum tension. Alternatively, the motor can be in a fixed rigid position and an idler pulley in contact with the belt or chain can be positioned to provide the optimum tension.

12 Claims, 47 Drawing Sheets

Related U.S. Application Data

(60) Provisional application No. 61/801,834, filed on Mar. 15, 2013, provisional application No. 61/800,537, filed on Mar. 15, 2013, provisional application No. 61/640,141, filed on Apr. 30, 2012.

(51) Int. Cl.
*F16C 19/18* (2006.01)
*F16C 33/58* (2006.01)

(56) References Cited

U.S. PATENT DOCUMENTS

| | | | | |
|---|---|---|---|---|
| 3,421,724 | A * | 1/1969 | Cornell | F16M 7/00 248/657 |
| 3,426,606 | A * | 2/1969 | Hopkins | F16H 7/0848 474/111 |
| 4,145,934 | A * | 3/1979 | Sragal | F16H 7/129 474/135 |
| 4,395,250 | A * | 7/1983 | King | F16H 7/0848 474/111 |
| 4,402,677 | A * | 9/1983 | Radocaj | B65G 23/44 474/138 |
| 4,505,691 | A * | 3/1985 | Kohler | F16H 7/0848 474/101 |
| 4,883,445 | A * | 11/1989 | Gomoll | B41J 19/005 474/113 |
| 5,328,415 | A * | 7/1994 | Furutani | F16H 7/1218 474/112 |
| 5,938,552 | A * | 8/1999 | Serkh | F16H 7/1218 474/117 |
| 2005/0032595 | A1* | 2/2005 | Garbagnati | F16H 7/0848 474/101 |
| 2007/0066427 | A1* | 3/2007 | Simpson | F16H 7/08 474/111 |
| 2008/0268994 | A1* | 10/2008 | Bushnell | B62K 19/34 474/112 |
| 2011/0143873 | A1* | 6/2011 | deJong | F16H 7/129 474/117 |
| 2014/0106915 | A1* | 4/2014 | Kistler | B27B 17/14 474/111 |

\* cited by examiner

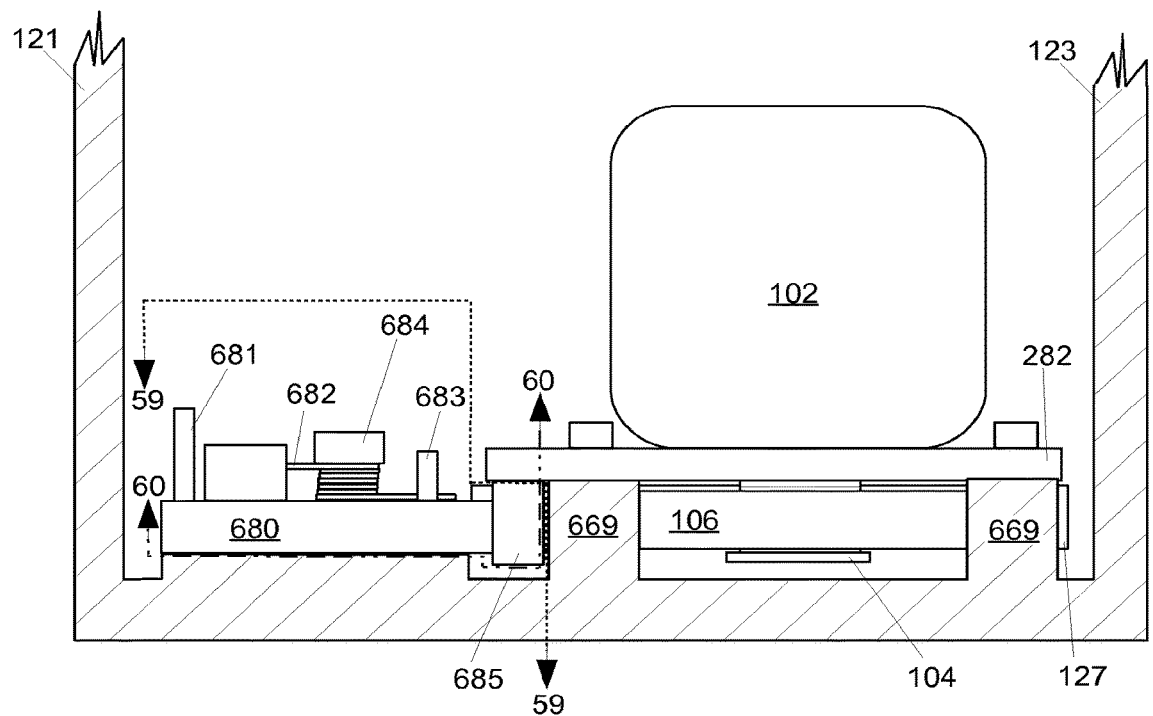
FIG. 48
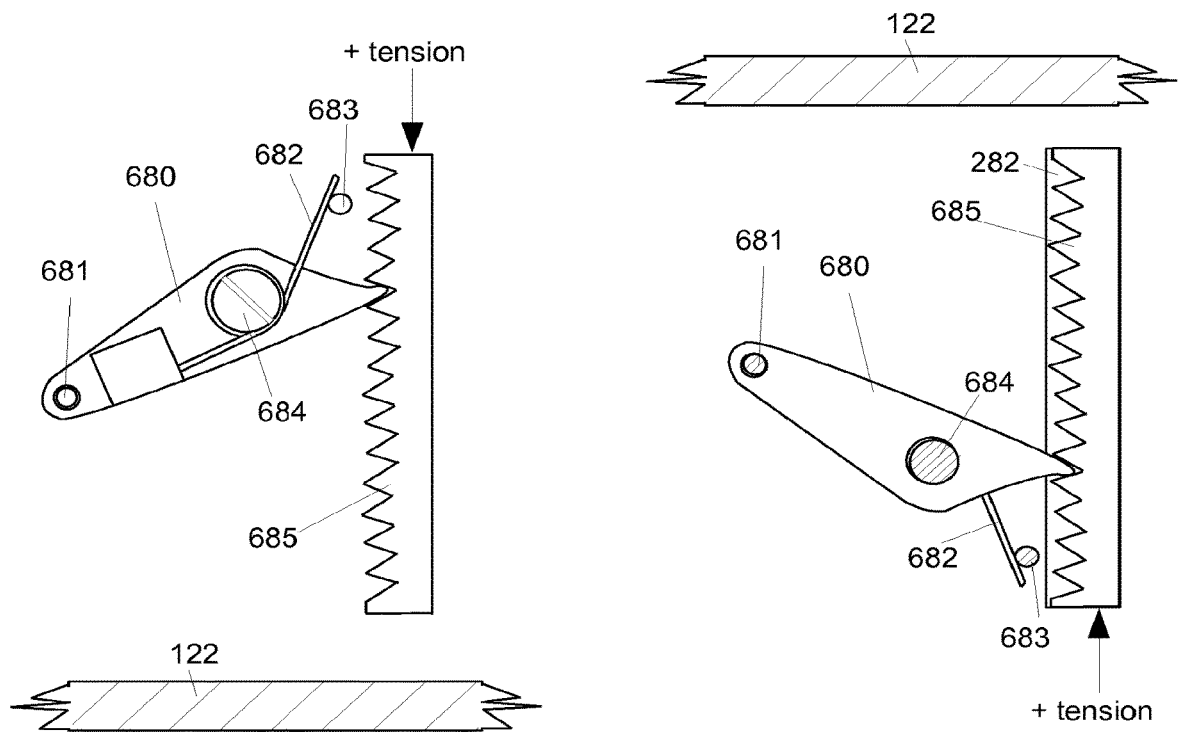
FIG. 49
FIG. 50

MECHANICAL SHOCK RESISTANT MOTORIZED DRIVE ASSEMBLY

CROSS REFERENCE TO RELATED APPLICATIONS

This application is a divisional of U.S. patent application Ser. No. 14/874,450, "CLAMP MOUNT FOR ELECTRONIC DEVICES" filed Oct. 4, 2015, which is a divisional of U.S. patent application Ser. No. 14/388,483, now U.S. Pat. No. 9,182,070 "POSITIONING DEVICE" filed Sep. 26, 2014, which is the U.S. National Phase of International Patent Application No. PCT/US2013/38961, "POSITIONING DEVICE" filed Apr. 30, 2013, which claims priority to U.S. Provisional Patent Application No. 61/640,141, "POSITIONING DEVICE," filed on Apr. 30, 2012; U.S. Provisional Patent Application No. 61/800,537, "Positioning Device," filed Mar. 15, 2013; and U.S. Provisional Patent Application No. 61/801,834, "POSITIONING DEVICE WITH QUICK ATTACH DETACH MOUNTING, WITH SHAFT MISALIGNMENT COMPENSATION AND BELT TENSIONING LOCK MECHANISM," filed Mar. 15, 2013, which are hereby incorporated by reference in their entirety.

FIELD OF THE INVENTION

The present invention relates generally to robotic positioning devices and more particularly to a device for rotatably positioning one or more payload devices about one or more rotational axes.

BACKGROUND

Robots are machines that can perform tasks automatically or with guidance, typically by remote control. A robot is usually an electro-mechanical machine that is guided by computer and electronic programming. Robots can be autonomous, semi-autonomous or remotely controlled. When a human cannot be present on site to perform a job because it is dangerous, far away, or inaccessible, teleoperated robots, or 'telerobots' can be used. Rather than follow a predetermined sequence of movements, a telerobot is controlled from a distance by a human operator. The robot may be in another room or another country. The evolution of the robots will progressively increase autonomous control, such as motion-activated tracking and only streaming video pertinent to a security force. These autonomous artificial intelligence controls can be generated from remote computers, externally attached computers, and from the electronics enclosed within the robot.

In order to perform specific tasks in hazardous environments, robots can have device appendages, also known as 'payloads', which perform required tasks. Payloads can be cameras, distance sensors, firearms, mechanical arms, sensors, etc. In many cases, the payloads must be precisely positioned or aimed to perform their tasks. Mechanical assemblies integral to the robot are used to move the payloads. The mechanical drive mechanisms used by robots have been geared systems such as spur, harmonic, and worm gears; however, many of these systems are very complex, requiring many components to perform precise positioning and are very heavy due to the large number of components. Such heft is burdensome in the growing market for mobile positioning platforms, where low size and weight are desired, while complex and fragile geared drives have high incidences of snapped gear teeth and dislodged roller chains under the high vibration and shock experience by mobile deployed equipment. High vibration will also excessively wear the gear teeth, increasing backlash cumulatively until the accuracy is degraded beyond what the user can tolerate. Adding motors, elastic bands, or other preloading mechanisms to counteract backlash increases parts, complexity, size, weight and cost.

What is needed is an improved positioning system that can provide the required accuracy and reliability, including performance characteristics for operation in environments with high exposure to mechanical shock and vibration; reduced wear in gear teeth and other driveline components; reduced backlash for improved position accuracy; integration of components to reduce cost, size and complexity; and simplified assembly and disassembly for manufacturing and maintenance. The simplified design can have a housing with reduced seams, which is stronger and has fewer seals for environmental and electromagnetic threats to ingress and damage sensitive electronics.

SUMMARY OF THE INVENTION

The present invention is directed towards a high precision robotic positioning platform enabling precise aiming and movement of payloads under control of one or more users. The positioning device can include a base to which it is mounted. Bases can be an immobile tripod, tall pole, edifice, or fixture in a factory assembly line, or bases can be mobile manned or unmanned vehicles, satellites, animals, or humans. A shaft is rigidly mounted to the base, and can be a semi-permanent mount or can include a toggle clamping assembly for repeated and rapid installation and removal of the positioning device from the base. A housing can rotate about the fixed shaft via enclosed drive components. The drive components can include a motor or actuator ("motor"); bearings; pulleys or gears ("gear"); and a belt, cable, roller chain, or similar linkage to transfer torque between gears. The motor can be rigidly mounted to the housing and can rotate a pulley or pinion gear ("motor gear") directly from the coupled motor rotor or indirectly via an intermediary gearbox. This motor gear is coupled to another gear rigidly mounted to the fixed shaft ("shaft gear"), and the inter-gear coupling can be a direct meshing of the two gears' teeth or an indirect coupling via a chain, cable, or belt.

In a belt drive, the belt can be any one of a variety of belt tooth profiles such as trapezoidal, curvilinear, or modified curvilinear tooth profile, and both the motor gear and shaft gear can have a mating groove profile for proper mesh with the chosen belt. The teeth of the belt and grooves of the gear can be matching profiles or slightly different, corresponding mating profiles. The modified curvilinear belt profile can have curved sides and valleys but has flat peaks that do not fill the curved valleys of the mating pulley profile like traditional curvilinear profiles. While the belt can have cut-off peaks, the pulley tooth pattern can be fully curved and the connection between the belt and the teeth can be a "mating" design rather than an exact "matching" design found in trapezoidal and standard curvilinear profiles.

The housing of the positioning device can rotate smoothly about the fixed shaft via a bearing rigidly coupled between the shaft and housing. The bearing can have an inner ring, an outer ring and rolling or gliding bearings that are held between the inner ring and the outer ring. The housing can be rigidly coupled to either ring of the bearing. In order to provide rigidity against static and dynamic loads in axial, radial, moment, and combined directions, the bearing can have a four-point contact with the inner ring and outer ring and be under a preload to minimize undesired play in the bearing elements. A crossed roller, duplex angular, or other bearing arrangement with comprehensive load handling can be selected to optimize the positioning device's strength, weight, size, cost, and friction for the intended application. The bearing can simultaneously serve as both a bearing and rotary shaft gear in the same package when the bearing includes gearing on the external ring. Assembly, disassembly, and repair can be eased by expanding one or both of the ring lands for flat mounting with removable fasteners instead of permanent press-fit mounts; small bearings with low loads tend to have races that step down the thickness into mounting flanges, and are called flanged bearings, while races that remain thick to form flat lands for fastening onto flat surfaces are called flat-mount bearings. Small flat-mount bearings with external gearing can be described as miniature slew rings or externally geared turntable bearings. As referenced and claimed hereafter, turntable bearings are bearings with at least one ring flanged or widened for flat-mounting with a non-permanent installation such as with removable fasteners; are capable of solely handling moderate loads in most directions and combinations; either race can include an integral or separately attached gear or belt profile; and are smaller and lighter than flat-mount and slew bearings previously used in heavy machinery.

The shaft gear can be a miniature slew ring bearing or externally geared turntable bearing and have an outer diameter of less than twelve inches and each weighing less than five pounds. The inventive design can also be scaled up to support a heavier housing and payloads, and can adopt bearing element and race configurations with performance attributes more suited to larger, heavier loads than the four-point ball bearing configuration. Larger bearing rings can adopt weight-saving construction materials such as aluminum, beryllium, and magnesium alloys while various other materials and blends can be selected, notably carbon nanotube doped materials, to optimize other performance metrics. Further weight savings can be achieved with new materials in the rolling bearing elements; for example, either balls or cylindrical rollers constructed of silicon nitride.

Payloads can be rigidly coupled to the housing and precisely rotated along with the housing about the fixed axis by control of the motor and drive components. To accommodate payloads which must not rotate with the housing, a 'pan-through shaft' configuration can be adopted. If the bearing is mounted around the shaft on one side of the housing, a second bearing or bushing can be mounted around the shaft on a second side of the housing opposite the first side. This secondary bearing can have a loose fit on the shaft to delegate axial loads to the more capable turntable bearing. The bearings and shaft components can align to each other with keyways and precisely located alignment pins, and an intermediary shaft coupler can compensate for any remaining shaft misalignment. The fixed shaft can be extended completely through the second side of the housing and payloads can be coupled to the end of the fixed shaft for a mounting stationary with the fixed base and thus free of the housing's rotary motion.

The positioning device can also include a second shaft which extends through holes in one or more sides of the positioning device housing to rotate coupled payloads about a second axis. This shaft can be an orthogonal or canted axis to the fixed shaft axis, rotating relative to the housing and free of the fixed mounting base. Commonly the mounting platform is approximately level to the earth, with the fixed shaft rising upward, the housing rotating in azimuth about the fixed shaft to pan payloads left and right. The secondary orthogonal shaft thus can rotate up/down in elevation to tilt payloads at high and low angles. Such dual-axis positioners are known as 'pan-tilts' or gimbals. The tilting shaft ("tilt shaft") and drive components can include many of the same structures, components, and methods used for the fixed azimuth shaft ("pan shaft"). Each component and assembly of the pan shaft and pan drive assembly can have a corresponding tilt component or tilt assembly performing substantially the same role accomplished by its fixed-shaft counterpart described earlier; however, translated to an orthogonal or canted angle.

The tilt shaft can be coupled to a bearing. Like the pan bearing, the tilt bearing can have an inner ring, an outer ring and four-point contact or similarly robust bearings that are held between the inner ring and the outer ring. In an embodiment, the inner ring can be rigidly coupled to the housing of the positioning device and the outer ring of the tilt bearing can be rigidly coupled to the tilt shaft. If the tilt bearing is mounted around the tilt shaft on one side of the housing, a second bearing or bushing can be mounted around the tilt shaft on a second side of the housing opposite the first side. The tilt shaft can penetrate through a second side of the housing in a similar manner to the pan-through shaft configuration to couple a second tilt payload to the end of the tilt shaft. The shaft can be split and can include an intermediary shaft coupler to compensate for shaft misalignment. The positioning device can include a tilt drive mechanism that includes a tilt motor coupled to a tilt belt that surrounds the outer ring of the tilt bearing. The outer ring can include teeth to serve dual-duty as a tilt shaft gear, such teeth engage corresponding teeth in the belt and a tilt motor gear.

To ensure the belt is consistently installed with the proper tension, and ensure the belt maintains tension throughout service in high vibration and shock environments, the motors can be mounted to sliding plates which lock down with bolts and can include a ratcheting gear track or wedge vise to incrementally position the plates and support the bolts in holding the factory-set belt tension.

The electrical power can be supplied by an internal battery that can be recharged or replaced infrequently; an external electrical power source such as grid electrical power or power over fiber-optic; a local generator such as solar, wind, hydro, etc.; or directed energy transmission such as microwave or free-space laser beamed power.

Users can be human, artificial intelligence ("AI") computers, cybernetic organisms ("cyborg"), or collective networks of any combination of distinct human, cyborg, or AI computers. Human users can operate or position payloads via human computer interface devices ("HIDs") such as analog knobs, keyboards, joysticks, gamepads, touch screens, voice recognition microphones, gesture recognition vision systems or thought-sensing brain scanners. These HIDs can transmit signals or a data protocol to interface a central electronic control system ("controller") onboard the positioning device that interprets the commands as instructions to pan, tilt, zoom, or perform other actions. Cyborgs would be anticipated to use direct data links between the controller and their computerized brain via any suitable signal transmission media, while also being able to use their bodies to interface the controller via HIDs.

AI users can be software running on a computer linked to the pan-tilt device externally, or can be integrated into the pan-tilt device, logically embedded into the controller housed inside the robotic device enclosure, or loaded onto the computer subsystem of a payload. Any number and combination of complex AI or simple software algorithms can operate on a hierarchal basis or as a collaborative collective of resources and processing nodes distributed over a computer network; the payloads and positioning device being networked nodes through which the computer network controlling nodes can use the positioning device and payloads to collect sensory data and physically interact with the environment. Requests or commands sent to the positioning device controller by an external controlling node can be wired or wireless, such as radio frequency or laser beamed signals. The positioning device controller can translate or forward external requests in the required protocol or commutation method to the motor(s). Control electronics inside payloads can also transmit data between the payloads and positioning controller and on to the remote nodes. The payloads can be digital cameras, sensors, spotlights, weaponry, etc. The signals from these payloads can be transmitted through the positioning system, to the controller which can transmit the signals to the remote units and operators.

Users can control the positioning device through networks, and can collaborate and share resources through a cloud network; for example, an onboard AI within the positioning device can be tasked with analyzing payload sensors in real-time to detect and cognitively realize events of interest. Video clips and telemetry of interest can be uploaded to a database within a secure cloud, and other users can assume control of the positioning device to investigate further and/or perform secondary data mining of the information received from it. An integrated battlespace monitoring application on another cloud resource may fuse the information from multiple positioning devices to view individual targets from multiple, overlapping angles or to secure wide areas. In another application of the invention where payloads can include mechanical arms and cameras, a team of doctors can assist patients remotely. Often patients are located within a hostile zone and a robust unmanned ground vehicular robot must endure high vibration, impacts, and harsh weather en route to the patients, then enable doctors precision motion to inspect wounds and manipulate surgical tools.

BRIEF DESCRIPTION OF THE DRAWINGS

FIG. 48 illustrates a front sectional view of a motor mount with a gear track tensioner;

FIG. 49 illustrates a top-down sectional view of the pawl-gear interface of the motor mount;

FIG. 50 illustrates an underneath sectional view of the pawl-gear interface of the motor mount;

DETAILED DESCRIPTION

Figure 1:
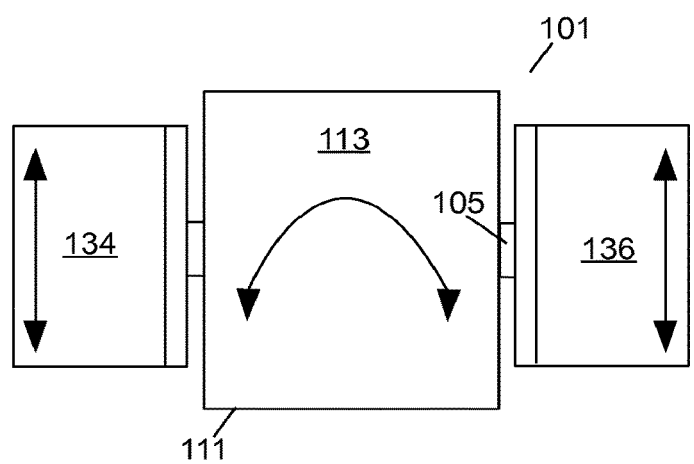
FIG. 1 illustrates a top view of an embodiment of the positioning system.
Figure 2:
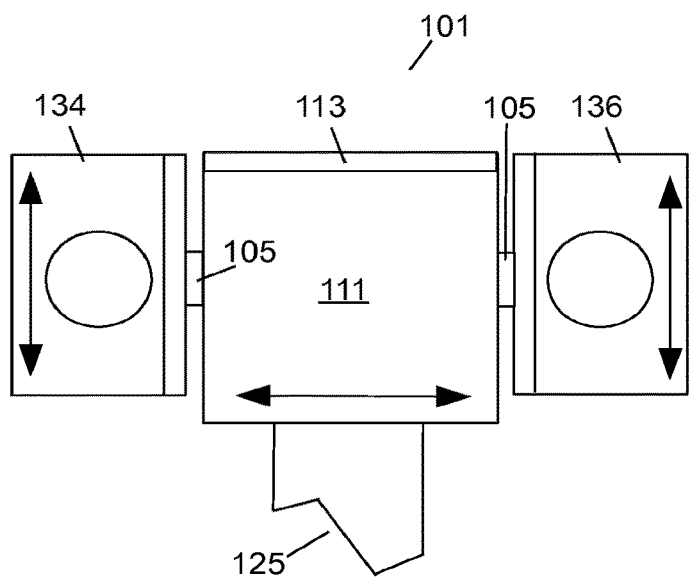
FIG. 2 illustrates a front view of an embodiment of the positioning system.
Figure 3:
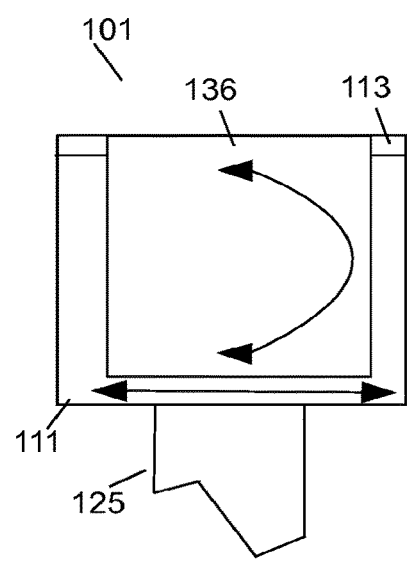
FIG. 3 illustrates a side view of an embodiment of the positioning system.

The present invention is directed towards a robotic positioning device. With reference to FIGS. 1-3, a top view of an embodiment of the robotic positioning device 101 is illustrated in FIG. 1, a front view of the positioning device 101 is illustrated in FIG. 2 and a side view of the positioning device 101 is illustrated in FIG. 3. The positioning device 101 is mounted on a pan shaft 125 and can have a first payload 134 and/or a second payload 136 rigidly coupled to opposite ends of a tilt shaft 105. The first payload 134 and the second payload 136 can be almost any type of equipment including arms, cameras, lasers pointers, laser designators, laser range finders, laser power transceivers, spotlights, covert illumination, loud speakers, antennae, radar, sensors, less-lethal weapons, lethal weapons, and any combination of such devices mounted together into a multi-sensor package. The positioning device 101 can rotate about the pan shaft 125 and the tilt shaft 105 can rotate within the positioning device 101 to rotate the payloads 134 and 136 in both azimuth and elevation. The positioning device 101 includes a housing 111 and a top cover 113 that surround and protect internal electronics and mechanical systems that control the rotation of the positioning device 101 and the tilt shaft 105. By transmitting control signals to the mechanical systems, the first payload 134 and the second payload 136 can be rotated into any angular position relative to the pan shaft 125 which can be stationary or movable.

FIGS. 5-9 and 11-16 illustrate embodiments of panning devices for rotatably moving a housing and attached or integral payloads about an azimuth. FIGS. 17 and 19-22 similarly illustrate embodiments of tilting assemblies that can serve as a complete device for rotating attached or integral payloads in elevation. These panning devices and tilting devices are drawn with break lines midway to better visualize their pairing into composite, dual-axis devices. The top of the housing is broken in each panning device embodiment, as is the bottom of each tilting device embodiment housing, to better convey the modularity of pairing single-axis panning embodiments with single-axis tilting embodiments to create a combined dual-axis device capable of both panning and tilting of payloads. FIGS. 10, 18 and 23-35 illustrate composites of various panning device embodiments combined with tilting device embodiments to effect dual-axis pan-and-tilt positioning devices. FIGS. 36-46 illustrate embodiments of a bearing common to all device embodiments. FIG. 47 illustrates a dynamic rotary shaft seal. FIGS. 48-60 illustrate gear tracked and vise-locked adjustable motor mounts that can increase the shock and vibration tolerance of the positioning device and other belt, cable, and chain driven machines. FIGS. 61-64 illustrate a toggle-clamp mounting apparatus for rapidly installing and removing the positioning device or other portable devices from a mounting platform.

Figure 5:
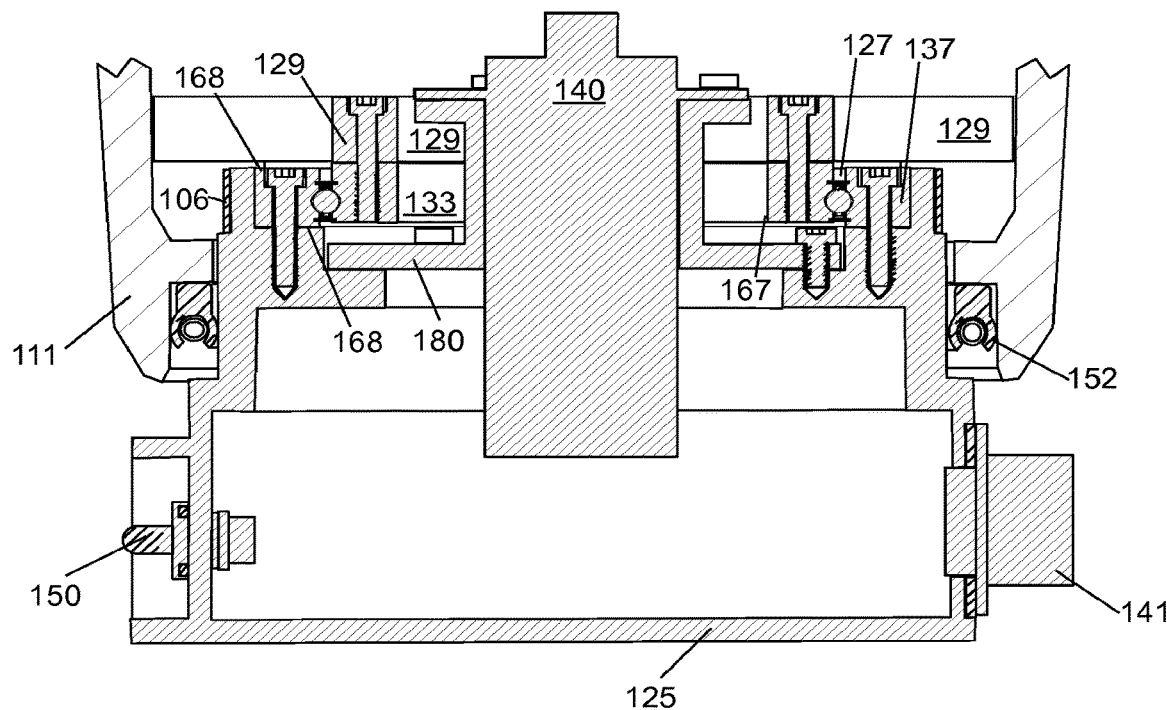
FIG. 5 illustrates a front cross sectional view of an embodiment of the positioning system.

With reference to FIG. 5, a front cross sectional view of an embodiment of a panning device is shown. A housing 111 can rotate about fixed pan shaft 125 to change the azimuth of payloads attached directly to, or mounted inside of, the housing 111. Housing 111 rotates about fixed shaft 125 via a pan bearing 127 which is shown in greater detail in FIG. 41 and described in more detail later.

The positioning device can be mounted to the top of a pan shaft 125 with a pan bearing 127 coupled between a pan bearing flange 129 and a recessed, inner annular surface atop pan shaft 125. The pan bearing 127 can include an inner ring 133, an outer ring 137 and a plurality of bearings 135 between these rings that allow the outer ring 137 to rotate smoothly around the inner ring 133. The pan bearing flange 129 can be rigidly coupled to a lower portion of the housing 111 and the inner ring 133 of the pan bearing 127. The outer ring 137 of the pan bearing can be rigidly coupled to the top of the pan shaft 125. An outer ring 137 of pan bearing 127 can have mounting holes with which fasteners rigidly attach the outer ring to shaft 125.

Figure 12:
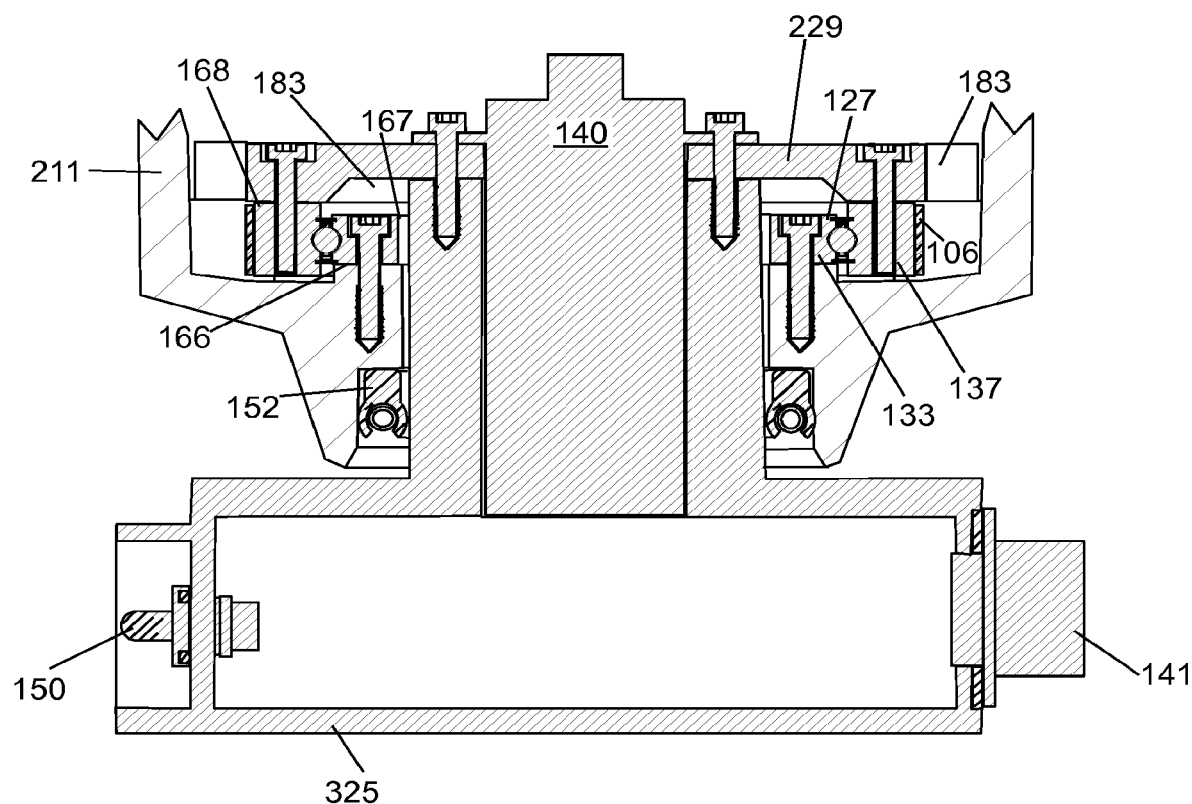
FIG. 12 illustrates a front cross sectional view of an embodiment of the positioning system.
Figure 14:
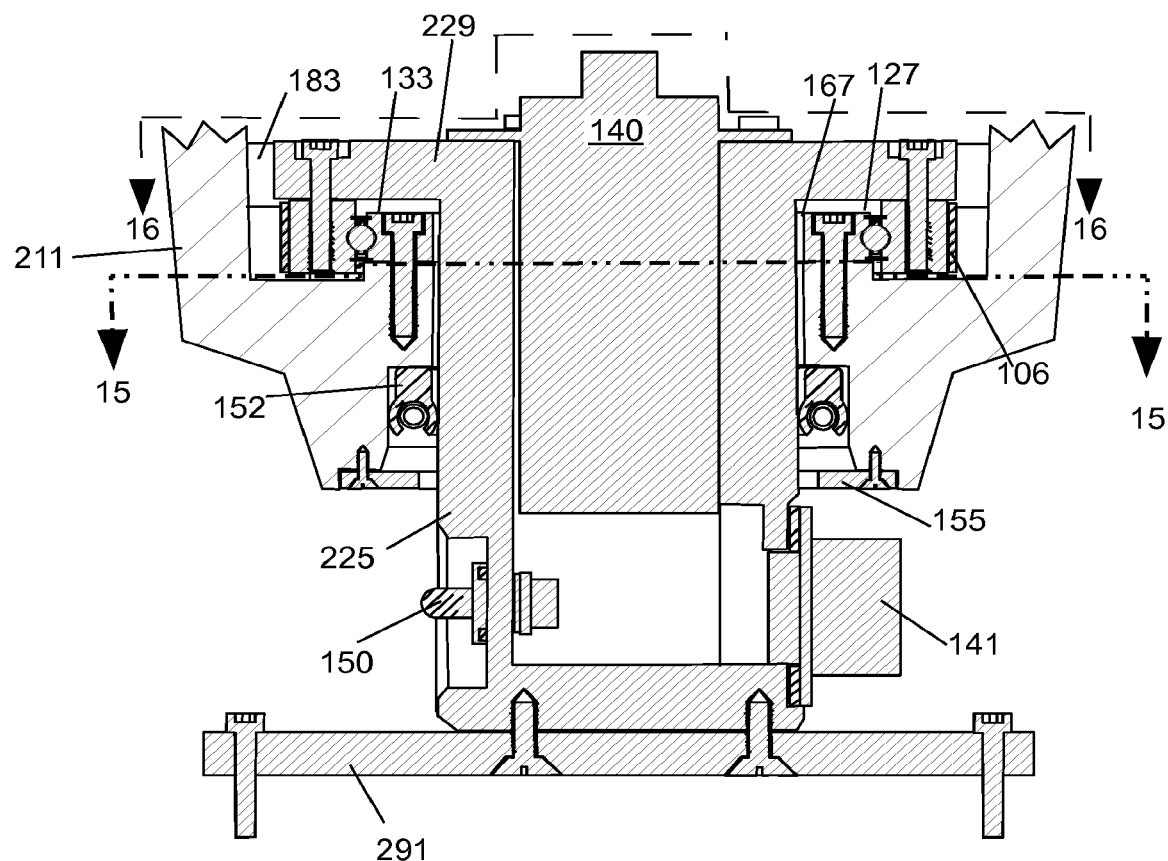
FIG. 14 illustrates a front cross sectional view of an embodiment of the positioning system.

To prevent damage to threads tapped into pan shaft 125, strong threaded inserts such as Keenserts or Helicoils can be embedded into the pan shaft mounting hole pattern to greatly increase the thread strength. The bearing inner ring 133 can also have mounting holes to attach the bearing to housing 111 via flange 129. In an embodiment, the pan bearing flange 129 can be rigidly coupled to the housing 111 and the inner ring 133 of the pan bearing 127 with a plurality of screws, bolts or other removable fastening mechanisms. To prevent damage to threads tapped into the floor posts of housing 111, strong threaded inserts such as Keenserts or Helicoils can be embedded into the housing to greatly increase the thread strength. The inner ring 133 can also be rigidly attached directly to the lower portion of the housing 111 with a plurality of screws, bolts, or other fasteners as illustrated in FIGS. 12 and 14, and the hole pattern in the housing floor can also be reinforced with threaded inserts. With reference to FIG. 12, planar surfaces 168 of the outer ring can be very flat and the underside of pan shaft flange 229 can be very flat and parallel; and the planar surfaces 166 of the inner ring 133 can be very flat and parallel to an annular boss on the floor of the housing 211, the result of these flat and parallel joints being very concentric rotation of pan shaft 325 in relation to bearing bore 167 and housing 211.

The pan bearing 127 assembly can allow the positioning device to rotate about the pan shaft 325. The circumference of the outer ring 137 can include teeth which can engage a drive mechanism which will be described in more detail. The teeth profile can be hobbed directly onto the circumference of outer ring 137, directly into the circumference of pan shaft 125 as illustrated in FIG. 5, or a ring of pulley stock can be rigidly attached around the outer ring 137 or around pan shaft 125 to create an integrated shaft gear. In an embodiment, the tooth profile is hobbed directly into shaft 125, with belt 106 mating with the gear teeth to apply torque to the shaft 125 and thereby create rotary motion. The inner surface of the pan belt 106 and the outer surface of the outer ring 137 can have corresponding teeth to prevent slipping, called 'ratcheting' when the belt is synchronous, between the pan belt 106 and the outer ring 137. By precisely controlling the movement of the panning drive mechanism, the housing 111 can be accurately rotated to any desired azimuth position.

Figure 23:
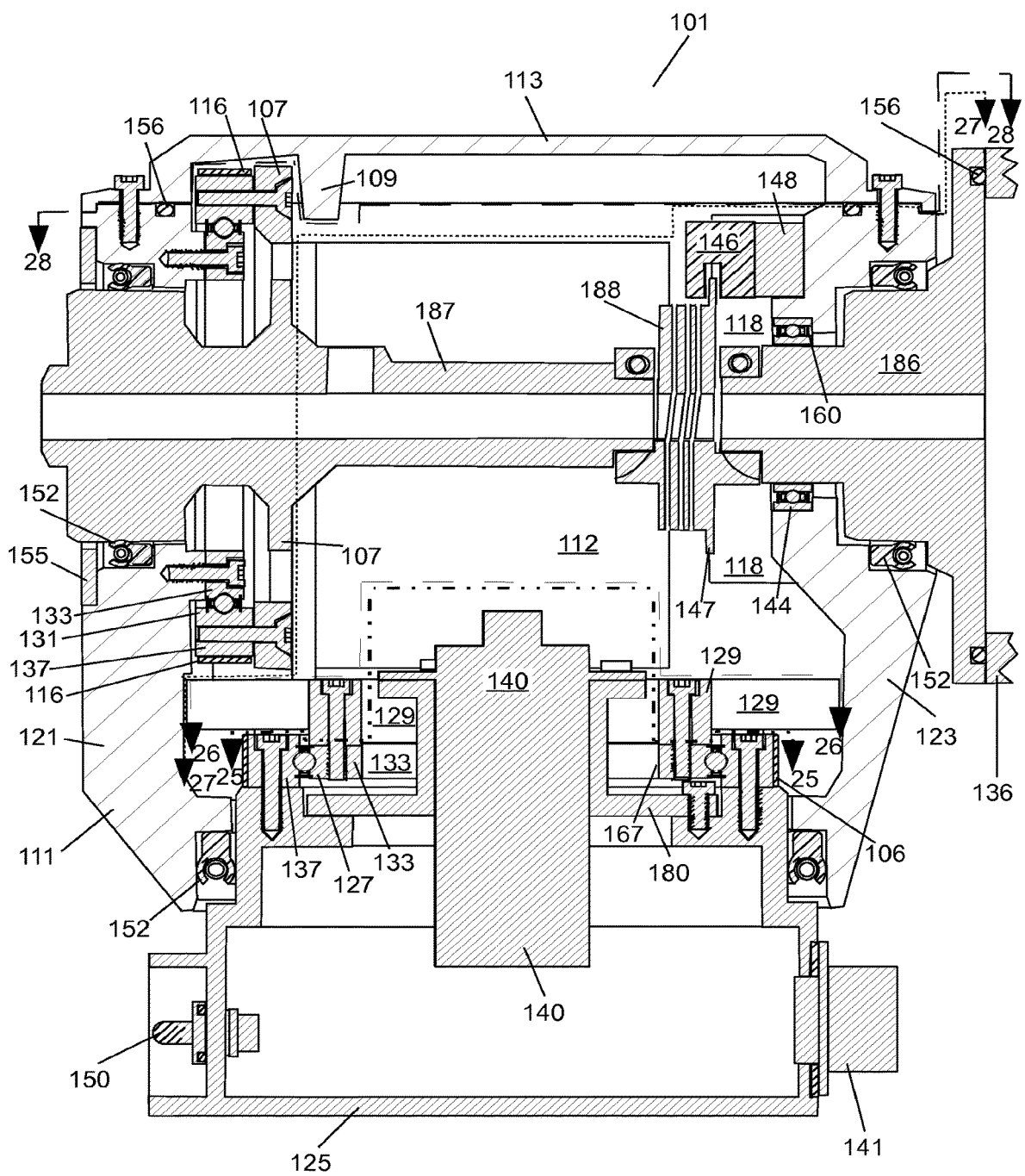
FIG. 23 illustrates a front cross sectional view of an embodiment of the positioning system.

With reference to FIG. 23, an internal power supply 118 can provide electrical power to control electronics and motor components. Power and control signals can enter into the positioning device via connector 141 and interface to electronics enclosed in the wide space within pan shaft 125, and these power and data signals can be routed further up into housing 111 by passing through the bore 167 of pan bearing 127. To prevent shaft rotation from excessively flexing wires or yanking wires free of their receptacles, a slip ring 140 can be placed in bore 167, rigidly mounted to the fixed shaft 125 by slip ring bracket 180. The components enclosed in shaft 125 and housing 111 can be protected from the environment by a dynamic shaft seal 152, as well as static seals around any penetrations and between faying edges of the housing 111. Both air valve 150 and connector 141 can have static seals to prevent leakage where they penetrate the exterior walls, and air valve 150 can purge and pressurize the sealed housing 111 with clean, contaminant free gas.

Figure 6:
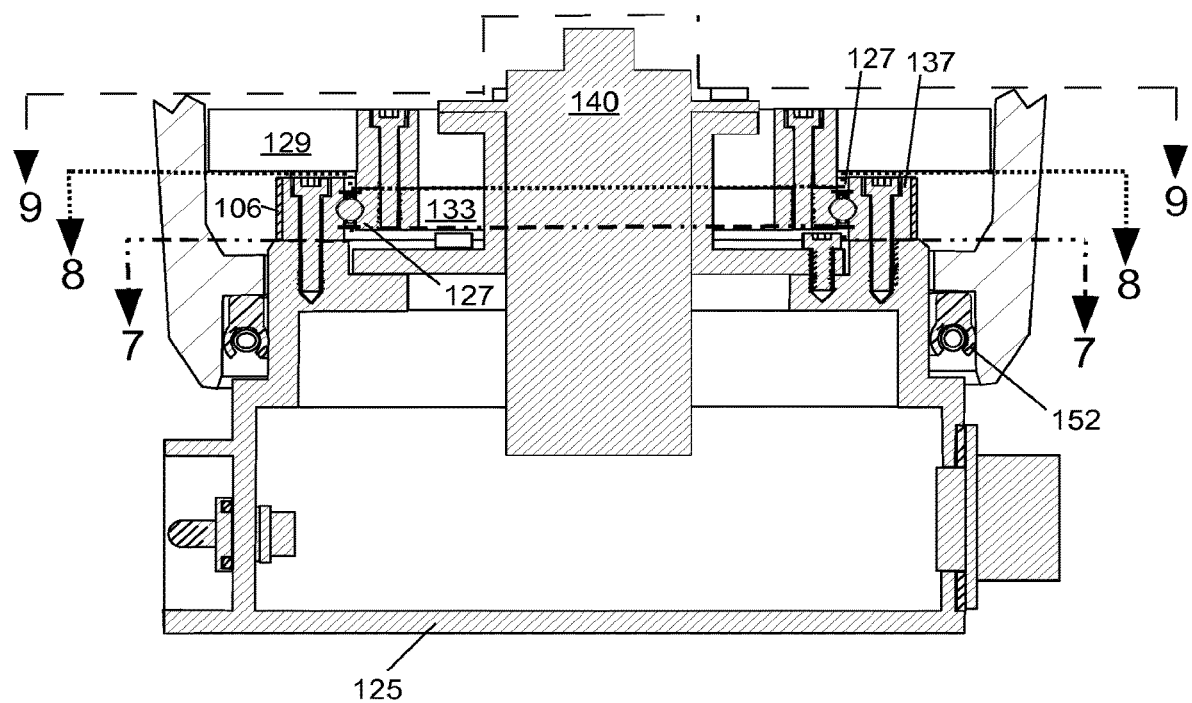
FIG. 6 illustrates a front cross sectional view of an embodiment of the positioning system.
Figure 7:
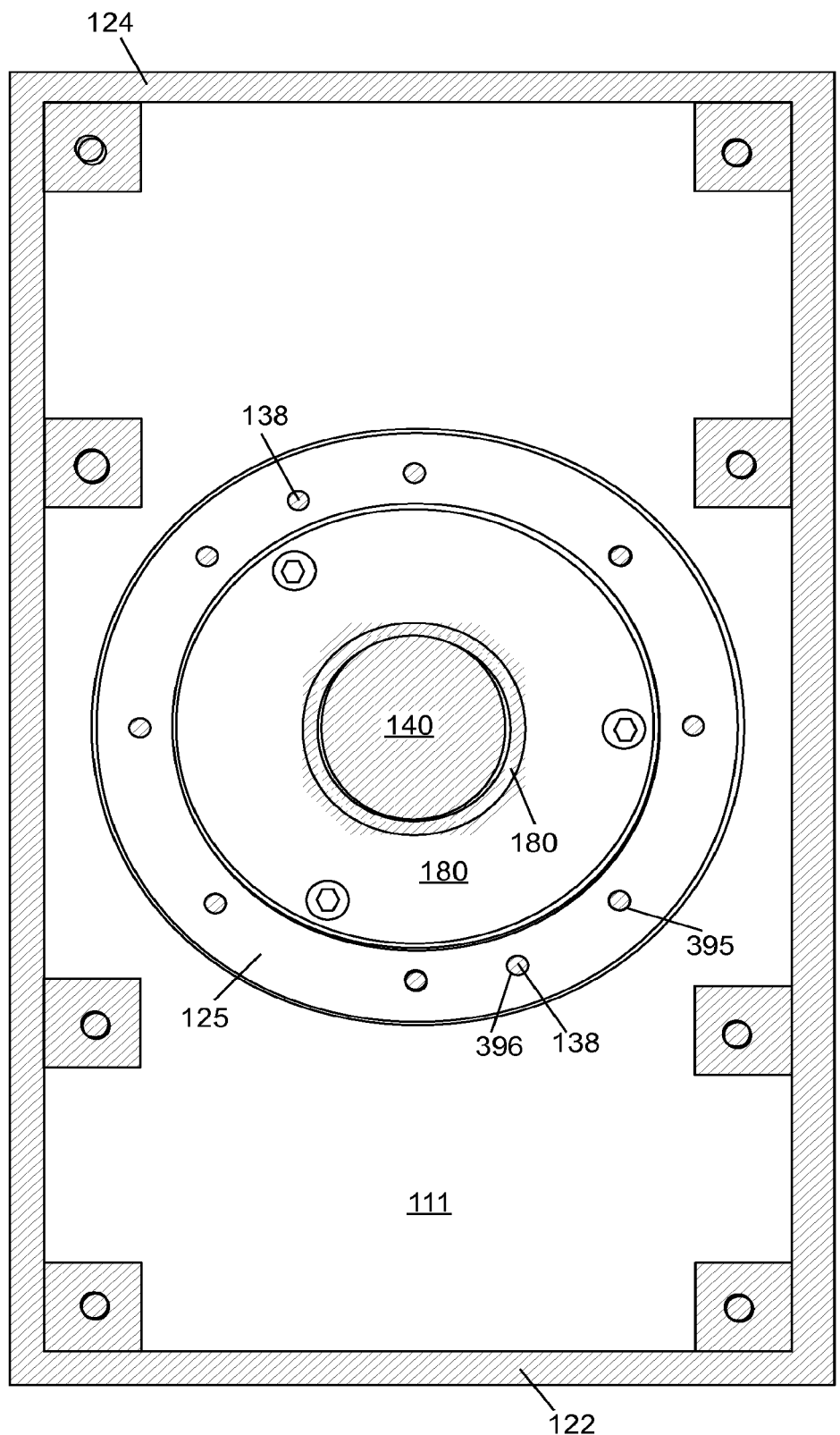
FIG. 7 illustrates a top cross sectional view of an embodiment of the positioning system.
Figure 36:
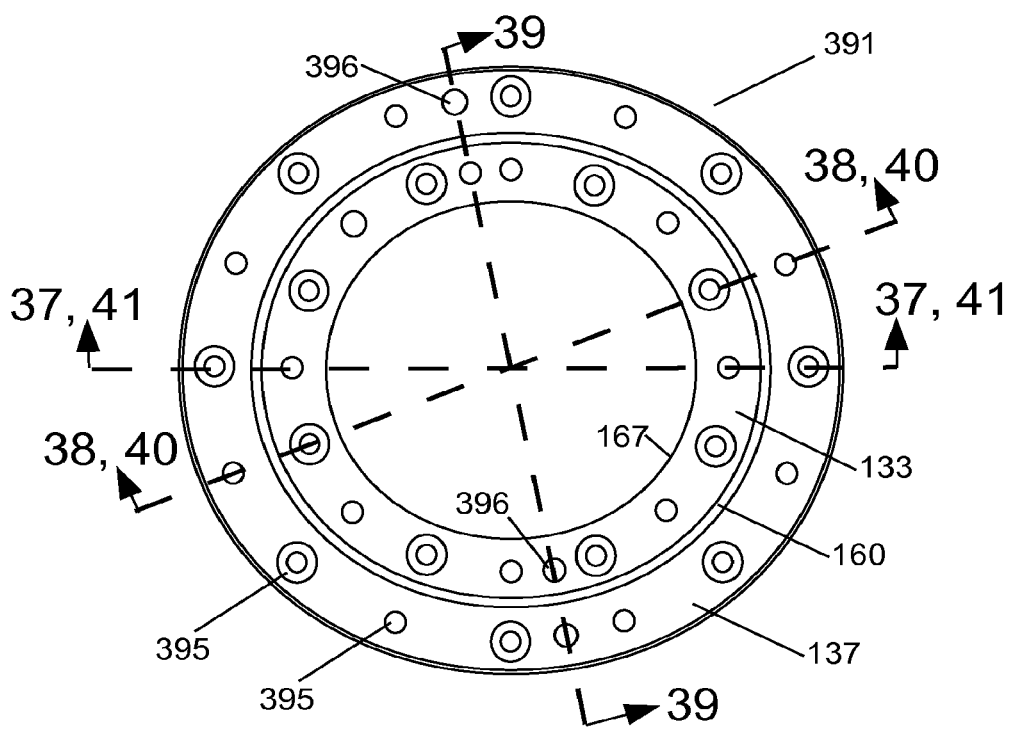
FIG. 36 illustrates a top plan view of an embodiment of a turntable bearing.
Figure 37:
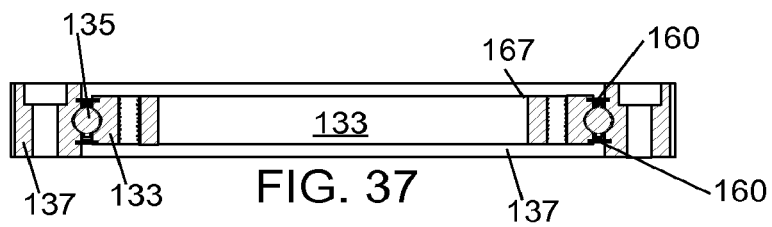
FIG. 37 illustrates a front cross sectional view of an embodiment of the turntable bearing.
Figure 38:
FIG. 38 illustrates a front cross sectional view of an embodiment of the turntable bearing.
Figure 39:
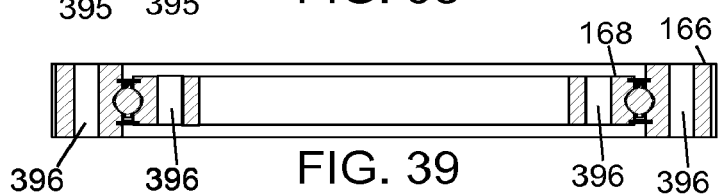
FIG. 39 illustrates a front cross sectional view of an embodiment of the turntable bearing.
Figure 40:
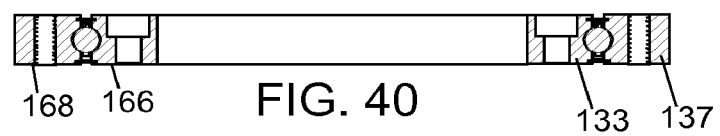
FIG. 40 illustrates a front cross sectional view of an embodiment of the turntable bearing.
Figure 41:
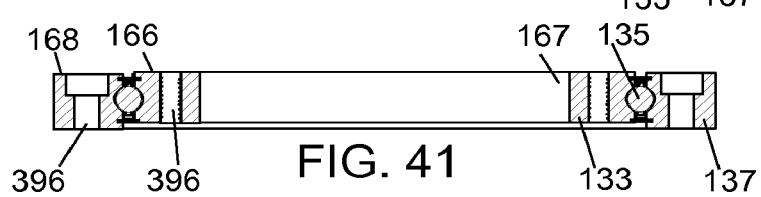
FIG. 41 illustrates a partial front cross sectional view of an embodiment of the turntable bearing.

With reference to FIG. 6, the pan belt 106 meshes with a belt profile cut directly into the circumference of outer bearing ring 137 to create a geared bearing, as illustrated in FIGS. 37-39, or a separate ring of hobbed pulley stock can be press fit or otherwise rigidly attached around outer ring 137 of un-geared bearings such as those illustrated in FIGS. 40 and 41 to similarly effect a geared bearing. The inner surface of the pan belt 106 and the outer surface of the outer ring 137 can have corresponding teeth to prevent slipping between the pan belt 106 and the outer ring 137. Horizontal break lines through FIG. 6 illustrate three different top-down views in FIGS. 7-9, with FIG. 9 showing the view from which the sectional of FIG. 6 is illustrated. With reference to FIG. 7, a top view of housing 111 orients a front side 122 at the bottom of the view, with a rear side 124 of the panning device at the top of the view. Eight sectioned posts in the floor of housing 111 illustrate how pan bearing flange 129 can bolt into the housing. Pan shaft 125 penetrates housing 111 from beneath and can have a pattern of bolt holes 395 for fastening the outer ring 137 of pan bearing 127. Alignment pins 138 pressed into precisely located holes 396 can precisely seat the outer ring 137 atop pan shaft 125 to precisely align the shaft through the center of the bore in the housing floor. Slip ring 140 can be fixed to shaft 125 by slip ring bracket 180 which can rigidly attach to a shelf inside shaft 125, or the flange of slip ring 140 can fasten directly into this shelf. Moving up in elevation to the view in FIG. 8, pan shaft gear outer ring 137 is mounted atop pan shaft 125. A similar top plan view of the bearing is illustrated in FIG. 36, showing each ring can have a multitude of various mounting holes 395, alignment pin holes 396, a central bore 167, and bearing seals 160. With reference to FIG. 9, a pan bearing flange 129 rigidly attaches to pan gear inner ring 133, and can have alignment pins 138 to precisely seat the pan gear 127 onto the pan bearing flange 129. Cutouts in the flange permit tool access to the fasteners in mounting holes 395 and alignment pins 138 in alignment holes 396; manually rotating the shaft 125 can position each fastener and pin below an access cutout. These cutouts also provide access for installing and tensioning belt 106. A second motor gear 104 having an axis of rotation parallel to the axis of rotation of the shaft gear 127 can be driven by a motor to transfer torque to shaft 125 via a direct meshing of their gear teeth or via a belt 106 as illustrated. A pan motor 102 (out of view) above pan gear 104 can be rigidly coupled to the housing 111. The rotor of pan motor 102 rotates when electrical power is applied which rotates the pan gear 104 and moves the pan belt 106 which causes the outer ring 137 to rotate relative to the inner ring 133 coupled to the housing 111. Because the pan motor 102 is fixed in relation to the housing 111, the movement of the pan motor 102 causes the housing 111 to rotate about the pan shaft 125. By controlling the movement of the pan motor 102, the positioning device 101 and the first payload 134 and second payload 136 (viewable in FIGS. 1-4) can be accurately rotated to any desired rotational position. The broken view line depicts the datum and orientation from which the sectional of FIG. 6 is taken.

Figure 9:
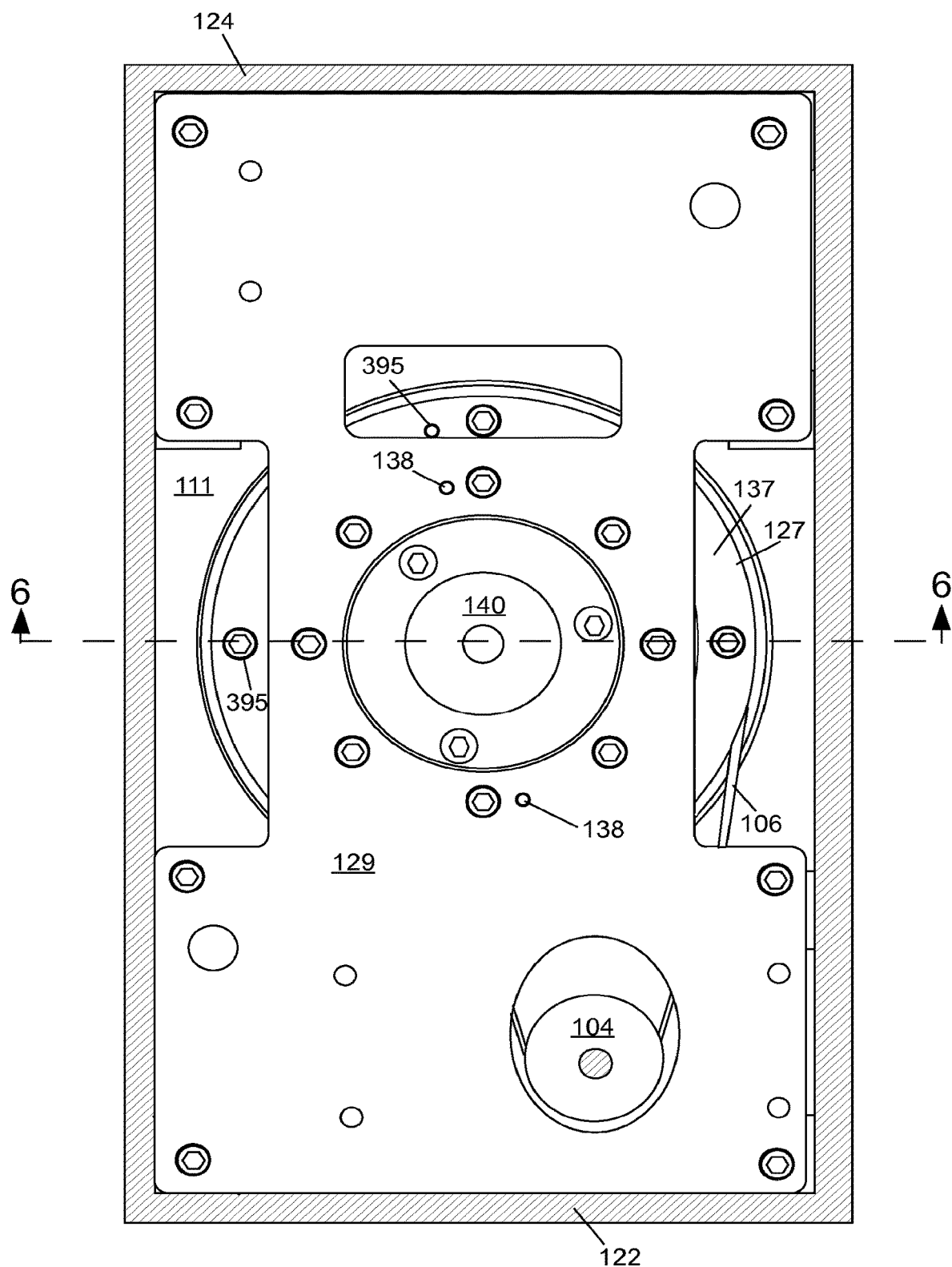
FIG. 9 illustrates a top cross sectional view of an embodiment of the positioning system.
Figure 10:
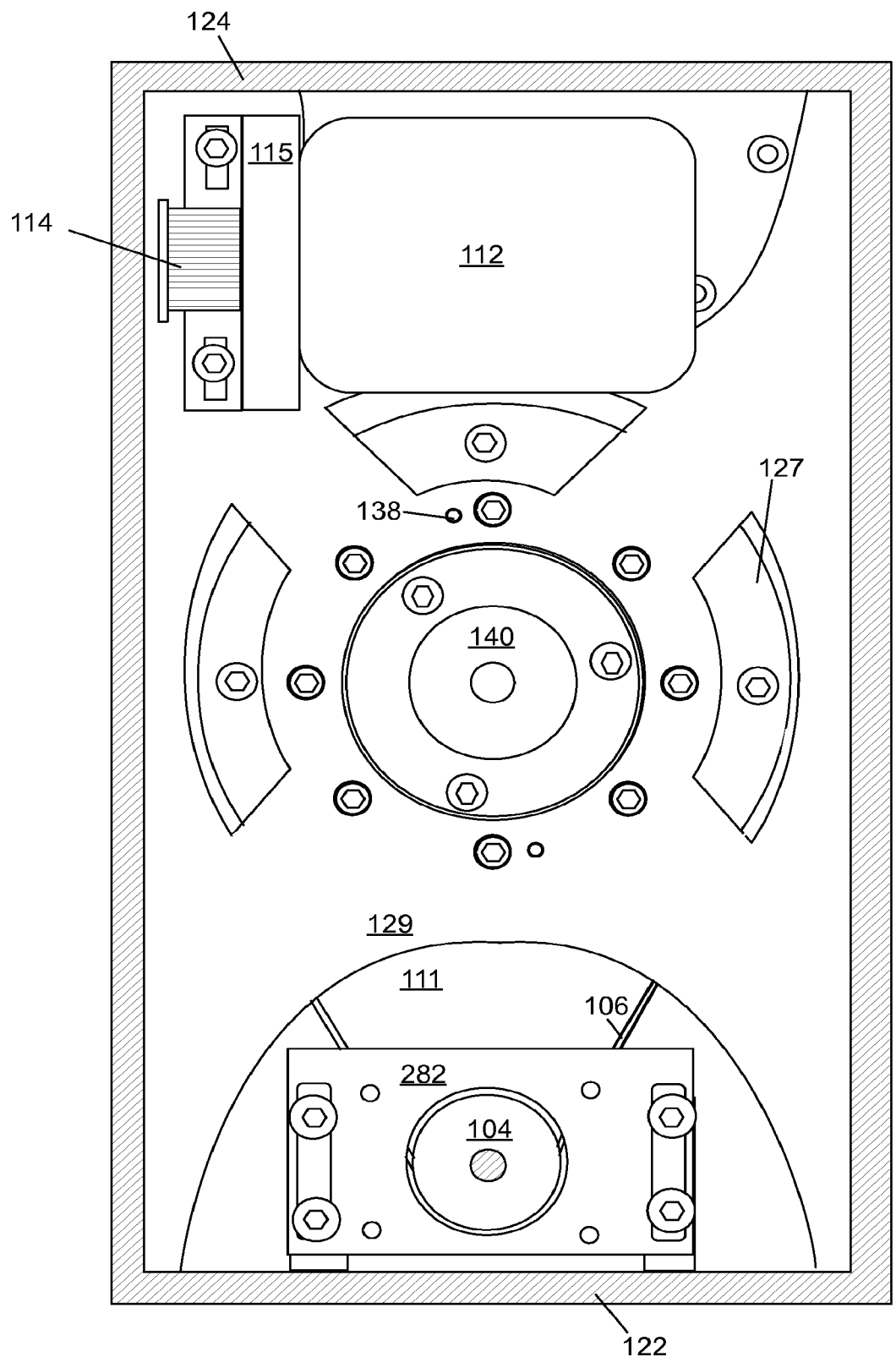
FIG. 10 illustrates a top cross sectional view of an embodiment of the positioning system.
Figure 11:
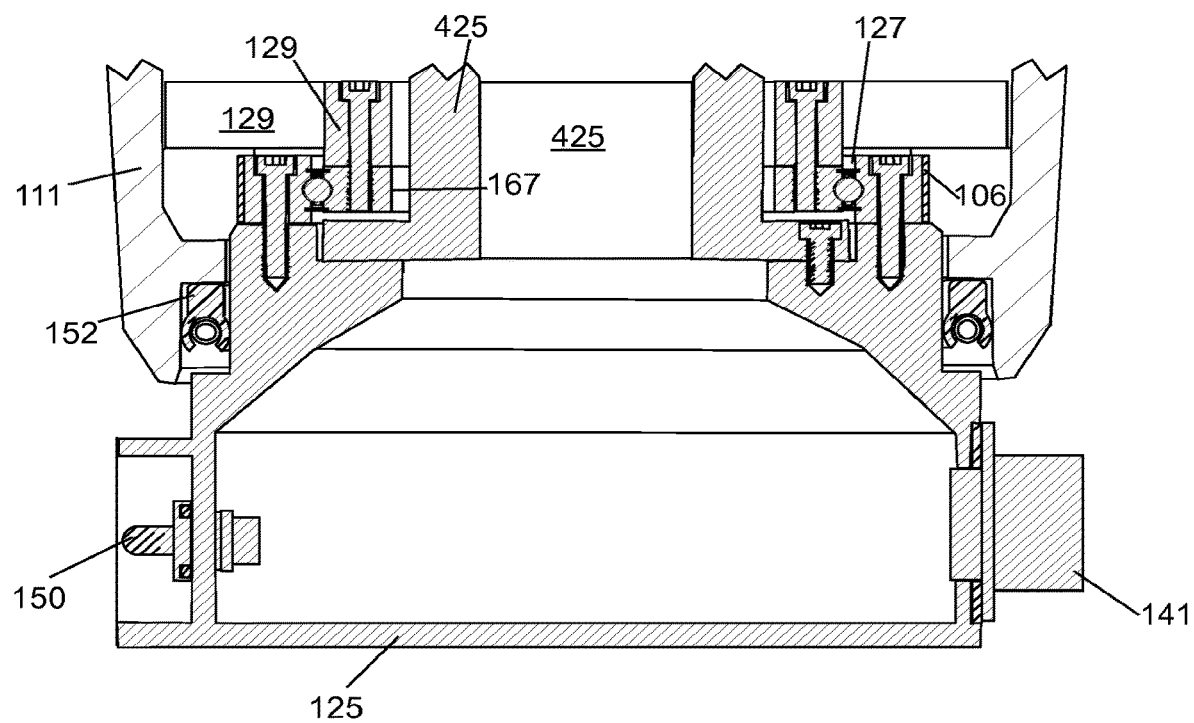
FIG. 11 illustrates a front cross sectional view of an embodiment of the positioning system.
Figure 15:
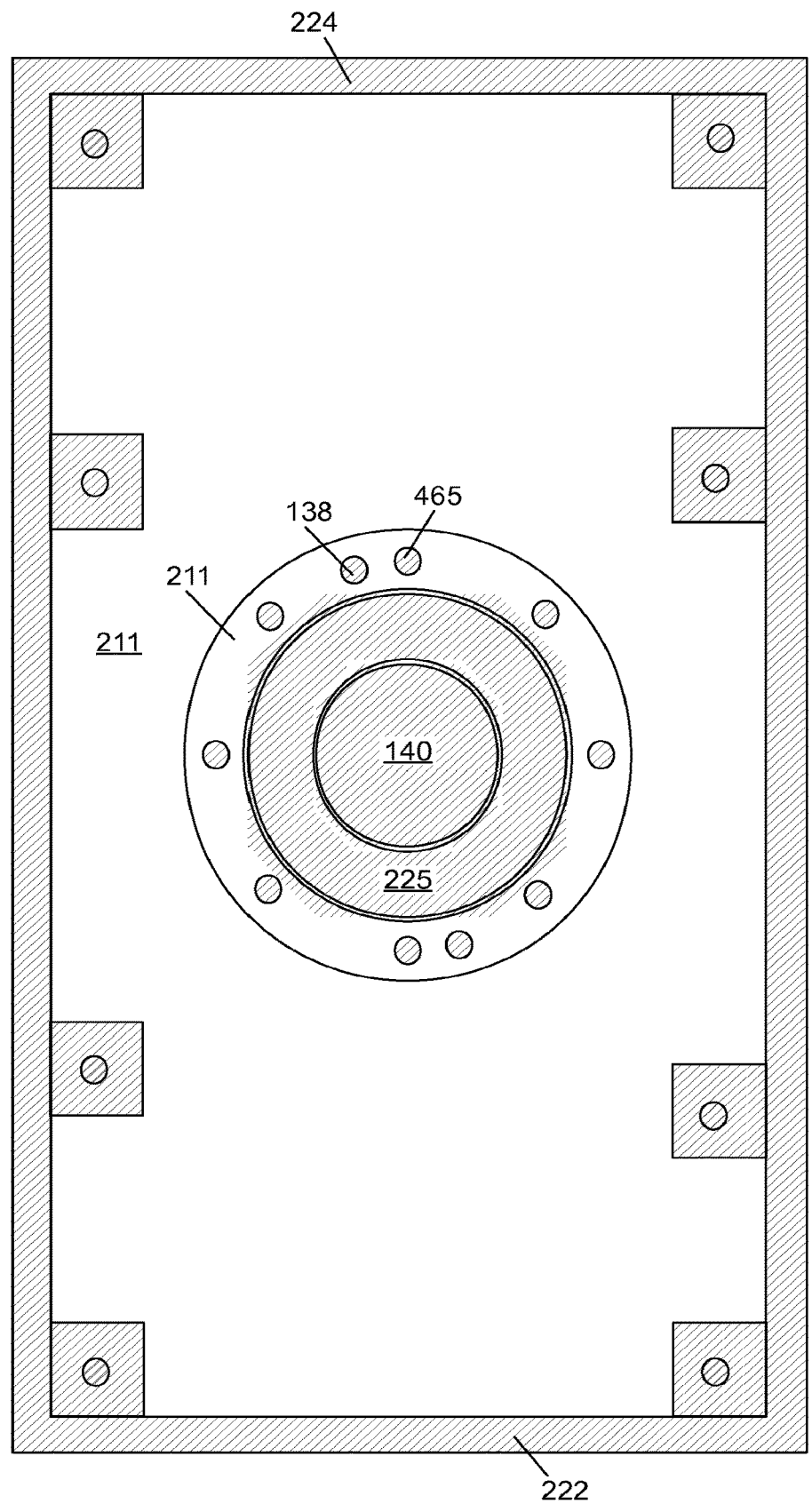
FIG. 15 illustrates a top cross sectional view of an embodiment of the positioning system.
Figure 16:
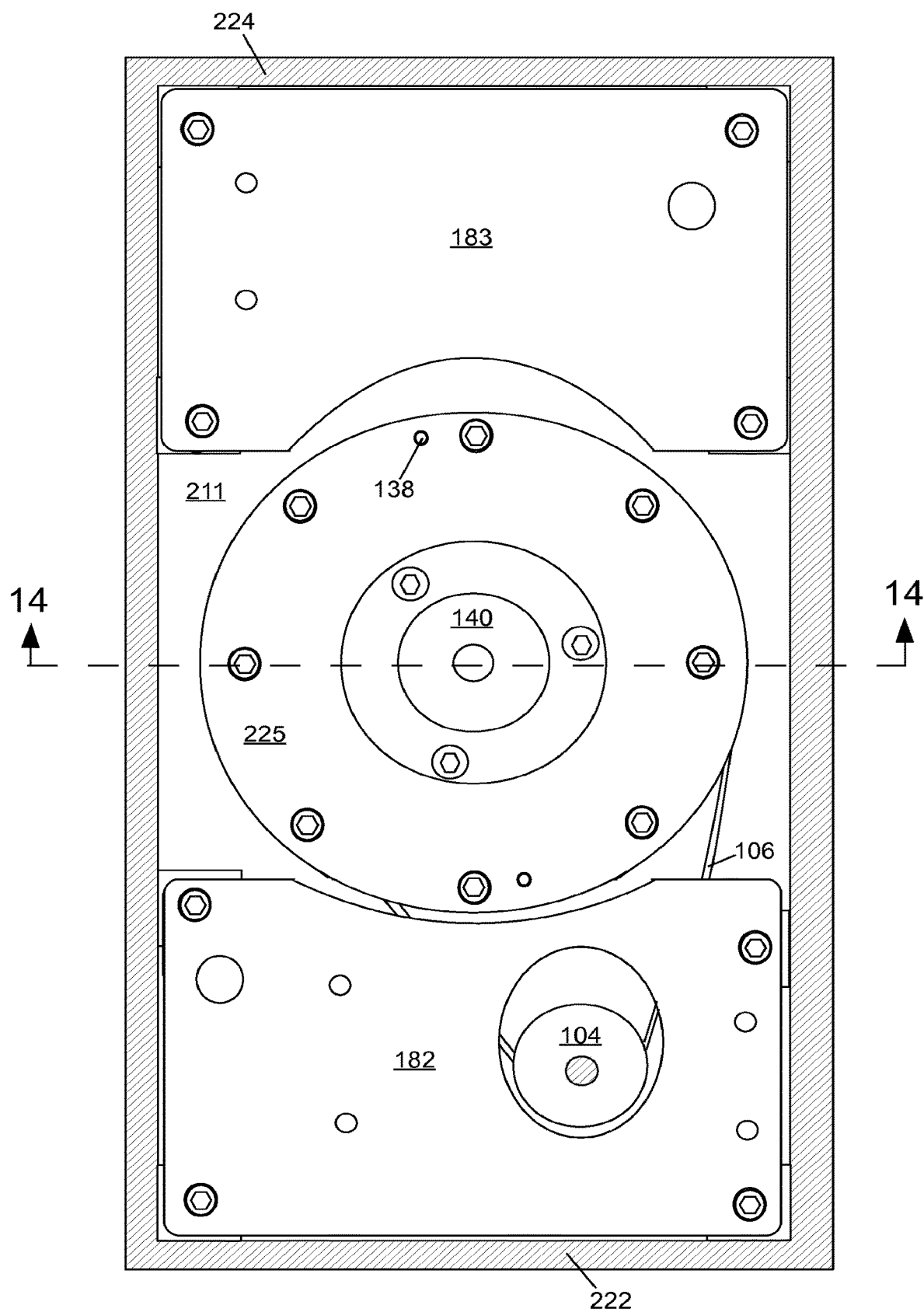
FIG. 16 illustrates a top cross sectional view of an embodiment of the positioning system.
Figure 34:
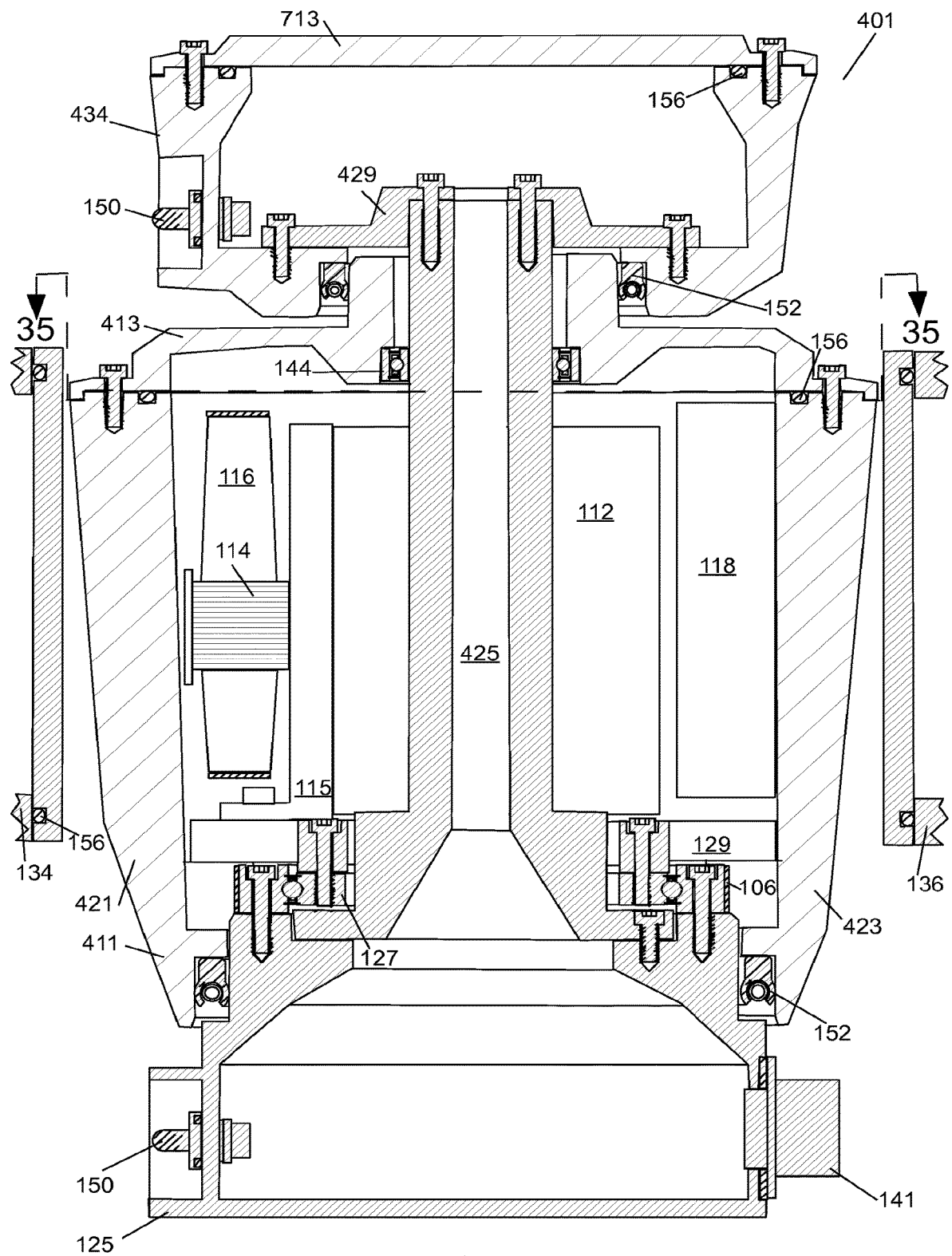
FIG. 34 illustrates a front cross sectional view of an embodiment of the positioning system.
Figure 35:
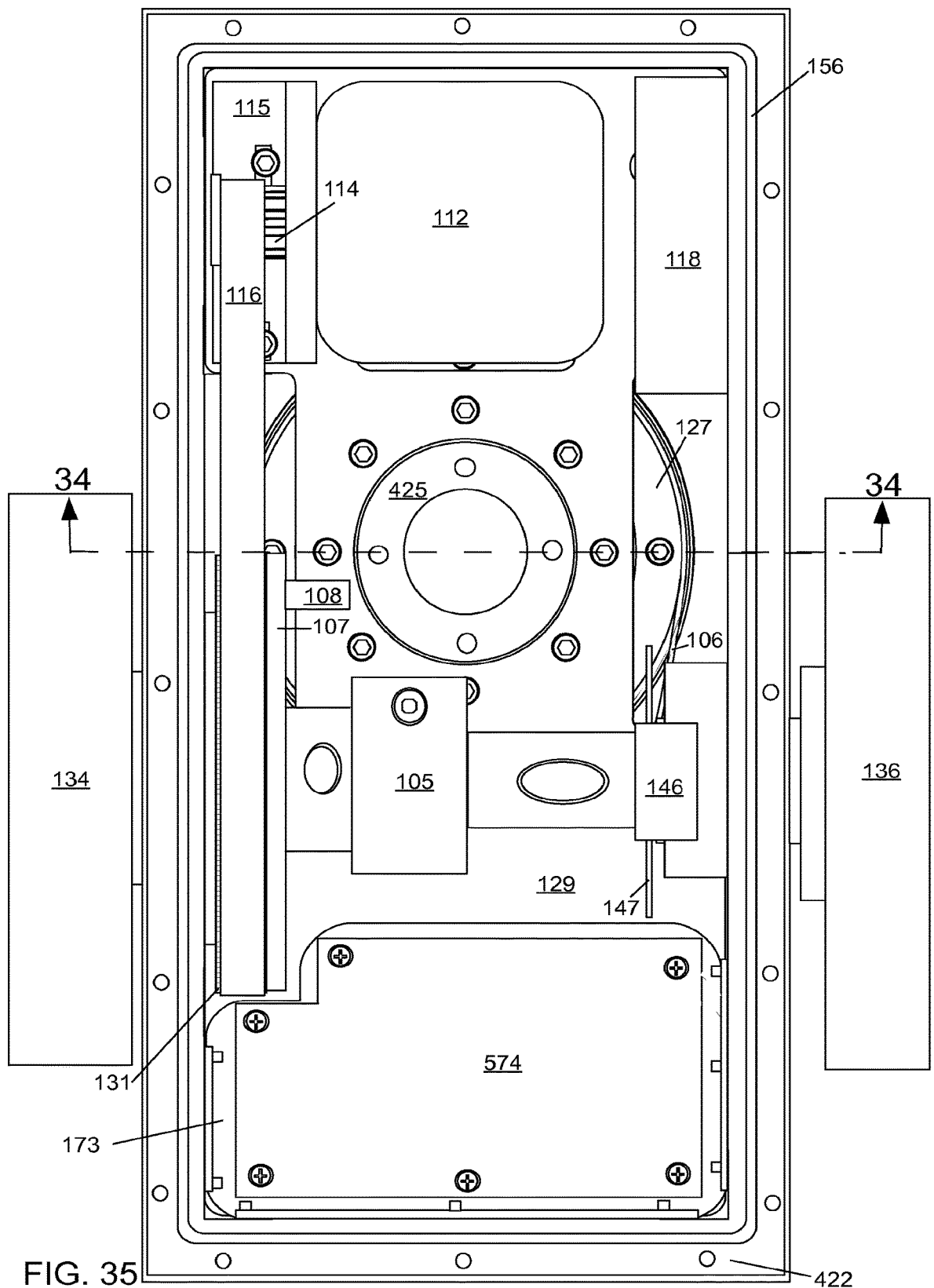
FIG. 35 illustrates a top plan view of an embodiment of the positioning system.
Figure 59:
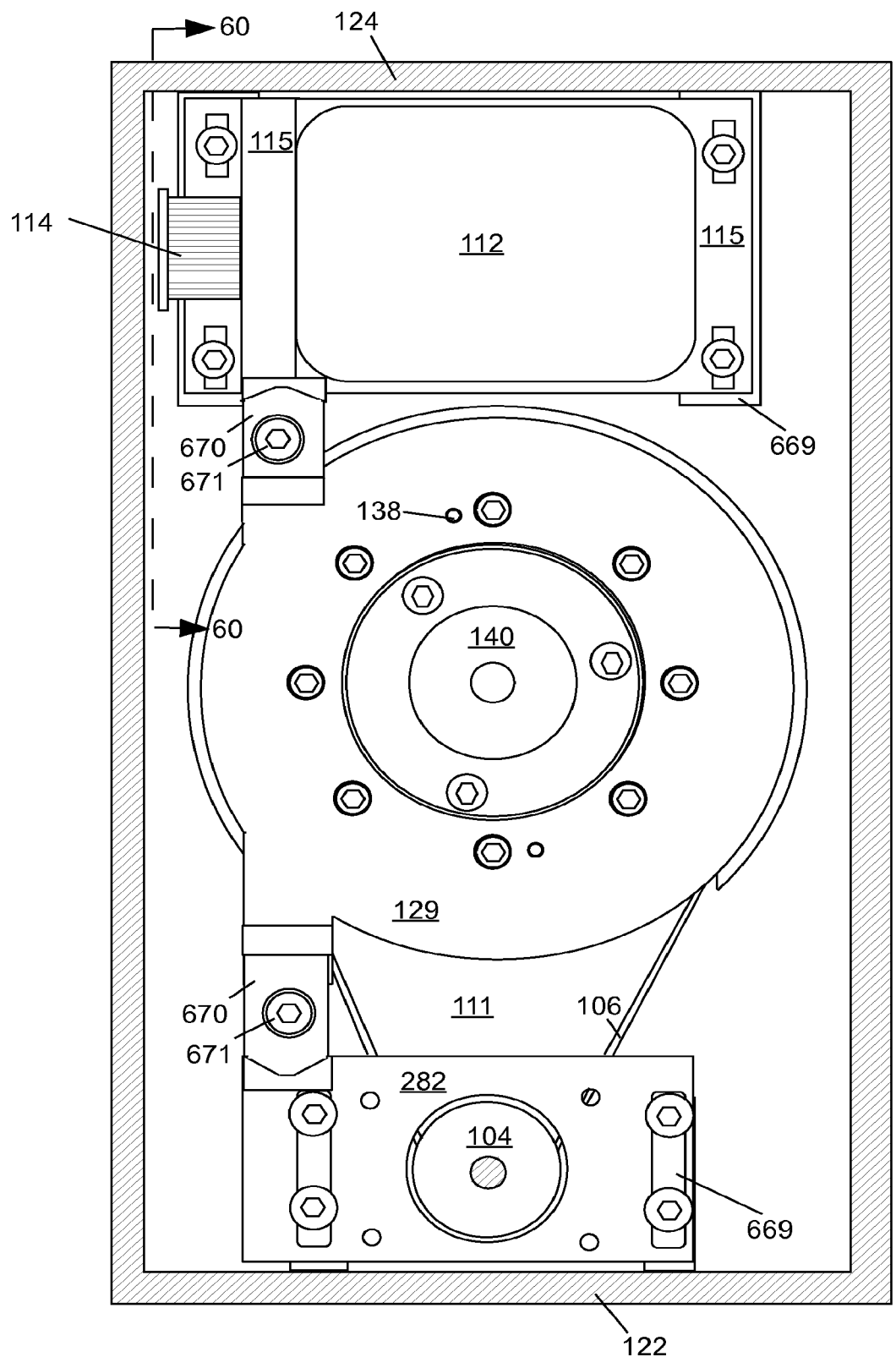
FIG. 59 illustrates a illustrates a sectional top view of an embodiment of the positioning device with motor mount vises.
Figure 60:
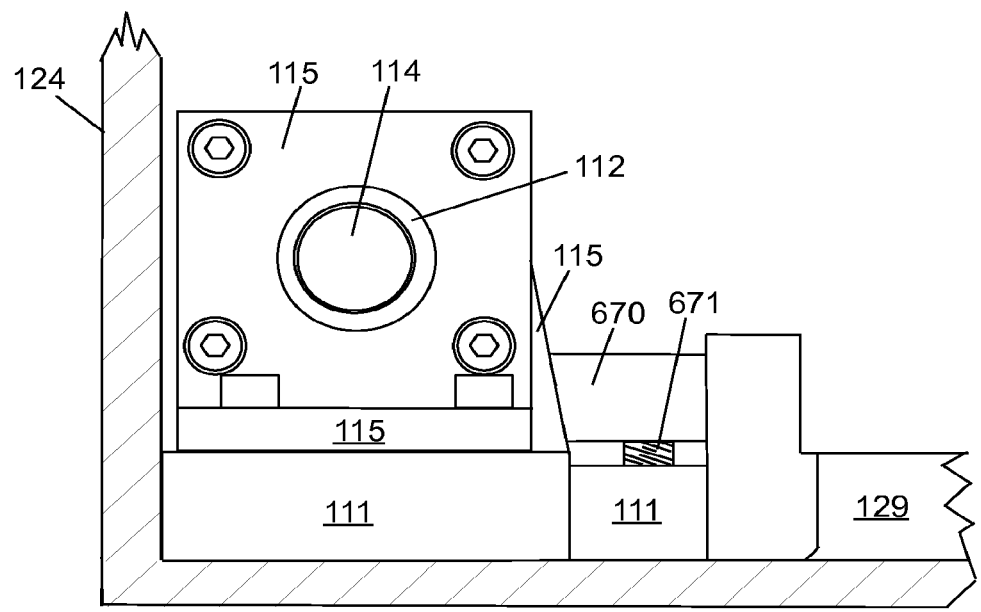
FIG. 60 illustrates a sectional partial side view of an embodiment of a motor mount with vise locking.

With reference to FIG. 10, pan bearing flange 129 has been integrated with housing 111. A pan motor gear 104 can be driven from a pan motor 102 mounted to pan motor bracket 282 which sits atop rails integral with the floor of housing 111. In the illustrated embodiment, the bracket 282 and the pan motor assembly are independent structures from pan bearing flange 129, unlike the embodiment illustrated in FIG. 9 where the pan motor bracket 282 (motor bracket not visible in FIG. 9) mounts atop pan flange 129. By separating the motor mounting features from the pan shaft gear mounting features, there is more flexibility in the manufacturing assembly and repair stages to optimize the sequence and procedure for mounting or removing parts in these tight spaces. The separation between the integral shaft flange 129 and bracket 282 creates additional working space to install and tension belt 106. Towards housing rear side 124, tilt motor bracket 115 has mounted a second motor 112 and motor gear 114 to the integral flange inside housing 111 to introduce the beginning of a dual-axis embodiment. Tilt motor 112 is suspended above a cutout in the integral flange of housing 111, below which are threaded posts or threaded inserts to mount electronics or other accessories to the floor of housing 111. With reference to FIG. 59 is a plan view of a similar embodiment with an integral pan bearing flange 129 and separate motor mount plates 282 and 115, but wedges 670 are driven by screws 671 to slowly and incrementally position and hold the motor mount plates for proper belt tension. FIG. 60 illustrates a sectional partial side view of the tilt motor assembly of FIG. 59, whereby wedge 670 presses tilt motor bracket 115 radially away from the tilt axis by turning screw 671. With reference to FIG. 48 is a front sectional view of a pan motor embodiment that could be paired with the housings of FIGS. 10 and 59, but with a linear-gear belt-tensioning system instead of a wedge. The necessity of the geared and wedged motor mounts in a precision drive will be discussed in greater detail. With reference to FIG. 11, a pan-through shaft 425 is rigidly attached to pan shaft 125. A full dual-axis pan-through shaft device embodiment is illustrated in FIGS. 34 and 35, permitting a payload to be mounted free of any motion of the pan and tilt action. FIGS. 12-16 illustrate additional embodiments of panning devices. With reference to FIG. 12, pan shaft gear 127 attaches directly to the floor of housing 211 instead of through the pan bearing flange 129 of previously discussed embodiments. Pan shaft 325 must be narrower than pan shaft 125 hence illustrated in order to pass through the pan shaft gear bore 167. The bore in the floor of housing 211 can be narrower than housing 111, as narrow as pan gear bore 167, which may permit a smaller dynamic shaft seal 152 and smaller housing 211. Pan shaft 325 installs from below housing 211, and a pan shaft flange 229 rigidly couples the geared outer ring 137 to shaft 325. With reference to FIG. 14, pan gear 127 also bolts inner ring 133 directly into the floor of housing 211, but pan shaft 225 installs from the top to permit a strong integral pan shaft flange 229 rather than the separately attached pan shaft flange 229 of FIG. 12. The base of pan shaft 225 can have integral threads or threaded inserts such as Keenserts or Helicoils for attachment to a base, or a base plate adapter 291 can attach to widen the base of the pan shaft 225 which was forcibly narrowed by design to pass through pan gear bore 167. Dynamic shaft seal 152 requires a restricted opening to be shielded from direct debris and air blast impacts, so removable seal gland shield 155 can be attached to the underside of housing 211. View lines 15 and 16 depict top-down views of FIG. 14 in the same manner as FIG. 6 referenced top-down views in FIGS. 7-10. With reference to FIG. 15, an annular boss in the floor of housing 211 includes a bolting circle with bolts 465 mounting inner ring 133, and can include alignment pin holes for alignment pins 138 to precisely locate the inner ring 133 of pan gear 127. With the pan gear installed, pan shaft 225 installs by penetrating through the hole in the floor of housing 211, dropping down from above, with slip ring 140 enclosed in the hollow pan shaft 225. With reference to FIG. 16, the top of pan shaft 225 includes an integral flange that fastens into pan gear outer ring 137 (shown in FIG. 14), and can include alignment pins 138 to precisely position the pan shaft inside the narrow bore in housing 211. Pan motor mount 182 attaches to the floor and walls of housing 211 to mount the motor 102 independently of the pan shaft flange 225, as similarly illustrated in FIG. 10. Tilt motor support plate 183 is also independent of pan shaft 225 to afford flexibility in the assembly process. The break line shown in FIG. 16 illustrates FIG. 14 as a bisected front sectional, viewed from front side 222 toward rear side 224, with FIGS. 15-16 being above plan views thereof.

Figure 13:
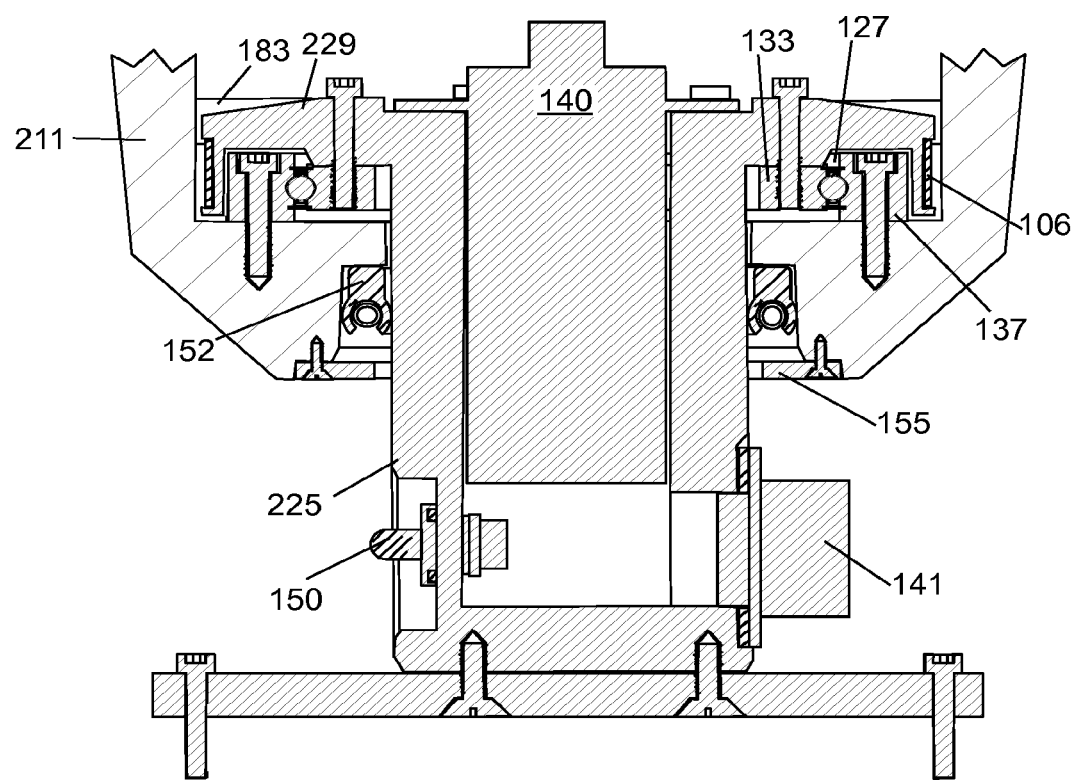
FIG. 13 illustrates a front cross sectional view of an embodiment of the positioning system.

Each embodiment illustrated thus far has detailed methods for mounting the inner ring of a turntable bearing or slew ring to a housing while the shaft is mounted to the outer ring. With reference to FIG. 13, the opposite ring mounting method is illustrated with pan bearing outer ring 137 fastening directly into the floor of housing 211 while inner ring 133 is rigidly mounted to the flange 229 of pan shaft 225. Outer ring 137 is fixed and thus cannot serve as a gear, so the flange 229 must have a belt profile hobbed directly into an accessible pulley diameter, or a hobbed ring can be press fit or otherwise attached around the edges of the pan shaft flange 229 to permit a pan belt 106 to apply torque necessary to rotate the shaft 225. For a vertically compacted assembly, the flange 229 can arch over the pan bearing 127 and overhang outer ring 137 with a geared pulley surface on the circumference of the overhang. This embodiment enjoys the added load handling capacity and removability afforded by the turntable bearing—which alone is a significant advantage if reports of rampant bearing destruction in prior art is to be relied upon—, but potential detractors include that it may not be as cost effective as the geared bearing embodiments, the narrow pan shaft may lack the tubular rigidity of the wide pan shaft embodiments, and the belt may not be as aligned between the motor and shaft gears as with the geared bearing.

FIGS. 5-16 have illustrated various embodiments of a shaft which rotates with respect to a chassis or housing via a mounting-holed turntable bearing instead of pairs of press fit bearings typical of prior art. The outer ring 137 can be mounted to the shaft, with the inner ring 133 mounted to the housing, or vice-versa, and the shaft can be designed to install into the housing from either direction. The design choices on which ring to mount to which surface, and which end to insert the shaft from, lead to a variety of embodiments which all enjoy the benefits of a multi-load capable turntable bearing; however, selection of a particular embodiment is not arbitrary. Each configuration has costs and benefits in physical strength, rigidity, vibration resistance, complexity, cost, and ease of assembly and repair; characteristics which will be disclosed in more detail once the figures have each been described.

FIGS. 17 and 19-22 illustrate tilting positioning devices in a similar manner as to how the panning device embodiments where presented by FIGS. 5-16. The tilting devices can utilize the same type of turntable bearing and thus have components and mounting permutations very similar to those for the azimuth panning devices, though shifted to an orthogonal orientation.

Figure 17:
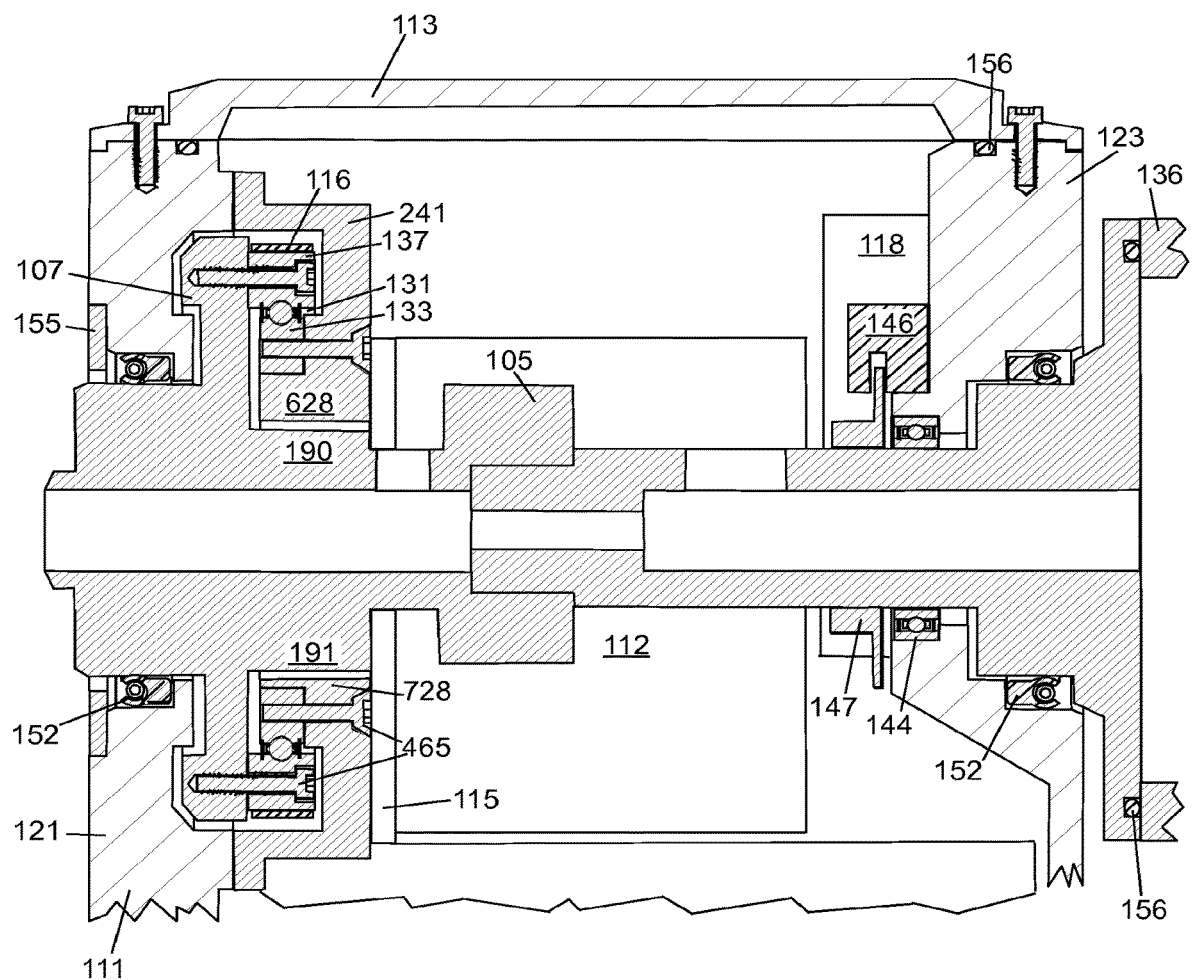
FIG. 17 illustrates a front cross sectional view of an embodiment of the positioning system.

With reference to FIG. 17, an elevation, or tilting, positioning device can include a drive mechanism for rotating the tilt shaft 105 within the housing 111. A tilt shaft 105 penetrates two sides of housing 111; the tilt shaft 105 can extend through the housing 111 and exit the housing 111 through a first side 121 and a second side 123. Performing the same function of pan bearing flange 129, a tilt shaft flange 241 rigidly couples the inner ring 133 of a tilt shaft gear 131 to the wall 121 of housing 111. Tilt shaft gear 131 can be coupled between an inner ring 133, an outer ring 137 and a plurality of bearings 135 between the inner ring 133 and the outer ring 137 that allow the outer ring 137 to rotate smoothly around the inner ring 133. A tilt shaft flange 107 can be rigidly coupled to one side of the tilt shaft 105 proximate the first side 121 of the housing 111. The tilt shaft flange 107 can be rigidly coupled to the outer ring 137 and the inner ring 133 can be rigidly coupled to a second tilt shaft flange 241 rigidly coupled to the first side 121 of the housing 111. The inner ring 133 can have a plurality of threaded mounting holes and the flange 241 can have corresponding thru-holes in the same pattern. Bolts 465 or other removable fasteners can be placed through the mounting holes in the flange 241 and tightly screwed into the threaded holes in inner ring 133. The tilt shaft flange 107 can have a plurality of threaded mounting holes and the outer ring 137 of the tilt bearing 131 can have corresponding thru-holes. Bolts 465 can be placed in the mounting holes in the outer ring 137 and tightly screwed into the threaded holes in the tilt shaft flange 107. These threaded holes in tilt shaft 107 can be reinforced with threaded inserts such as Keenserts or Helicoils. As with all threaded fasteners in the positioning device, threadlocking compound can be applied to fasteners to reduce vibration induced loosening. Outer ring 137 mounts to the tilt shaft flange 107. The circumference of outer ring 137 can include teeth that can engage a drive mechanism which can be a belt, another gear, or other actuator that is coupled to a tilt motor which will be described in more detail.

Figure 18:
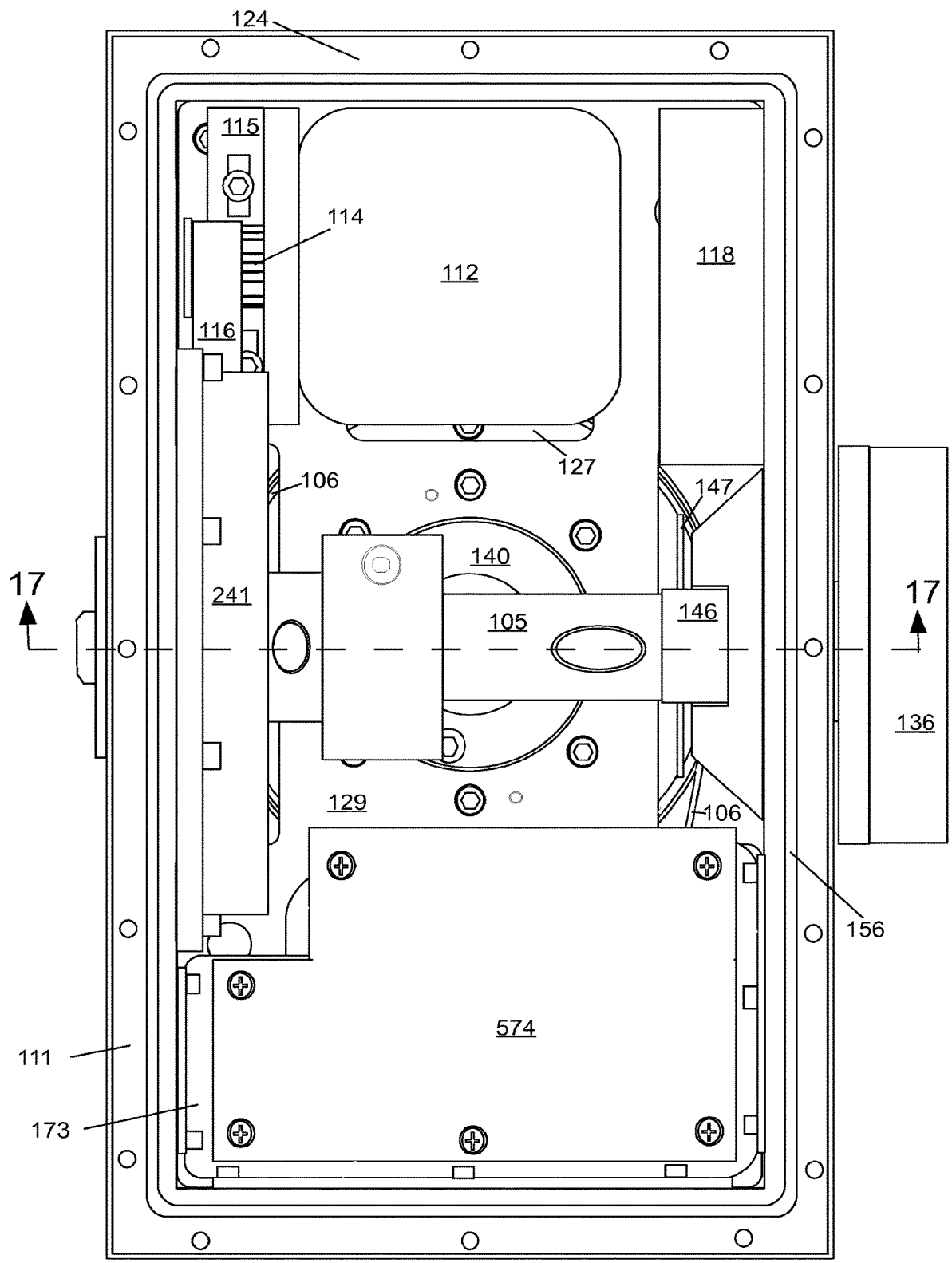
FIG. 18 illustrates a top plan view of an embodiment of the positioning system.

With reference to FIG. 18, the tilt motor 112 and tilt motor gear 114 can be rigidly coupled to the housing 111. The rotor of tilt motor 112 rotates when electrical power is applied which rotates the tilt gear 114 and moves the tilt belt 116 which causes the outer ring 137 of tilt shaft gear 131 to rotate relative to the inner ring 133 coupled to the housing 111. Because the tilt motor 112 is fixed to the housing 111, the movement of the tilt motor 112 causes the tilt shaft 105 to rotate within the housing 111, with payloads 134 and 136 (shown in FIGS. 1-4) tilting in elevation with respect to the housing 111. By controlling the movement of the tilt motor 112 and attached drive mechanism, the first payload 134 and second payload 136 can be accurately rotated to any desired angle of elevation.

To relate the tilt shaft to the described panning devices, rotate the page illustrating FIG. 6 by 90° clockwise and compare this view to FIG. 17. A flange 129 in FIG. 6 attaches the inner ring 133 of the pan shaft gear 127 to the housing 111. In the same manner, a flange 241 in FIG. 17 attaches tilt shaft gear 131 to the housing 111 via inner ring 133. For both embodiments, the outer ring 137 is attached to their respective shaft, but tilt shaft 105 in FIG. 17 steps-down the diameter of the shaft to the left of the gear mounting surface, creating a flange 107, whereas pan shaft 125 of FIG. 6 maintains a large shaft diameter. By constricting the tilt shaft 105 in FIG. 17, the bore in the side of the housing side 121 can be reduced, along with shaft seal 152 and seal shield 155. Size and weight of tilt shaft 105 are reduced by stepping down the diameter of the shaft to the left of the mounting surface on flange 107. The left end of tilt shaft 105 can mount to a payload instead of a base, so it may not require the tubular rigidity afforded by the wide pan shaft 125. By varying the shaft diameter, a device embodiment can be tailored for size, weight, rigidity, and shaft-to-payload interfacing geometry. Further performance metrics can be optimized with consideration as to how the shafts are installed into the housing 111.

With reference to FIGS. 17-23, the tilt shaft 105 penetrates two walls of a unibody structure and is broken into two pieces to permit installation of a shaft piece with an integral shaft flange 107, which may be stronger than a separately attached shaft flange. The left side of tilt shaft 105 installs from the inside and penetrates out side 121 of housing 111. The right side of tilt shaft 105 can be a wide, stepped shaft similar to pan shaft 125, and must insert from the exterior, entering through wall side 123. With reference to FIG. 18, a top-down view illustrates the compact device may not have much wasted internal space, so selections of shaft pieces and their mounting procedure must consider what is physically possible for the technician to perform, not just optimizing size, weight, and rigidity for performance.

With reference to FIGS. 1-4, the purpose of tilt shaft 105 can be to rotate payloads to a desired angle of elevation. A first payload 134 can be attached to one end of the tilt shaft 105 and a second payload 136 can be attached to the opposite end of the tilt shaft 105. The payload 134 has been omitted from most other figures to dedicate the page area to illustrating the moving parts. A shaft end cap can be bolted onto an end of tilt shaft 105 to seal and protect the shaft end if only one payload is desired.

Figure 29:
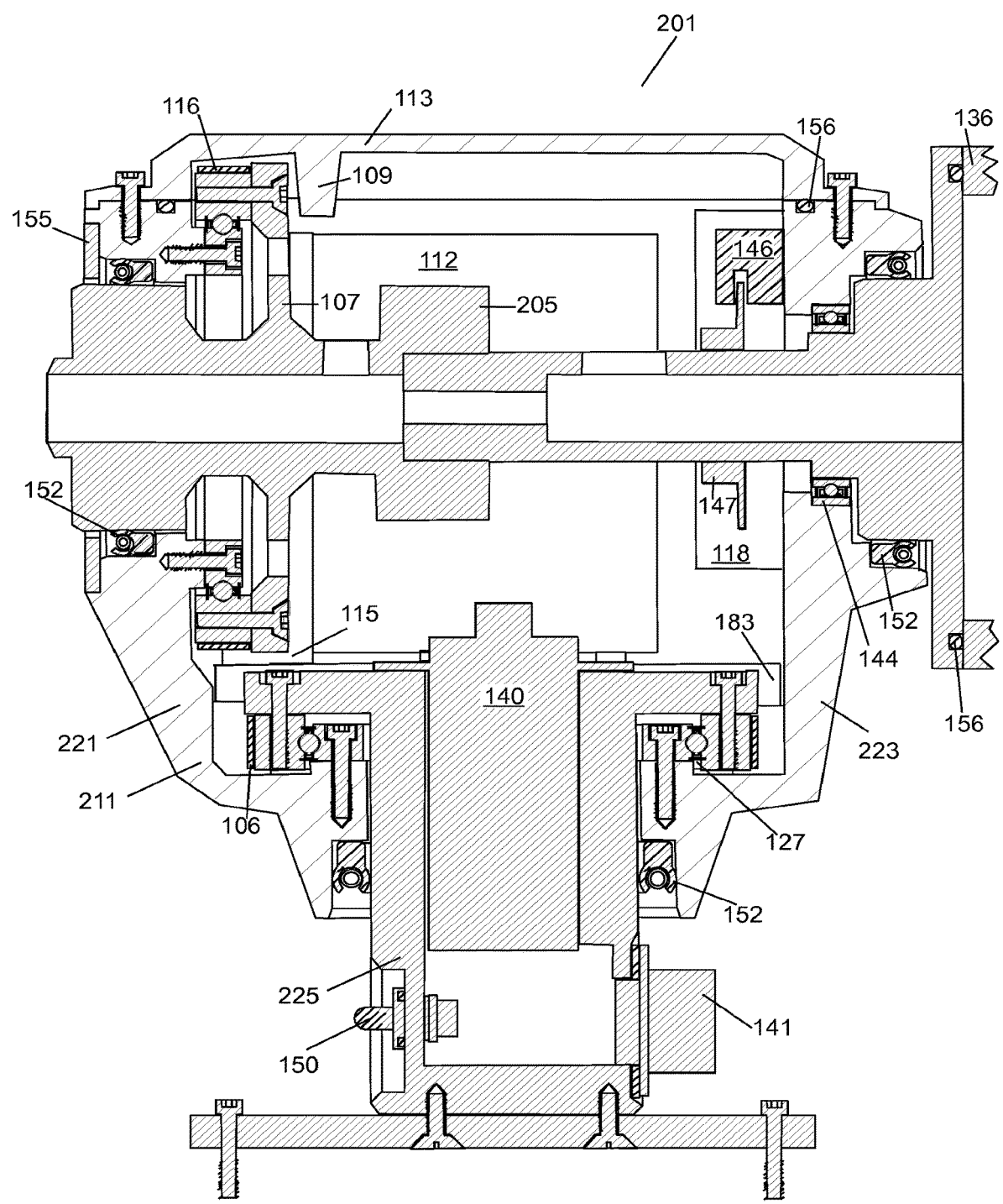
FIG. 29 illustrates a front cross sectional view of an embodiment of the positioning system.

A payload can be integral with the housing 111. Thus, the payload and the housing 111 can be coupled and rotate together in azimuth relative to the pan shaft 125. With reference to FIG. 29, cover 113 can be expanded upward to expand the hollow volume within housing 211 enough to fit a payload device.

Figure 19:
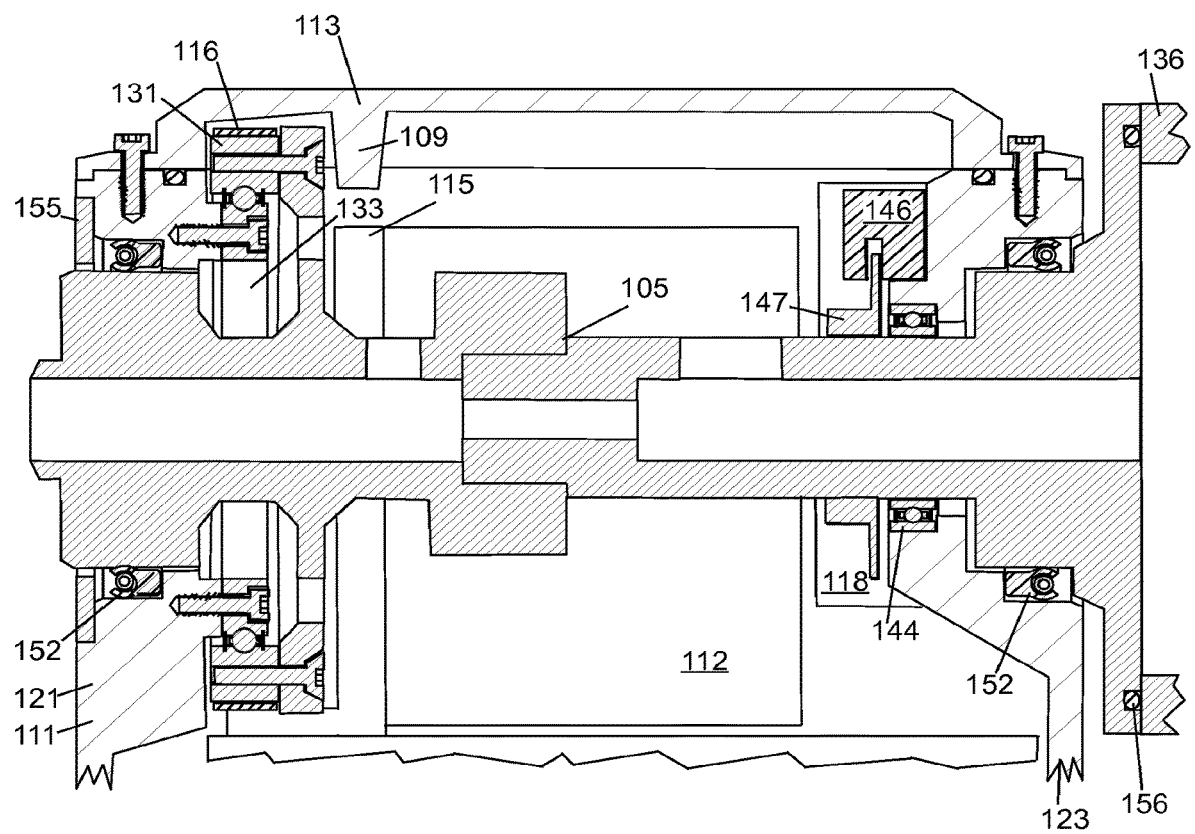
FIG. 19 illustrates a front cross sectional view of an embodiment of the positioning system.
Figure 22:
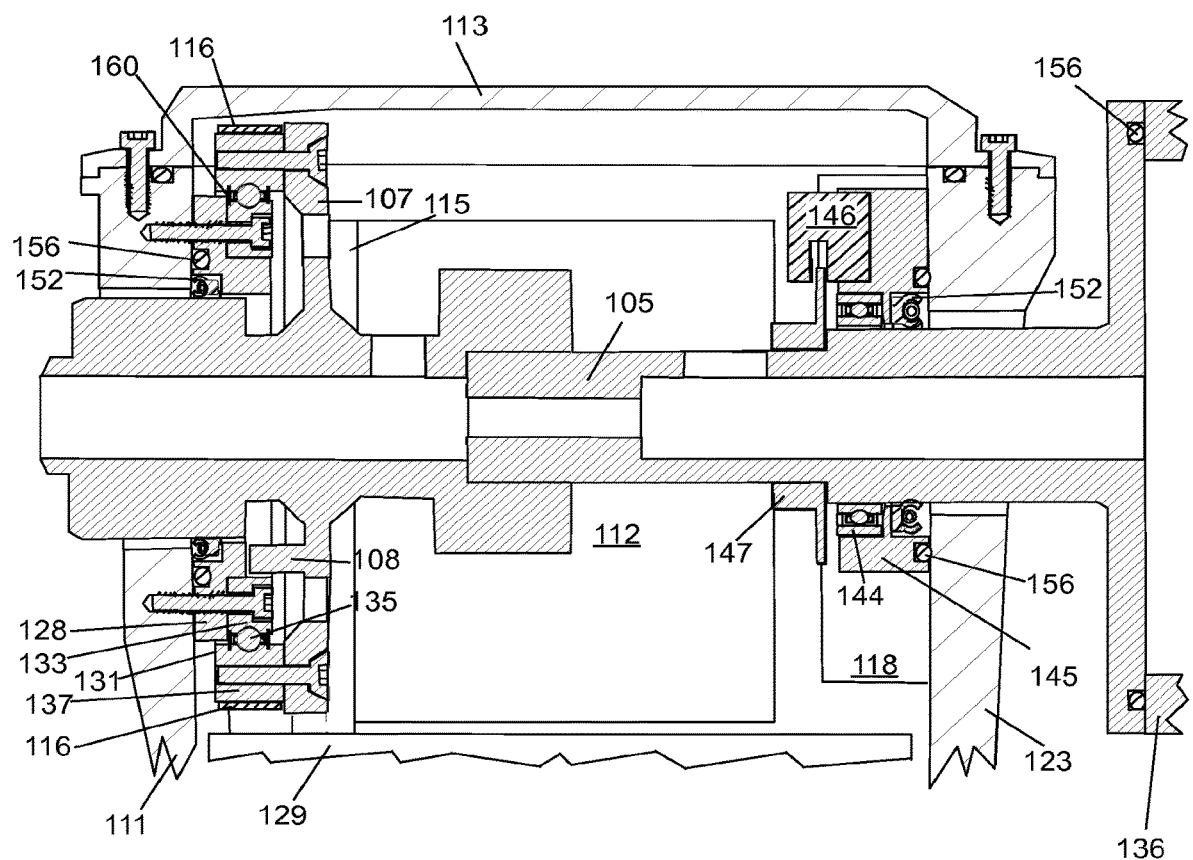
FIG. 22 illustrates a front cross sectional view of an embodiment of the positioning system.

With reference to FIG. 19, bearing mounting bosses on the interior of sides 121 and 123 are undercuts with precision bores that may be difficult and costly to mill into metal stock, though these features may not be an issue for cast or molded construction such as cast metal, injection molded engineering plastic, or graphite fiber composite. In embodiments where the housing walls 121 and 123 do not have an outward draft, or are otherwise crowded inside, integral shaft mounts may be obstructions to assembly and disassembly. With reference to FIG. 22, a removable circular bracket 128 can be placed around the tilt shaft 105 between the inner ring 133 of the tilt bearing 131 and the first side 121 of the housing 111. The inner ring 133 fasteners can extend through holes in the bracket 128 and can be threaded into tapped holes or threaded inserts in the first side 121 of the housing 111. The bracket 128 can include a bore that houses the dynamic seal 152. A second removable tilt shaft bracket 145 can mount a radial bearing 144 against wall side 213. The radial bearing outer race can be tightly press fit into a precision bore in bracket 145, and can have a loose press fit or slip-fit between the inner race of bearing 144 and the shaft 105. While tilt bearing 131 has considerable load capacity, bearing 144 can constrain shaft deflection and complement the load capacity of tilt bearing 131 as a safety factor. Fasteners can extend through holes in the bracket 145 and can be threaded into tapped holes or threaded inserts in the second side 123 of the housing 111. Both brackets 128 and 145 can have precision alignment pins 138 to align the bearings 131 and 144 which will reduce unintended preloading due to shaft misalignment. Molded construction may have challenges or costs associated with the tolerances and surface finishes of the bores in the housing walls and floor, as well as tolerances for the bearing mounting holes and precision bearing alignment pins 138, so brackets 128 and 145 can be solid inserts permanently embedded into the walls during the molding process.

Figure 42:
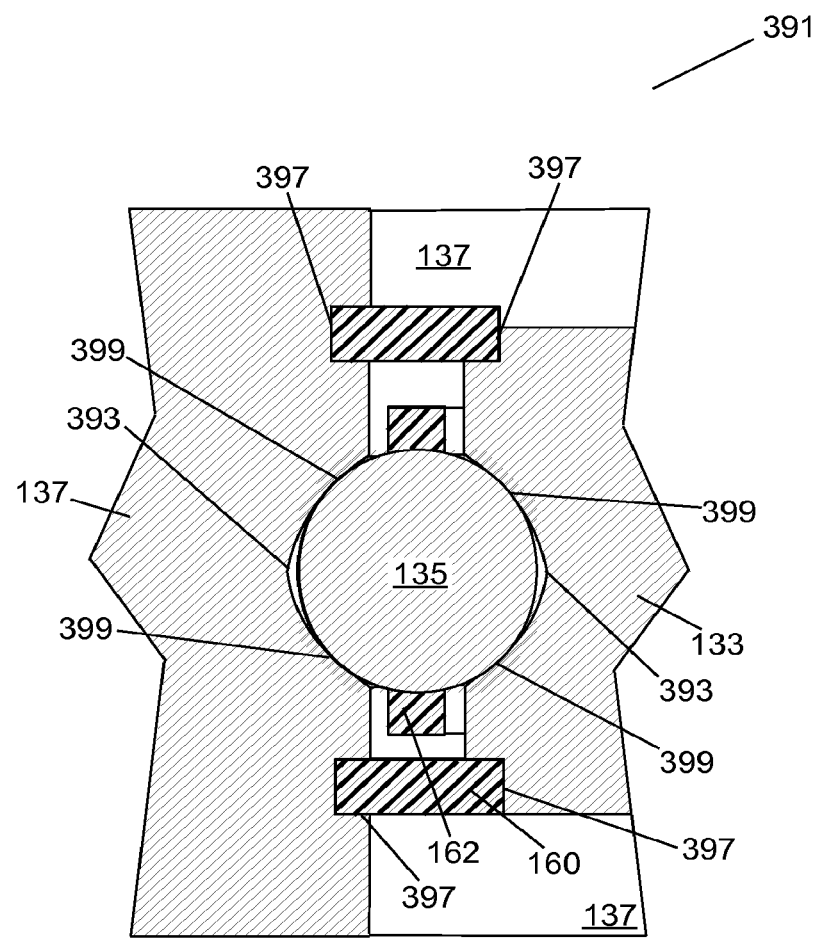
FIG. 42 illustrates a partial front cross sectional view of an embodiment of the turntable bearing.
Figure 43:
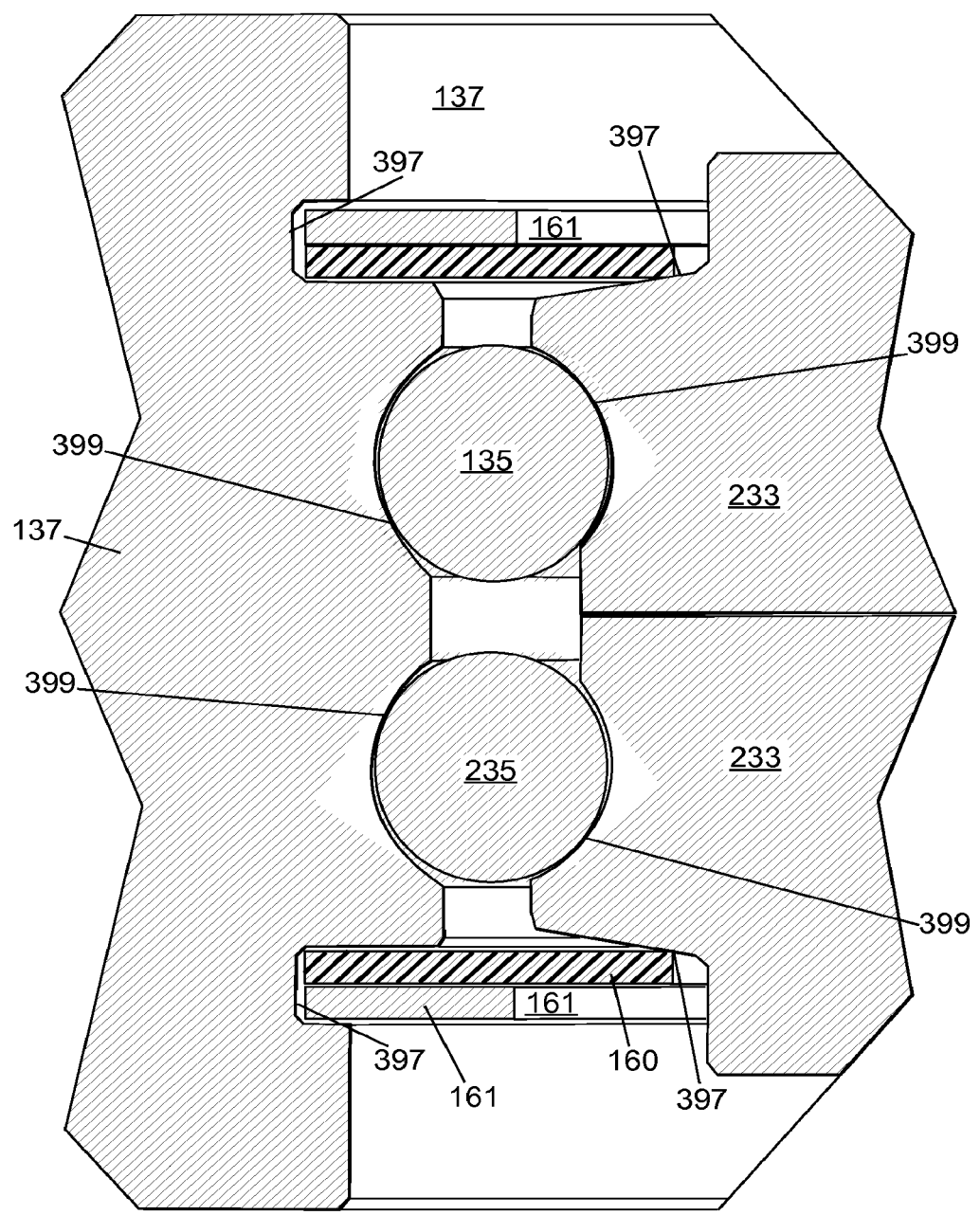
FIG. 43 illustrates a partial front cross sectional view of an embodiment of the turntable bearing.
Figure 44:
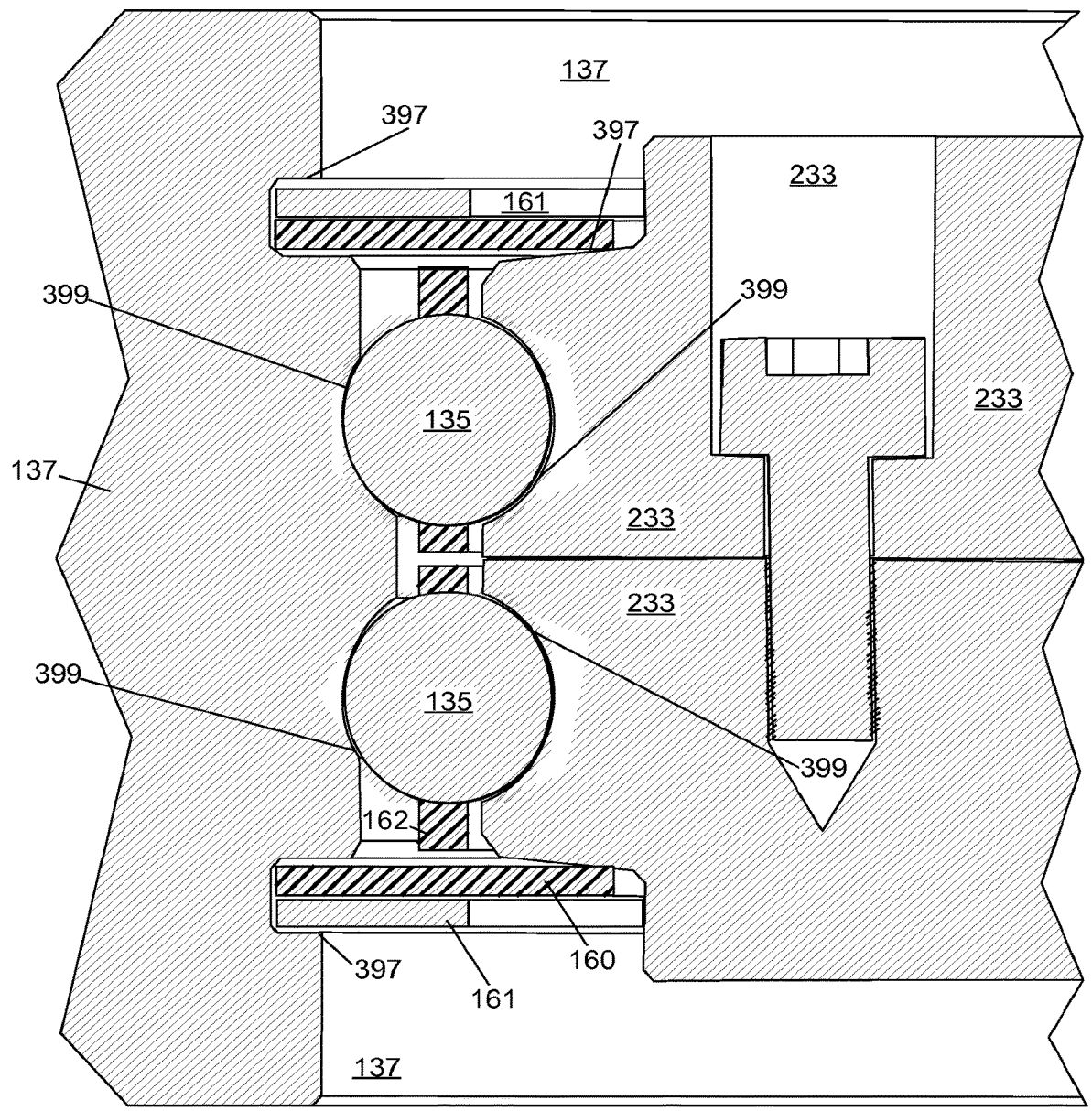
FIG. 44 illustrates a partial front cross sectional view of an embodiment of the turntable bearing.
Figure 45:
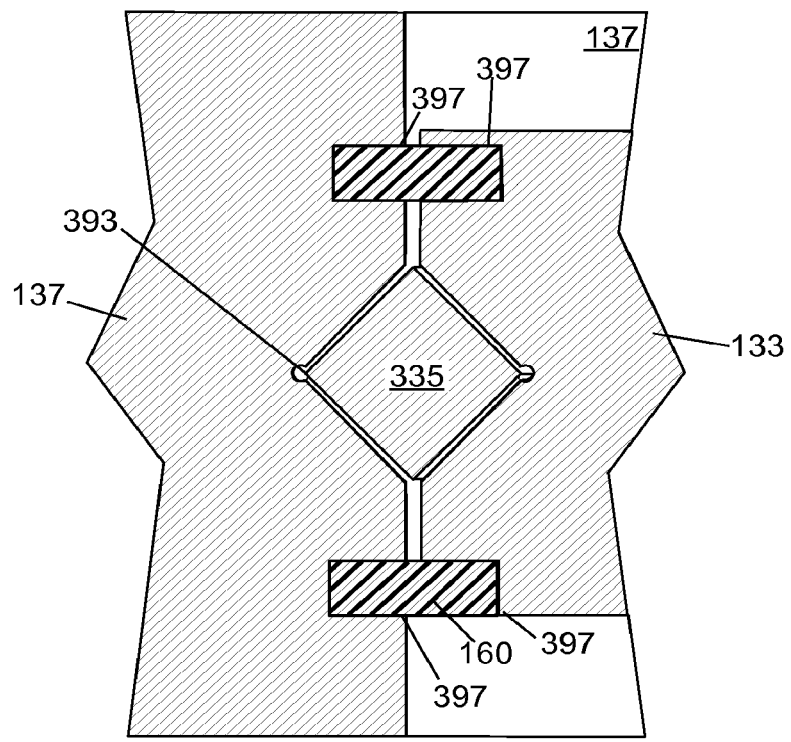
FIG. 45 illustrates a partial front cross sectional view of an embodiment of the turntable bearing.
Figure 46:
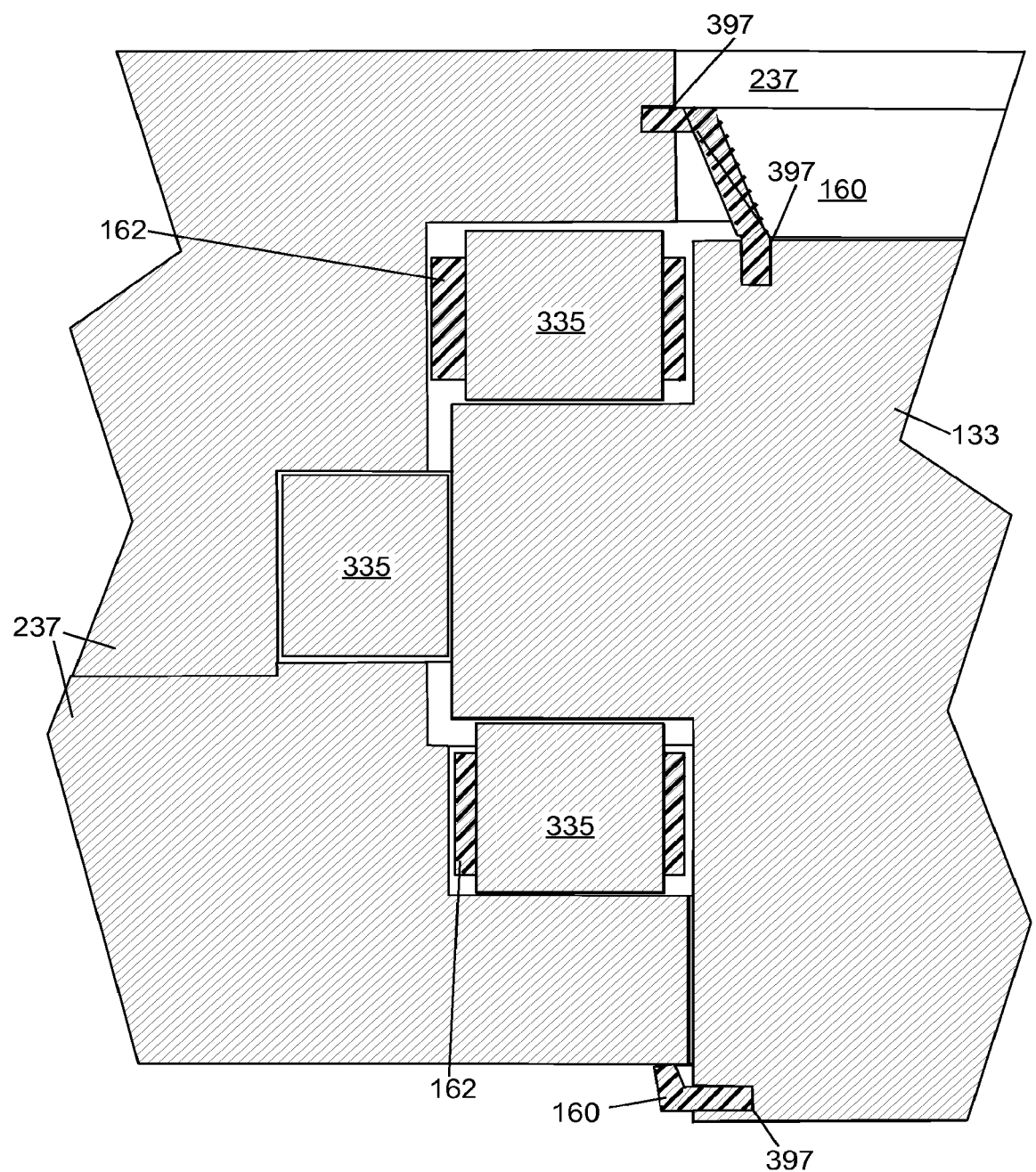
FIG. 46 illustrates a partial front cross sectional view of an embodiment of the turntable bearing.
Figure 47:
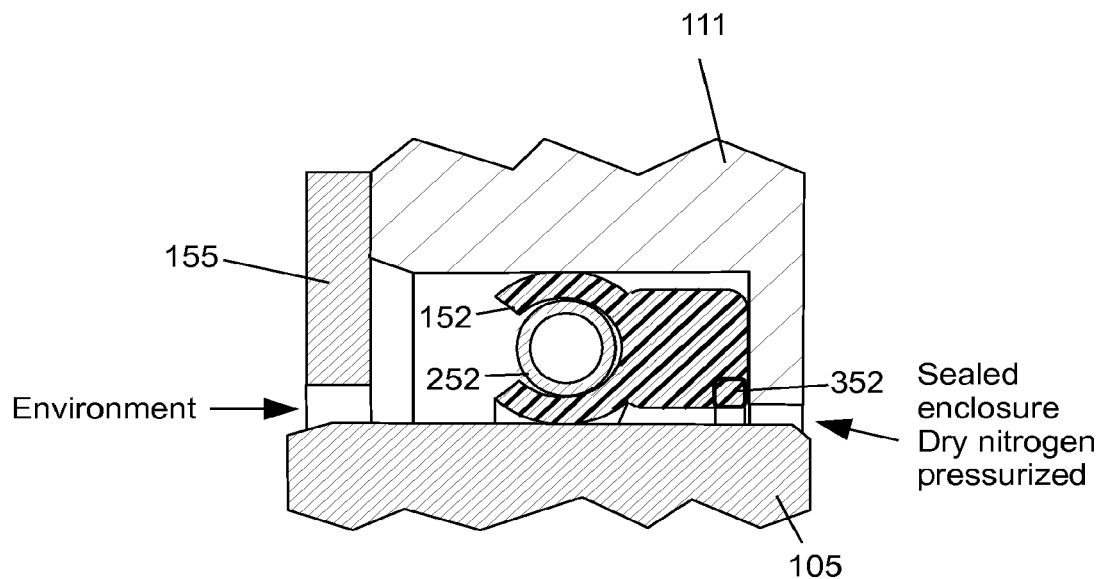
FIG. 47 illustrates a front cross sectional view of an embodiment of a dynamic shaft seal.

With reference to FIG. 19, the turntable bearing 131 may sufficiently handle loads as the sole bearing on the shaft when equipped with high combined load capacity of four-point contact races, duplex angular bearing elements, or roller bearing geometry as illustrated in FIGS. 42-46. With reference to FIG. 42, illustrated is a close-up view of the rolling bearing elements of an embodiment of a turntable bearing. Ball bearings 135 roll between grooves 393 in the edges of the rings 133 and 137. These grooves can be gothic arch raceways that contact the balls 135 at four points 399. A lubricant can fill the balls and raceways to reduce friction, dissipate heat, and prevent corrosion; this lubricant can be electrically conductive to reduce arcing across the balls and lower impedance between the rings 133 and 137 to better effect a Faraday cage. The bearing can include a separator ring 162 to separate the balls. Notches 397 can be cut into the rings to retain face seals for protection from contaminants. With reference to FIG. 43, two rows of balls are stacked to increase load capacity. This is a back-to-back duplex angular bearing with each ball contacting two points 399. Inner ring 133 must be split into two pieces 233 to assemble, while outer ring 137 can remain a thick, single ring capable of accepting an external gear profile. Face seals 160 can be supported with rigid shields 161. To reduce weight, balls 235 can be silicon nitride. Instead of a separator ring 162, silicon nitride balls 235 can be alternated with slightly smaller steel spacer balls 135; however, silicon nitride rollers have reduced load capacity for impact loads and are not electrically conductive. With reference to FIG. 44, balls 135 can contact races at points 399 in a face-to-face duplex angular orientation. A pair of separator rings 162 can space the balls 135. Split inner ring 233 can be fastened together to assemble and preload the bearing, or other presser-flanges can be used. With reference to FIG. 45, a single row of cylindrical roller bearings 335 can be used instead of balls. The rollers can be at an angle to handle a combination of loads. With reference to FIG. 46, three rows of cylindrical rollers 335 can be combined to form a triple row crossed-roller bearing with very high rigidity and load capacity for large and heavy embodiments of the positioning device 101. The outer ring 237 can be split to enable assembly.

Figure 20:
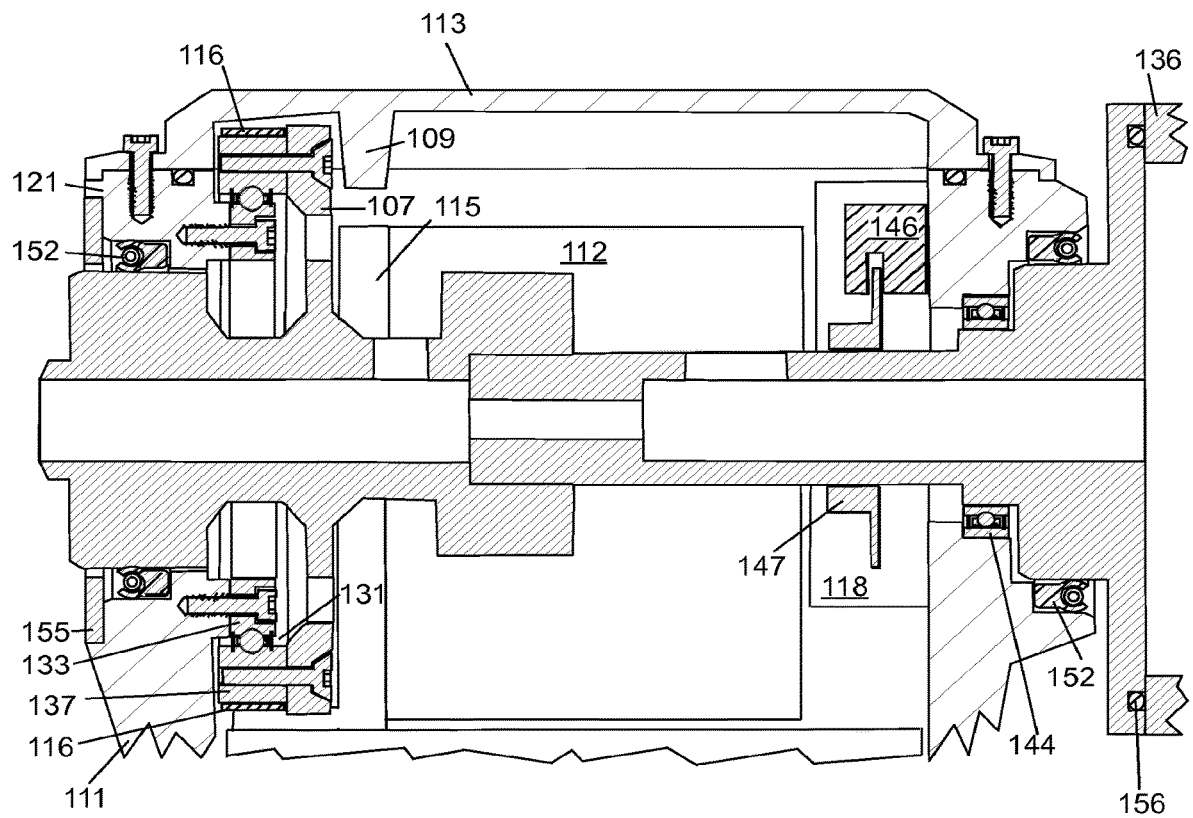
FIG. 20 illustrates a front cross sectional view of an embodiment of the positioning system.
Figure 21:
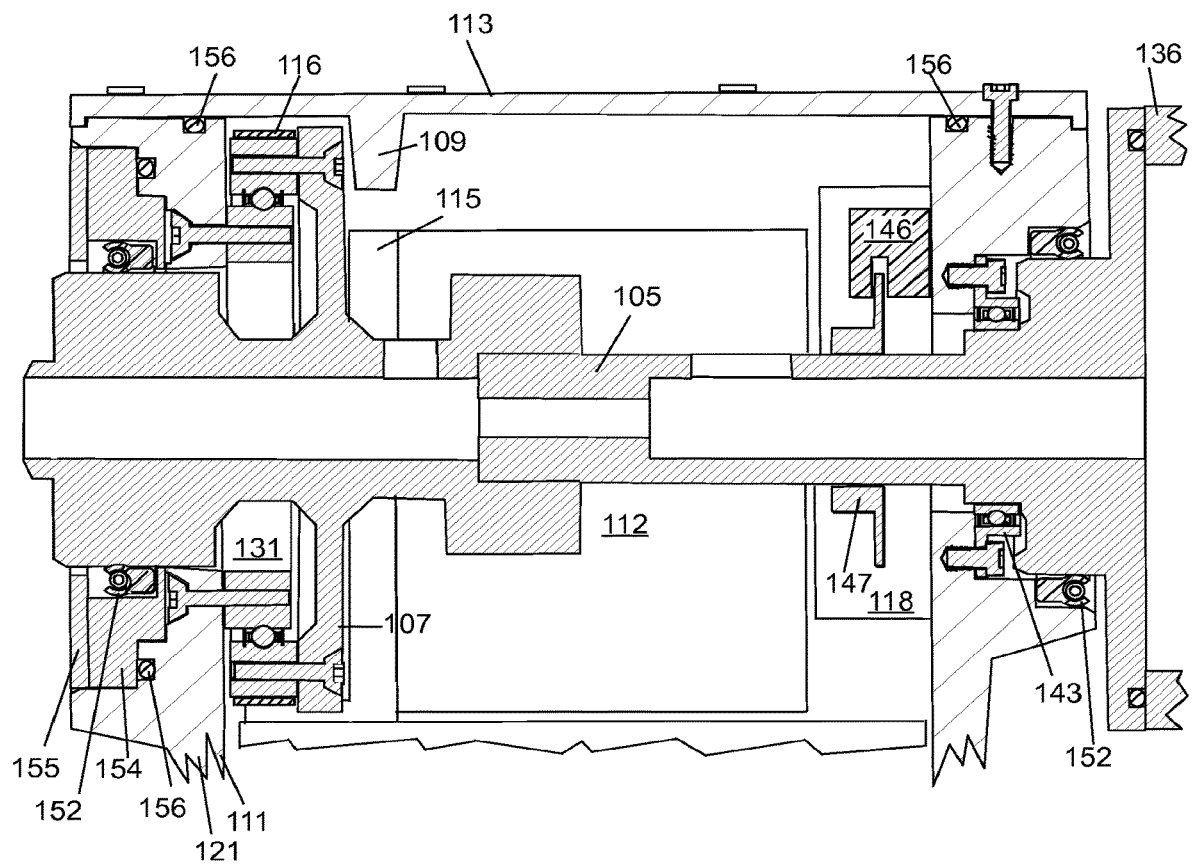
FIG. 21 illustrates a front cross sectional view of an embodiment of the positioning system.

To increase load capacity of the titling shaft assembly without upgrading the four-point angular contact turntable bearing 131 to a larger duplex angular or roller bearing, a second bearing 144 can be rigidly mounted on side 123 to limit the moment and radial loads seen by the tilt bearing 131. With reference to FIG. 20, a bushing or bearing 144 can be placed between the tilt shaft 105 and the second side 123 of the housing 111. This configuration allows the tilt shaft 105 to rotate smoothly relative to the housing. Bearing 144 can be a radial bearing which has a loose fit or light press fit around tilt shaft 105 such that axial loads and some moment loads are delegated to the more capable turntable bearing 131. This bearing can be press fit from the exterior as well as from the interior. With reference to FIG. 21, this radial bearing can be a removable flange-mounted bearing 143 instead of permanently press fit bearing 144. With reference to FIG. 22, radial bearing 144 is press fit into a bracket 145. This bearing assembly can be removed and discarded if the bearing fails, it eliminates expensive or impossible undercuts associated with milling the housing 111, and it may be necessary in assembly procedures which otherwise would be obstructed by the shaft mounts 128 and 145 illustrated in FIG. 22. With reference to FIG. 21, tilt gear 131 can also be mounted from the exterior, with bolts penetrating housing 111 side 121 from the exterior.

With reference to FIG. 17, tilting shafts of the tilt positioners described can also include a slip ring 140 or a similar thru-bore slip ring, and these implementations can be predicted from the panning devices. A shaft penetrating both walls must protect wire harnesses routing between the payloads 134 and 136 and interior of the housing 111. The range of motion for the shaft must be limited to prevent wires from flexing to a critical bend radius or being yanked out of their receptacles. To limit the range of motion of the tilt shaft, tilt shaft mounting flange 241 can have a keyed bore. Lower side 728 can have a wide bore while upper side 628 can have a thick wedge or key. The adjacent shaft diameter of tilt shaft 105 can have a corresponding mating shape whereby upper side 190 can have a small diameter while lower side 191 can have a wide diameter or key. Bore 728 and shaft diameter 190 can provide clearance for rotation until the protruding keys of 628 and 191 rotate into each other to physically obstruct further motion. Other embodiments can use alternative obstructions. With reference to FIG. 22, tilt shaft flange 107 includes a rod-like mechanical stop 108. Under normal range of motion, the protrusion 108 can glide above the top of shaft mount bracket 128. The opposite end of the bracket is raised and shaft stop 108 is too long to pass over the raised key. The position of the stop 108 can coincide with the shallow and raised areas of bracket 128 to pass or obstruct motion within a defined angular range of rotation. With reference to FIG. 19, the underside of housing cover 113 can have a protrusion 109. One or two tilt shaft flange stops 108 can protrude inward, opposite the direction from FIG. 22, but are hidden behind tilt shaft 105 in this view. The protrusion 108 can impact the cover stop 109 to prevent excessive rotation. These three disclosed methods provide for a range of motion less than 360 degrees, though a more complex floating mechanical stop can permit wider ranges such as 540 degrees or even adjustable hard stops.

To sense the angular position before the mechanical stops crash into each other, a position sensor 146 mounted to side 123 can read features in flange 147 rigidly attached to tilt shaft 105. Sensor 146 can be a magnetic sensor or Reed switch sensing magnets attached to flange 147, and the magnets can be patterned to permit an incremental or absolute encoding of the shaft orientation. Sensor 146 can also be an optical device which passes or reflects a beam off of the flange to detect a referenced position. The flange 147 can also be patterned such that the read head 146 output is an optically encoded incremental or absolute position. Flange 147 can be keyed with tilt shaft 105 to precisely angularly align the flange features with the read head point of reference. Tilt shaft 105 can attain a highly consistent angular alignment and accurate position reading for the read head 146 by utilizing keyways and alignment pins 138 at each linkage. With reference to FIG. 36, each turntable bearing ring can have at least two precision alignment holes 396. With reference to FIG. 23, wall side 121 can have precisely located alignment pin holes with alignment pins 138 (not shown) that align with the precision alignment holes 396 of the inner ring 133 of tilt gear 131. Tilt shaft flange 107 can also use alignment pins or holes that engage alignment pins or holes in outer ring 137 to precisely locate the outer ring and tilt shaft. With precision alignment between the tilt shaft bearings 131 and 144, the rotation of tilt shaft 105 can be very smooth and concentric, and may not grind in the tight bores where they pass through the housing walls. To correct further alignment errors and imprecision in the bearings and shaft, a shaft coupler 188 can compensate shaft misalignment, and can include a flange 147 for position sensing. The pan shaft can similarly achieve an angular position reading by mounting a read head to the housing, such as atop pan bearing flange 129, with an encoder wheel mounted to slip ring bracket 180 or atop the flange of slip ring 140. In an embodiment, the turntable bearing 131 has alignment pin holes and pins inserted into the pin holes to precisely locate each ring into the housing wall and tilt shaft flange 107. To precisely and repeatably aim payloads, precision alignment pins 138, keyways, and a shaft coupler can keep shaft components very aligned to each other; mechanical stops can be used to limit rotation and calibrate position; while sensors can be used to calibrate and read the angular position.

The tilting device embodiments must protect the drive components and sensitive electronics from the environment. With reference to FIG. 17, cover 113 can be attached to the top of the housing 111 with a plurality of screws, bolts or other fasteners. A corresponding mounting hole pattern in the mating flange of housing 111 can embed threaded inserts to improve thread strength. A groove in this top flange of housing 111 can have a static seal 156 to prevent leakage past the faying edges of the cover and housing 111. An overbite-type ledge a.k.a. a 'torturous path' on the cover inhibits light, water jets and electrical threats from reaching the seal 156 directly. In an embodiment, a dynamic rotary shaft seal ("dynamic seal") 152 can be placed between the tilt shaft 105 and the inner ring 133 of the tilt bearing 131. This dynamic seal 152 allows the shaft to rotate without breaking an air-tight seal. The right side of tilt shaft 105 also can also have a dynamic seal for a comprehensive sealing solution. With reference to FIG. 47, seal 152 can include a spring 252 to maintain contact under erratic shaft oscillations, high impulses of fluid pressure such as concussive blasts, and the spring can maintain contact if minor shaft misalignment is applying non-uniform pressure. The right side of seal 152 is called the heel, and it can be extended in length for additional rigidity under pressure. Under high external pressures, the base of the heel may extrude between the narrow bore of housing 111 and tilt shaft 105, known as the extrusion gap, which pulls the seal out of alignment with the shaft. An extended heel limits some extrusion, while a harder material co-extrusion 352 can be included to further prevent the seal from extruding through the extrusion gap. Dynamic seals are often delicate so the ends of shaft 105 can be chamfered or rounded, as are the ends of shafts 125, 225, 325, and 425 in all embodiments, to avoid gouging the seal 152 surface. With reference to FIG. 21, the bolt heads and holes on side 121 are sources of leakage from the environment and thus require an outboard seal, even when the bolts include individual seals, but the shaft seal 152 cannot seal properly against the tops of the fasteners and counterbores in this wall. Bracket 154 can effect a proper seal gland for dynamic shaft seal 152, and a backup static seal 156 can prevent contaminants from bypassing the dynamic seal 152. A seal gland shield 155 attaches to the exterior of wall 121 to restrict gas pressure waves and jets of contaminants from entering the seal gland, yet the opening remains wide enough to let trapped water and debris escape. With reference to FIG. 22, the shaft seals have been integrated into tilt shaft mount brackets 128 and 145 inside the housing 111. To prevent contaminants leaking past the seal, each bracket can include a backup static seal 156. With reference to FIG. 5, an air valve 150 can be included, as a separate part or machined directly into the shaft, to purge and pressurize any enclosed, sealed device embodiment or payload.

With reference to FIG. 22, conditioned electrical power can be provided by power supply 118 attached to wall side 123, visible behind the tilt shaft 105. Also visible behind the tilt shaft is tilt motor 112. This motor attaches to adjustable tilt motor bracket 115 which fastens into the housing 111 via pan bearing flange 129. With reference to FIG. 18, an above plan view of an embodiment is illustrated, with the housing cover 113 omitted for clarity. FIG. 18 is similar to the panning device of FIG. 9, but includes the tilt shaft 105 drive mechanism which includes a tilt motor 112, a tilt motor gear 114 and a tilt belt 116. The tilt motor 112 is coupled to the housing 111 and positioned between a fourth side 124 of the housing and the tilt shaft 105. The tilt motor gear 114 is coupled to the tilt motor 112 and drives the tilt belt 116 that surrounds the outer ring 137 of the tilt bearing 131. The tilt motor 112 and pan motor 102 can be mounted on the opposite sides of the tilt shaft 105 within the housing 111 which can result in a positioning device that has a balanced weight distribution of components. Tilt motor 112 is rigidly mounted to tilt motor bracket 115, said bracket equipped with slots to tension the tilt belt 116 through a range of adjustment. In another embodiment discussed later, the tilt motor is attached and tensioned with a ratcheting or wedge mechanism which is less likely to break loose under vibration and shock than bracket 115. Once the tilt belt 116 is tensioned, tilt motor bracket 115 is fastened into position atop pan bearing flange 129 or similar structure rigidly attached to the housing. Tilt motor 112 has a tilt motor gear 114 attached to its rotor shaft, with tilt belt 116 wrapped around tilt motor gear 114 and tilt shaft gear 131. The inner surface of the tilt belt 116 and the outer surfaces of the outer ring 137 and tilt motor gear 114 can have corresponding teeth to prevent slipping between the tilt belt 116, the outer ring 137 and outer surface of tilt motor gear 114. When the motor is actuated, the tilt motor gear 114 drives the tilt belt 116, which rotates the outer ring 137, which rotates tilt shaft 105 via tilt shaft flange 107. To prevent the belt from walking off the gears, shaft gears 127 and 131 and motor gears 114 and 104 can include flanges to retain the belts 106 and 116. Alternatively, with reference to FIG. 23, abutting features to the gears can serve as flanges; for example, tilt shaft flange 107 can have a slightly larger diameter than tilt shaft gear 131 to serve as a retaining flange from the belt 116 walking inward, while the interior wall side 121 can be close to the tilt shaft gear 131 to prevent the belt 116 from walking outward. Similarly, pan belt 106 can be retained by the top of pan shaft 125 being slightly larger than the diameter of pan shaft gear 127, while the underside of pan bearing flange 129 can serve as a low roof to block the belt 106 from walking upward. Belts 116 and 106 can also be belts with peaked teeth that tend to center the belt, and the belts can include tensile members woven in a pattern that resists walking off center.

FIG. 23 illustrates a front sectional of a complete dual-axis pan-tilt positioning device with the section plane slicing through the centers of the pan and tilt axes. Having comprehended various embodiments of single-axis panning-only devices and tilting-only devices, this dual axis device 101 can be understood as a composite of the panning device of FIG. 6 and the tilting device of FIG. 19. Broken view lines direct towards various top-down plan views in FIGS. 24-28; the broken lines route through the drawing in indirect paths to isolate features of interest instead of taking horizontal sectional slices. Unlike the true top sectional views of FIGS. 7-19 and 15-16, the top-down plan views of FIG. 24-28 are not sectionals and have no sectional hatching, rather components above the horizontal broken view lines in FIG. 23 have generally been removed from consideration to avoid distraction from the features most germane to the invention claims.

Figure 24:
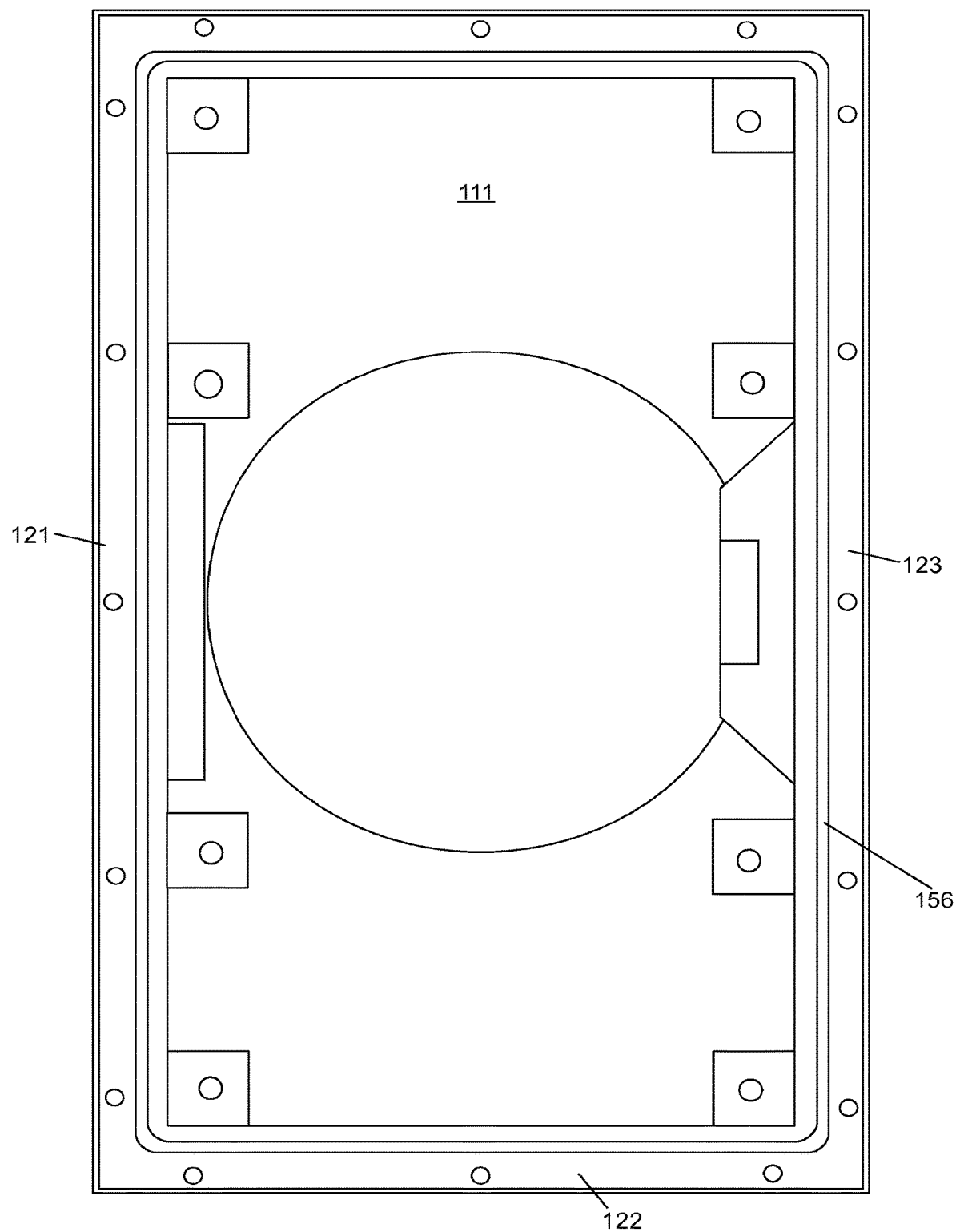
FIG. 24 illustrates a partial top plan view of an embodiment of the positioning system.

With reference to FIG. 24, illustrated is a partially assembled device 101. An un-sectioned housing 111 is seen from above, with the cover 113 omitted from view to expose all of the interior components; these figures are meant to depict what an assembly technician would see at various stages of fabricating the device 101. Only main housing 111 is in view, with features of the floor exposed. Unlike the sectioned top views of FIGS. 7-10, we can see that the tilt bearings 131 and 144 mounting bosses on the wall sides 121 and 123 could provide obstructions for assembly when housing 111 is dimensioned as small as possible to create a compact positioning device. The top of housing 111 has a large flange with a groove filled with static seal 156, and many threaded holes outside of the seal groove permit the cover 113 to attach with a consistent, even, high pressure to maintain a tight environmental seal and low-impedance electrical shield bond.

Figure 8:
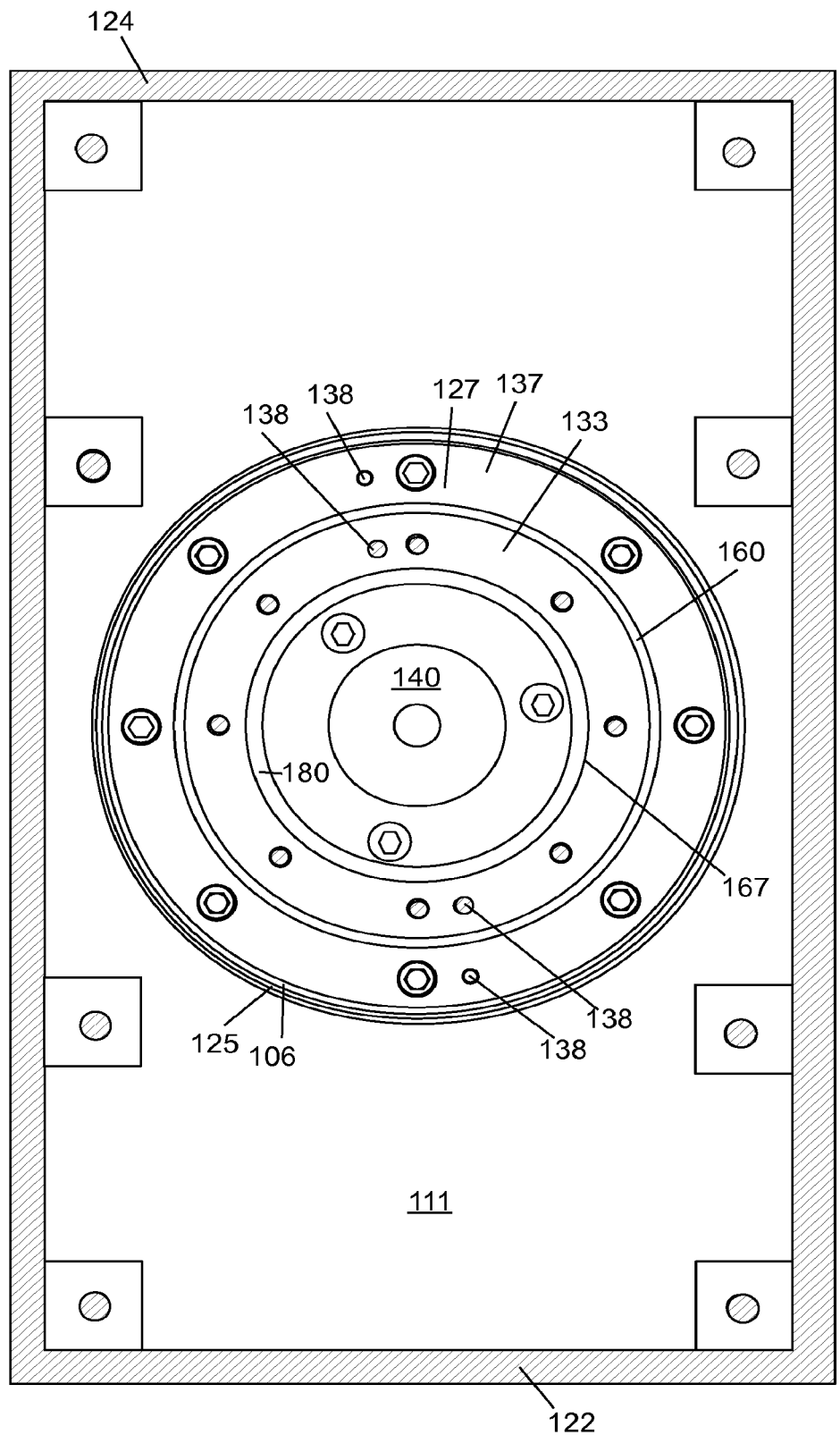
FIG. 8 illustrates a top cross sectional view of an embodiment of the positioning system.
Figure 25:
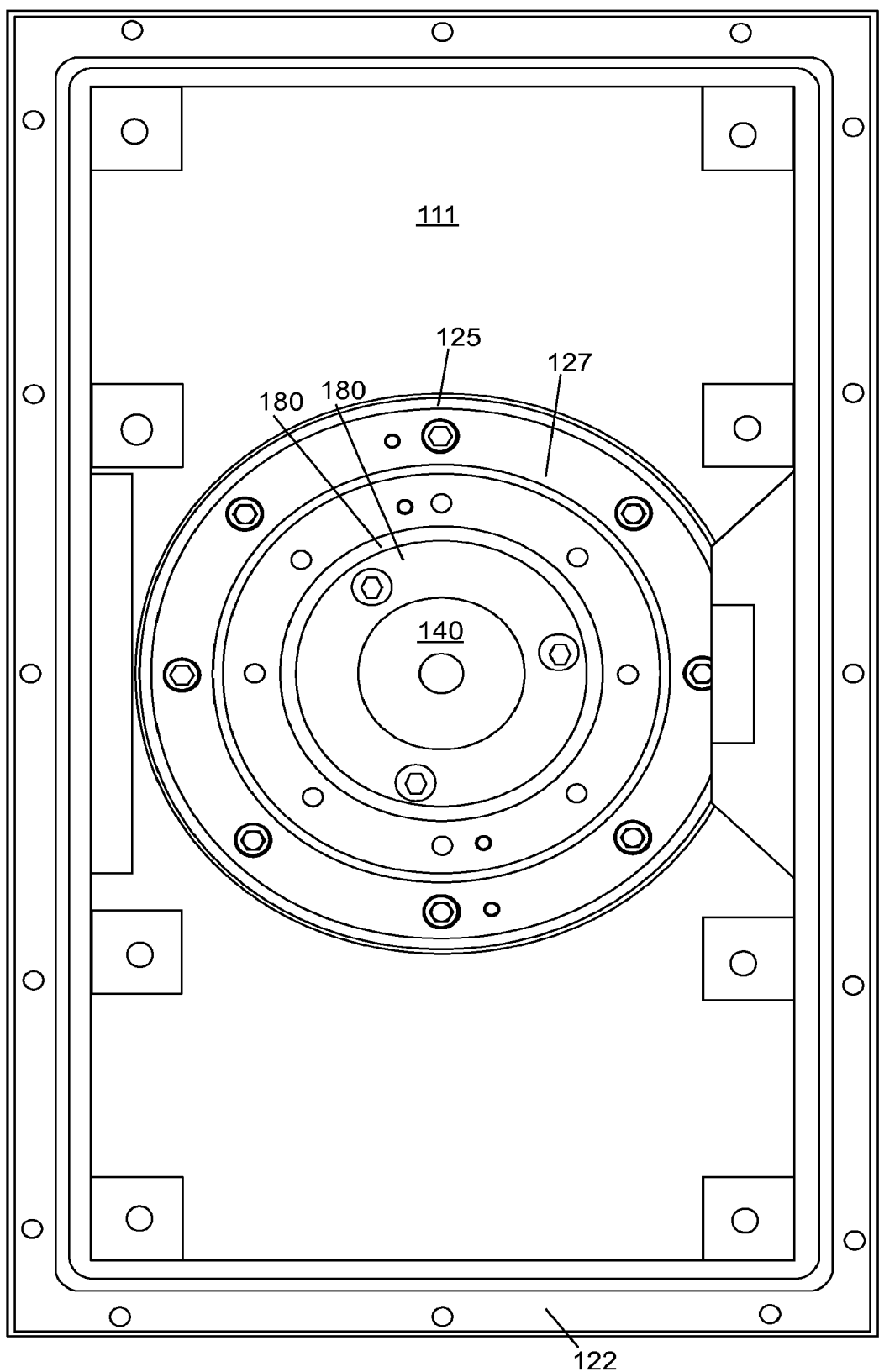
FIG. 25 illustrates a partial top plan view of an embodiment of the positioning system.

In FIG. 25, a view of the same embodiment of FIG. 24, but taken slightly higher in elevation, is an un-sectioned view of FIG. 8 which illustrates a device partially assembled to afford clarity not conveyed by the sectional drawing of FIG. 8. The pan gear 127 sits atop pan shaft 125, with slip ring 140 supported by slip ring bracket 180. Around the perimeter are eight threaded posts for pan bearing flange 129 to fasten into the housing 111.

Figure 26:
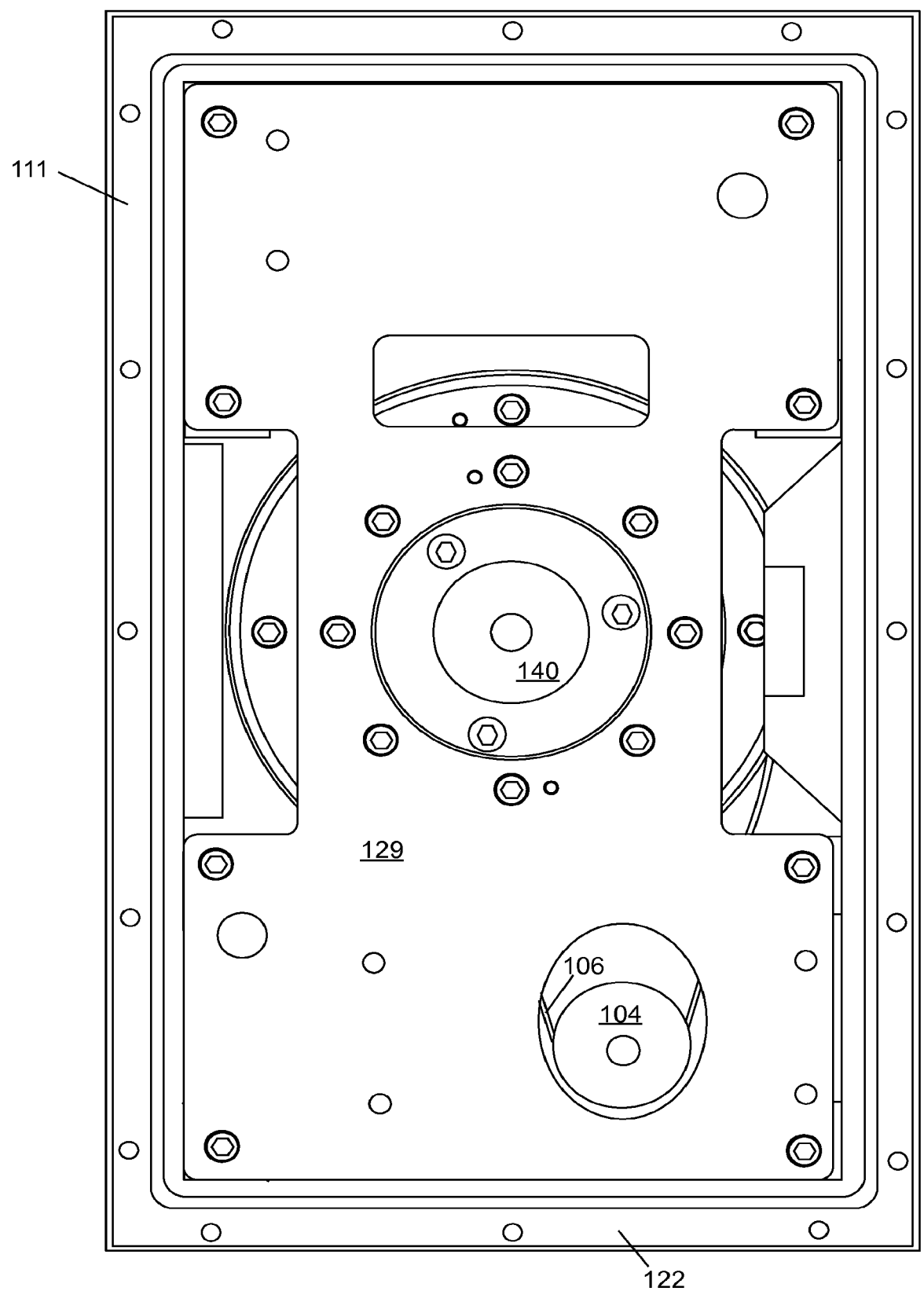
FIG. 26 illustrates a partial top plan view of an embodiment of the positioning system.

With reference to FIG. 26, an un-sectioned view of a device further in assembly reveals the cutouts in pan bearing flange 129 are required to clear the tilt shaft bearing mounts as well as to provide access to the fasteners and alignment pins 138 of outer ring 137. Pan bearing flange 129 is visible as a rigid member anchoring the pan shaft assembly to the main enclosure structure 111. Cutouts in the pan bearing flange 129 can be used to access the bolt pattern of pan turntable bearing outer ring 137, provide access to install and adjust pan belt 106, and reduce weight of the flange.

Figure 4:
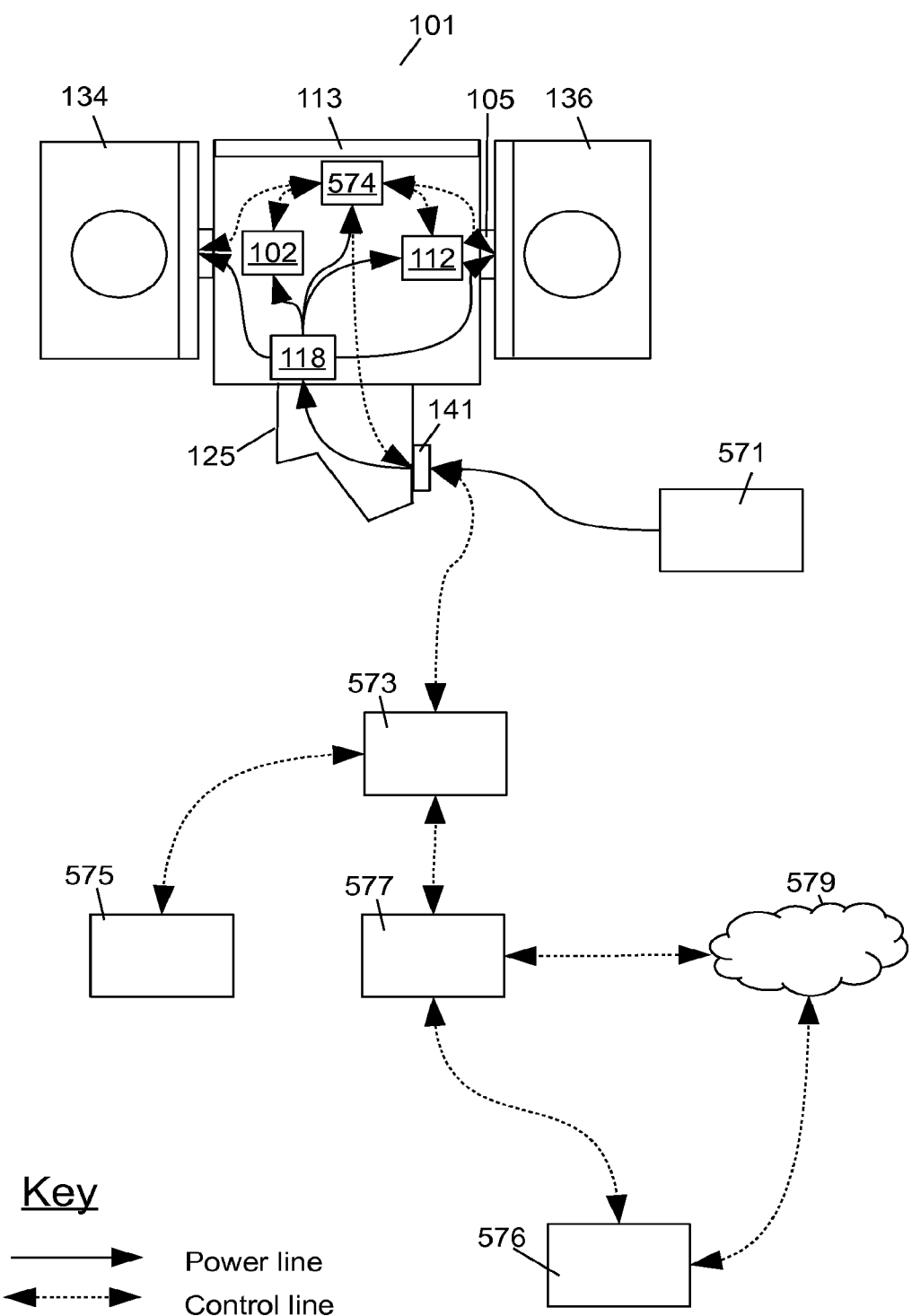
FIG. 4 illustrates an electrical power and control systems diagram of the positioning system.
Figure 27:
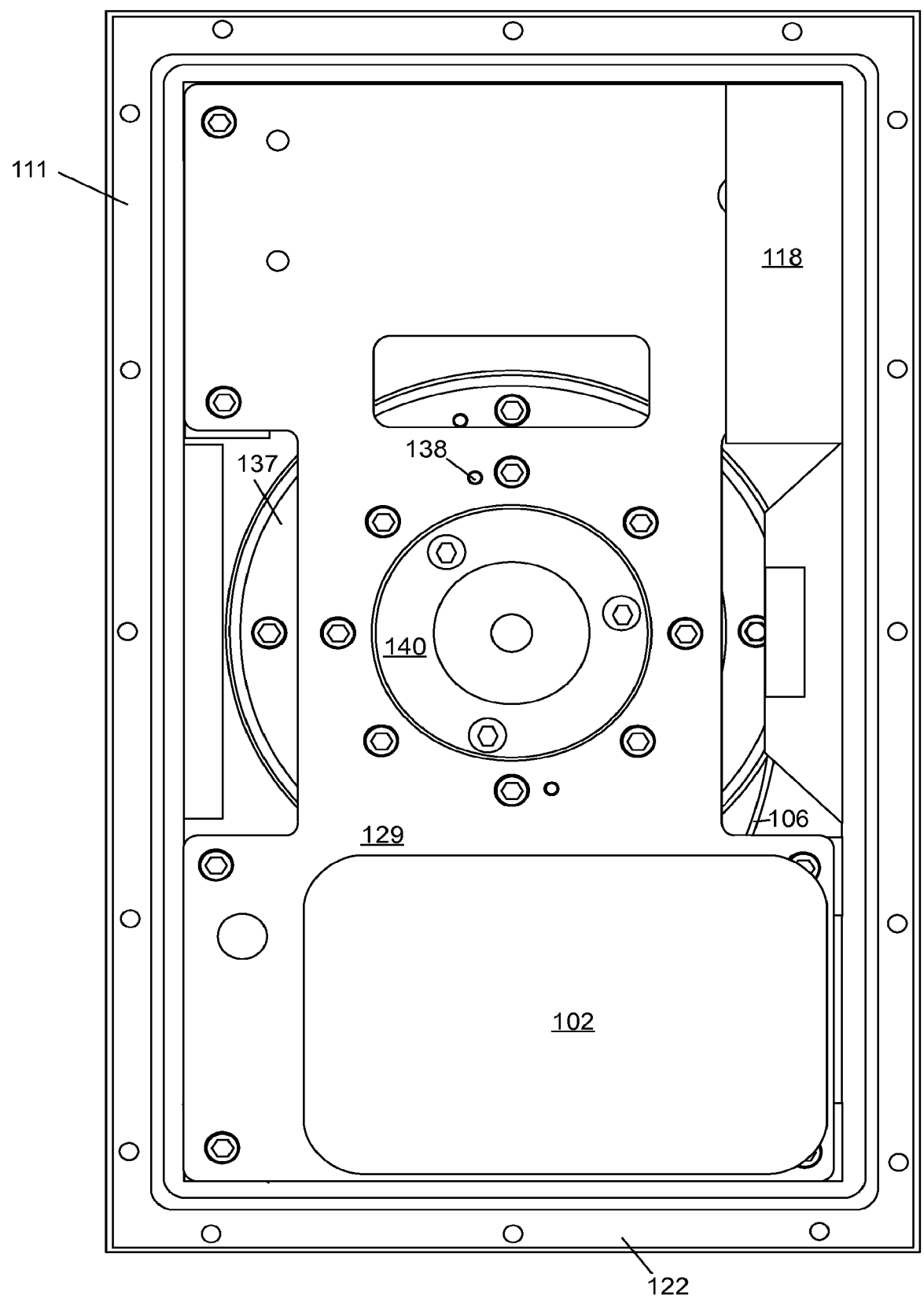
FIG. 27 illustrates a partial top plan view of an embodiment of the positioning system.
Figure 28:
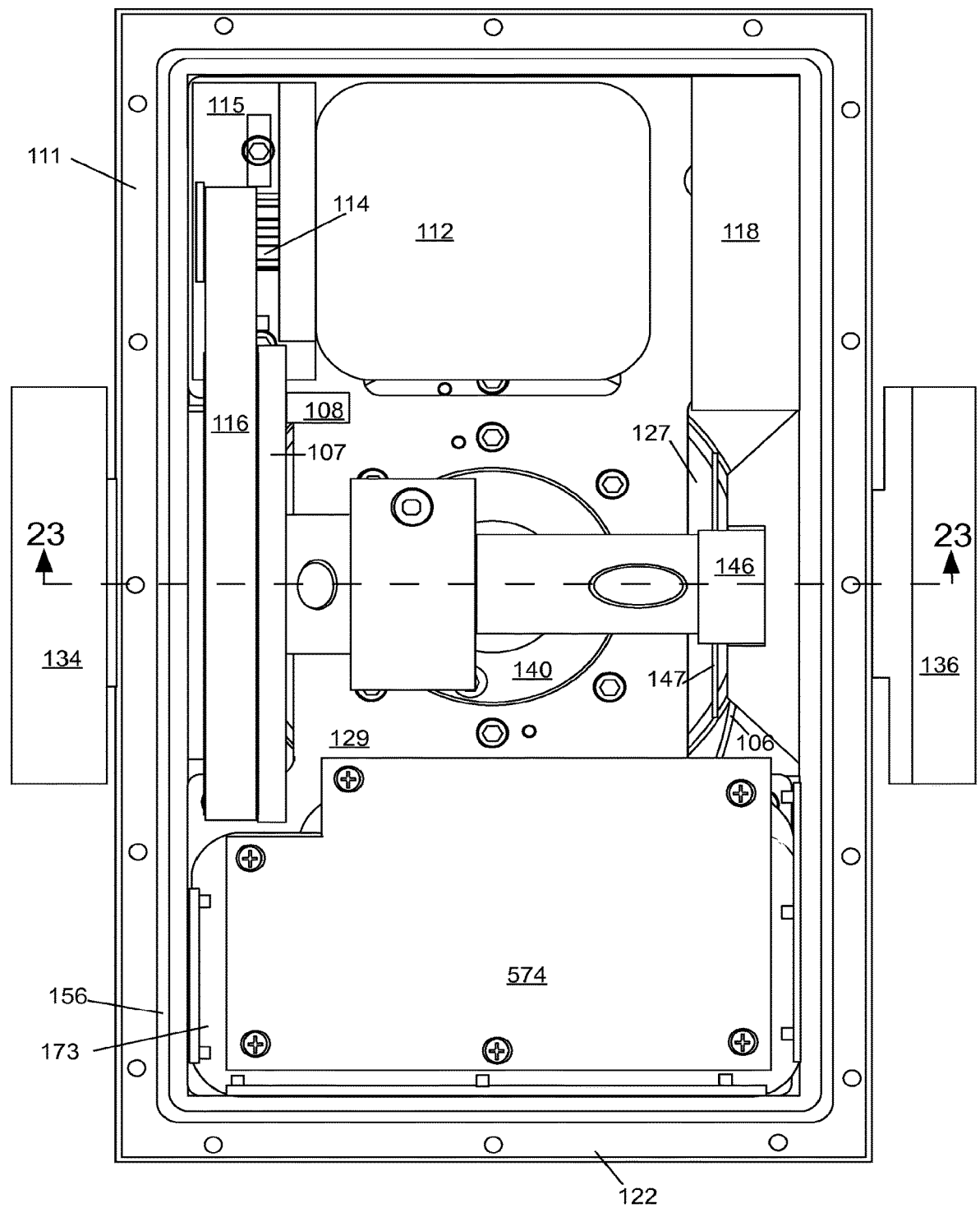
FIG. 28 illustrates a complete top plan view of an embodiment of the positioning system.

With reference to FIG. 27, the pan motor 102 is installed, along with power supply 118. With reference to FIG. 28, a view of device 101 is illustrated, fully assembled except for the housing cover 113. Tilt shaft 105 is orthogonally positioned above pan shaft 125 to reduce moment loads that reduce the efficiency of motion, such inefficiencies reducing the maximum permissible weight of payloads and speed they can be rotated. A tilt shaft mechanical stop 108 is now visible, where it had been obscured behind tilt shaft 105 in front sectional views. A new component is introduced in this view, central electronics controller 574, which can be an embedded processing platform for controlling the motors; controlling the payload devices; processing and encoding sensor data such as video; monitoring position sensors; actuating the motors to counteract sensed motion in the base to actively stabilize the payloads; monitoring the power supply 118; monitoring internal environmental sensors such as humidity, temperature, and gas pressure; processing commands from the user(s) generated by HID 575 or an external controller 573 as illustrated in FIG. 4; operating the device autonomously with an onboard AI; or performing any other task common among embedded computers. Controller 574 is mounted to the housing 111 by internal controller bracket 173. A thermal pad or compound between a side of controller 574 and bracket 173 can conduct electronics generated heat into bracket 173, heat which then conducts into the walls of housing 111. Heat pipes can be attached between high heat generating components on the controller and the housing 111 or cover 113 for more direct and efficient dissipation of generated heat. The external surfaces of housing 111 and cover 113 can have fins or pins to dissipate the heat into the air.

Figure 30:
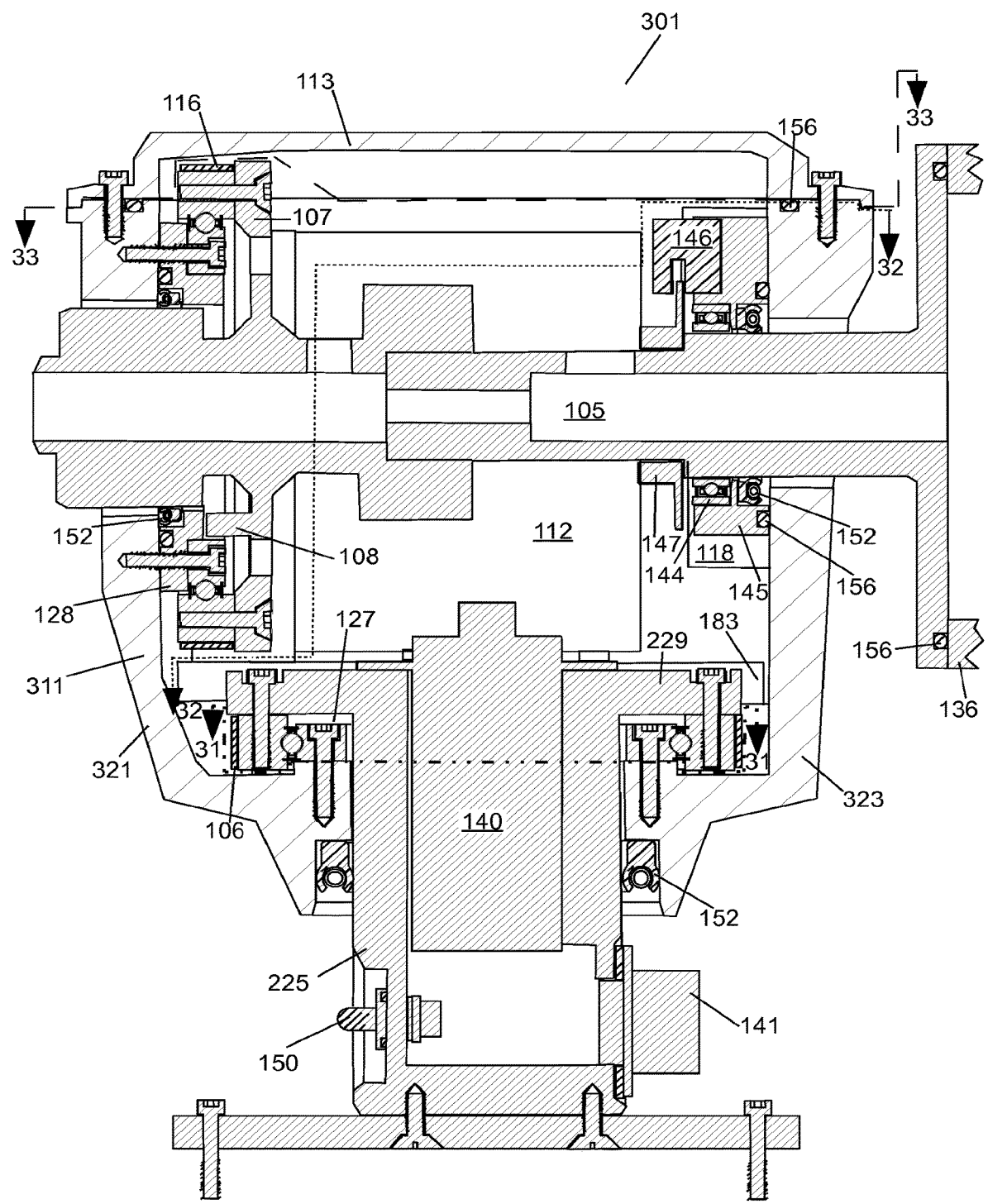
FIG. 30 illustrates a front cross sectional view of an embodiment of the positioning system.
Figure 31:
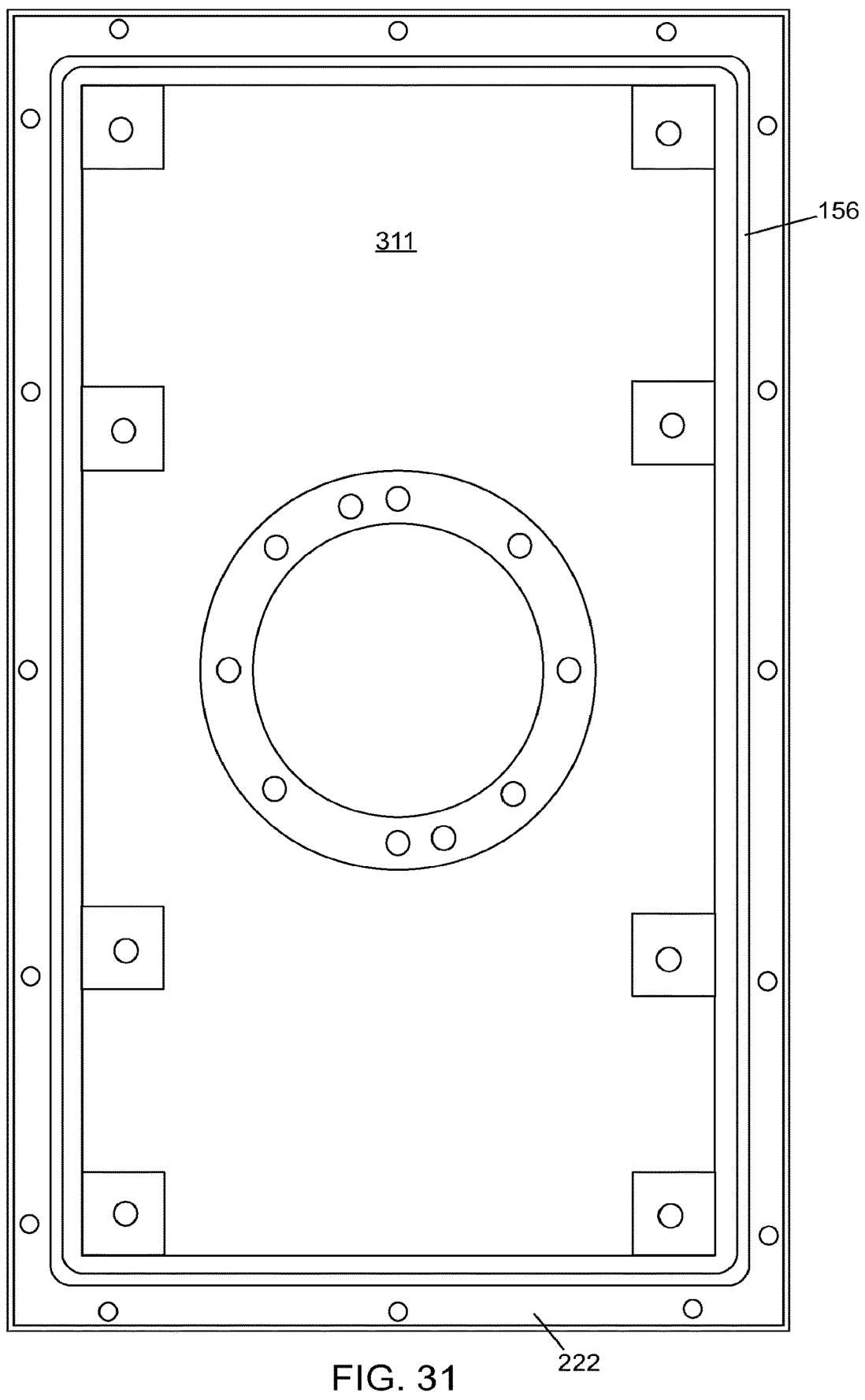
FIG. 31 illustrates a partial top plan view of an embodiment of the positioning system.
Figure 32:
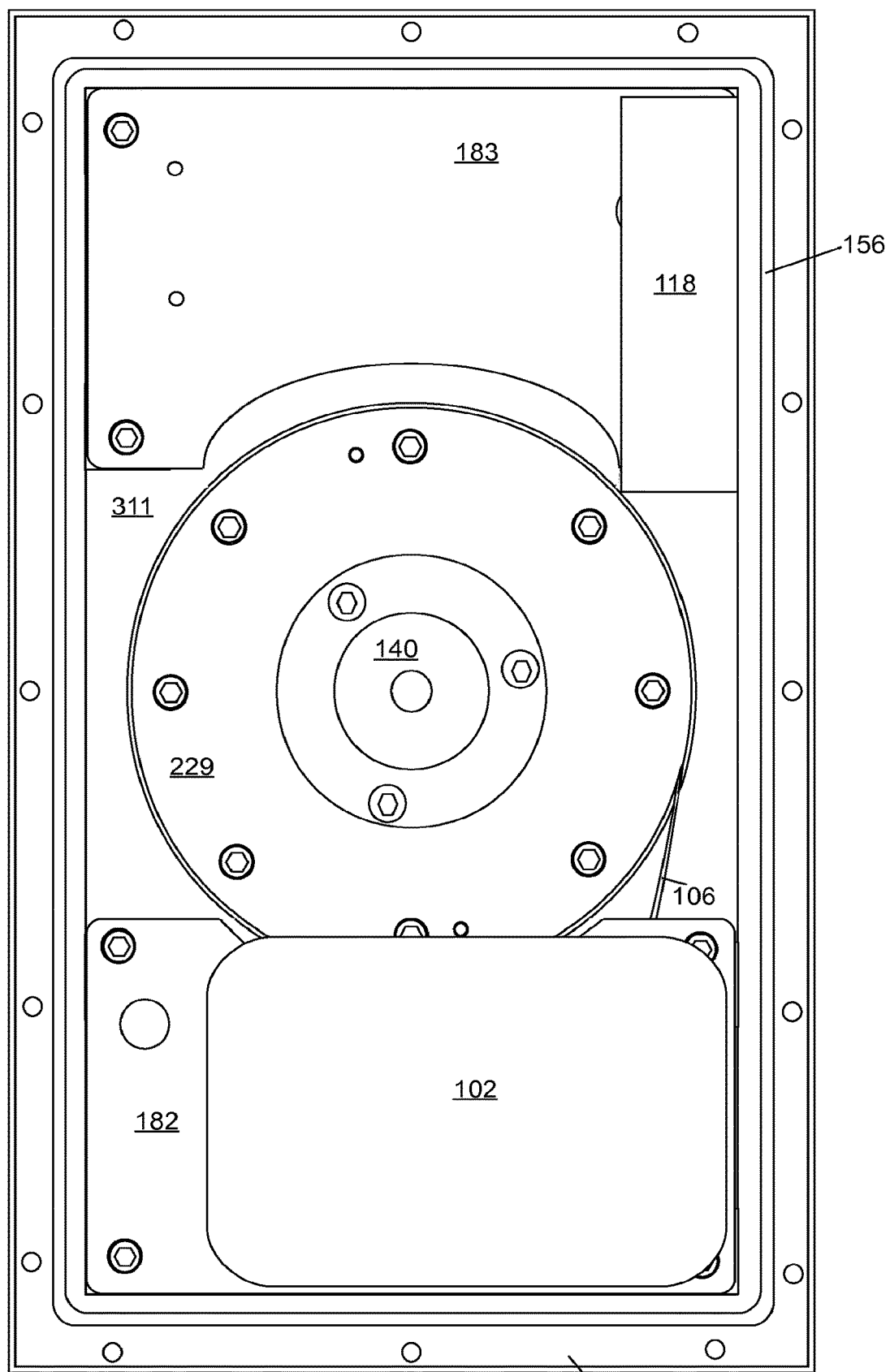
FIG. 32 illustrates a partial top plan view of an embodiment of the positioning system.
Figure 33:
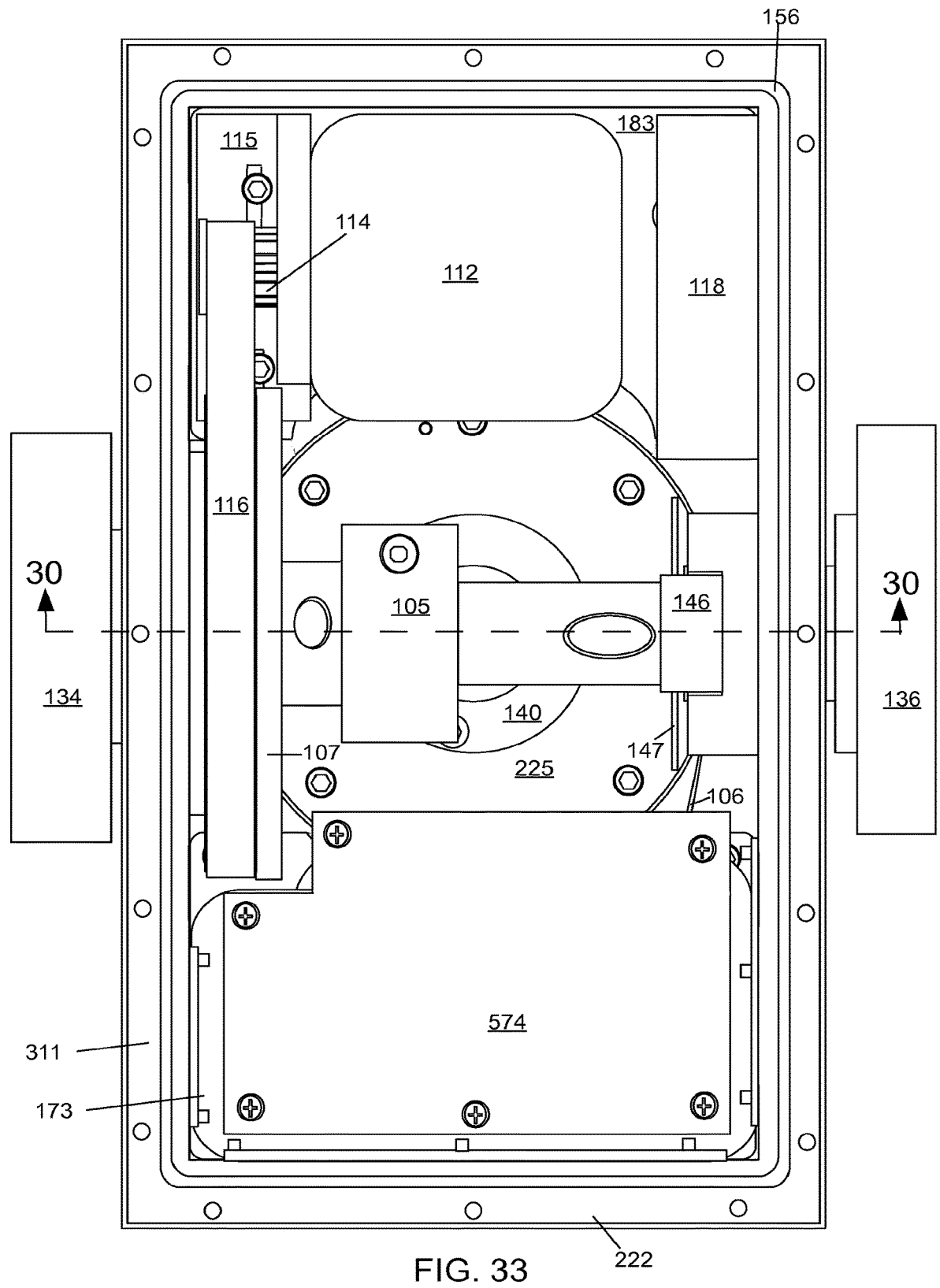
FIG. 33 illustrates a complete top plan view of an embodiment of the positioning system.

With reference to FIG. 29, another dual-axis positioning device 201 is illustrated. This device can be comprehended as a composite of the panning device of FIG. 14, with the tilting device of FIG. 20. With reference to FIG. 30, a third dual-axis embodiment is produced by the combination of the pan device of FIG. 14 with the tilting device of FIG. 22. FIG. 30 is elaborated through top-down plan views in FIGS. 31-33. Because the upper components block view of components and important features buried deeper within, FIGS. 31-33 have been provided to focus attention to features at various depths within the complete positioning device. A horizontal broken line along the tilting axis 105 in FIG. 33 denotes the section plane for the view of FIG. 30. With reference to FIG. 31, housing 311 is shown; it does not include integral tilt shaft mounts, rather the walls can be vertically straight. With reference to FIG. 30, Pan bearing 127 installs from above, its inner ring 133 bolting into an annular boss around the bore in the bottom of housing 311, also visible in FIG. 31. Pan shaft 225 is inserted from above, its flange 229 bolting into outer ring 137. With reference to FIG. 32, a pan belt 106 can be wrapped around the outer ring 137 of pan shaft gear 127. A pan motor support plate 182 can rigidly attach to the housing 311 to create a level platform to mount pan motor 102 and an adjustable motor mount, and a second platform 183 can be mounted to the housing 311 to affix the tilt motor via tilt motor bracket 115. Motor support plates 182 and 183 can have cutouts for access to wrap pan belt 106 around the pan motor gear 104, and minimize weight. With reference to FIG. 33, a complete top view of device 301 is illustrated, except for housing cover 113.

With reference to FIG. 34, a dual-axis positioning device 401 with a pan-through shaft is illustrated. Because pan shaft 125 is now extended through the roof 413, the tilt shaft 105 must be shifted off the pan axis for clearance. The pan-through shaft can be a single shaft or a second shaft 425 that rigidly attaches to pan shaft 125, or passes through the center of pan shaft 125 to bolt directly into the mounting base. As with the tilt shaft assemblies, a second bearing 144 can be used on the roof opposite the pan shaft gear 127 to constraint eccentric motion, radial loads, and moment loads that could damage the bearings of pan shaft gear 127. As illustrated in the tilt shaft of FIG. 23, but not in this view, a shaft coupler 188 can interface pan shaft pieces 125 and 425. Because the tilt assembly is shifted behind the datum of view, the tilt motor subassembly comes into view. Tilt motor 112 and its tilt motor gear 114 can engage tilt belt 116 to rotate tilt shaft gear 131. Atop pan-through shaft 425 is mounted fixed payload device 434. Fixed devices are commonly radars, antennae, or fixed wide-angle cameras that do not rotate. Because the main housing cover 413 rotates about the fixed shaft 425, a dynamic shaft seal 152 is included in the underside of payload housing 434, oriented downward to prevent ingress of rain or other fluid that may pool or splash atop cover 413. A pan-through shaft flange 429 rigidly attaches the payload 434 to the pan-through shaft 425, and alignment pins or a keyway can be used to tightly align the azimuth of the payload with the pan shaft 125 and mounting base. A housing cover 713 includes a mating flange and static seal as described for cover 113, and payload 434 can have an air valve 150 to purge and pressurize the interior with conditioned gas. With reference to FIG. 35, a top view of device 401 illustrates the shifting of tilt shaft 105 off the panning axis; the cover 413 and top payload 434 have been omitted for clarity. Tilt shaft 105 can also include a shaft coupler 188 as illustrated in the tilt shaft configuration of FIG. 23.

Belts require that one or more pulleys or idlers be adjustable to install, tension, and uninstall the belt. Prior art has fixed the shaft gear and permitted the motor and motor gear to slide towards and away from the shaft gear, with fasteners moving within slots in motor adjustment plates. With reference to FIG. 10, motor mount brackets 115 and 282 can adjust the position of the motor gears 104 and 114 to tension their belts, with the brackets then locked into position by the friction of the bolt heads on the sides of the slots. This bolt head friction may not be sufficient to maintain motor bracket position under high shock and vibration. With reference to FIGS. 48-50 is a linear gear track and pawl which can permit incremental motor mount advancement that can maintain belt tension if the bolts loosen and fail to hold the motor mount 282 in place. With reference to FIG. 49, a top view illustrates a pawl 680 which can be fastened into the floor of a housing with a shoulder screw 684. The tip of the pawl can fit into teeth grooves of a linear gear track 685 rigidly attached to an adjustable pan motor mount 282. As the motor mount 282 advances forward towards front wall 122, pan motor gear 104 increases the center distance to pan shaft gear 127. A torsion spring 682 constrained between a shelf in the pawl 680 and an obstructing pin 682 can apply a constant force driving the tip of pawl 680 into the grooves of linear gear 685. With reference to FIG. 50, an underside view of the pawl and gear assembly illustrates a lock pin 681 that can help hold the pawl 680 in position once the proper belt tension has been reached.

Figure 51:
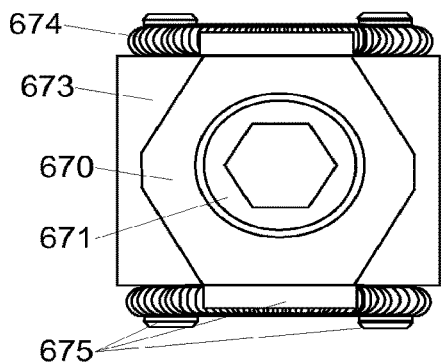
FIG. 51 illustrates a top view of a standard compact work piece holding vise.
Figure 54:
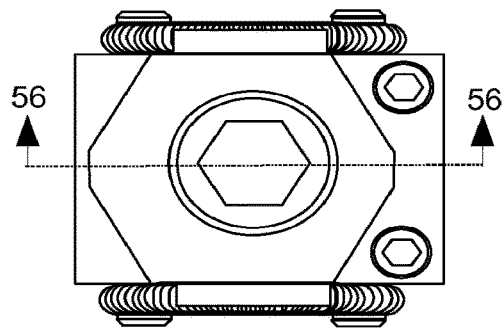
FIG. 54 illustrates a top view of an embodiment of a motor mount vise.
Figure 52:
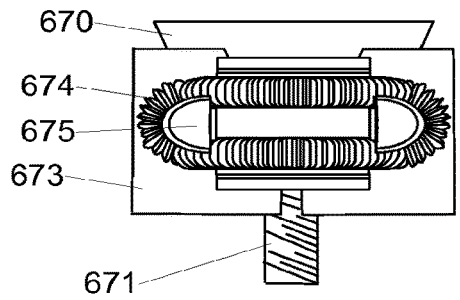
FIG. 52 illustrates a side view of a standard compact work piece holding vise.
Figure 55:
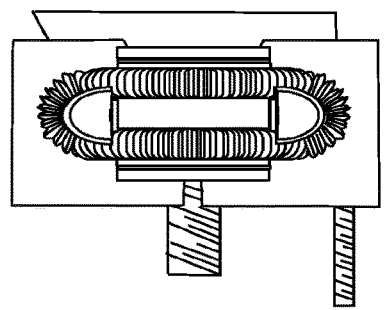
FIG. 55 illustrates a side view of an embodiment of a motor mount vise.
Figure 56:
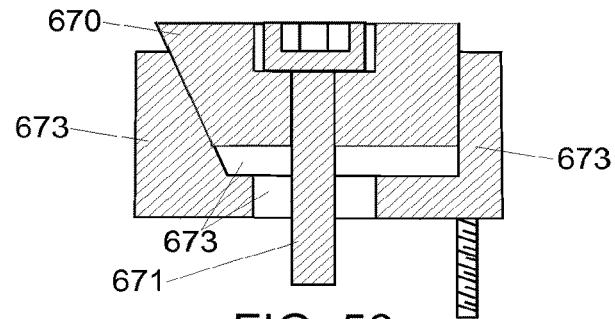
FIG. 56 illustrates a side sectional view of an embodiment of a motor mount vise.
Figure 53:
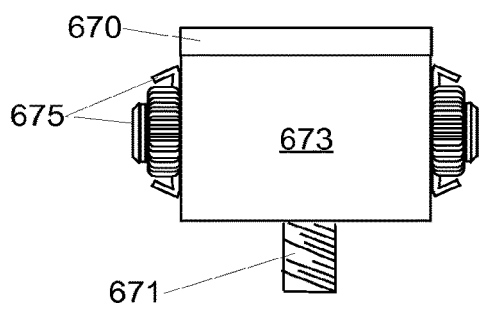
FIG. 53 illustrates a front view of a standard compact work piece holding vise.
Figure 57:
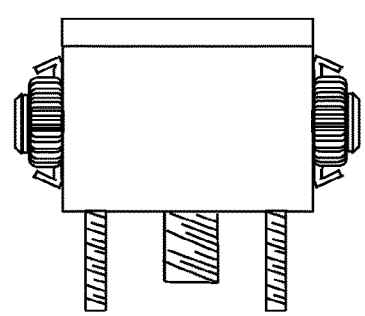
FIG. 57 illustrates a front view of an embodiment of a motor mount vise.
Figure 58:
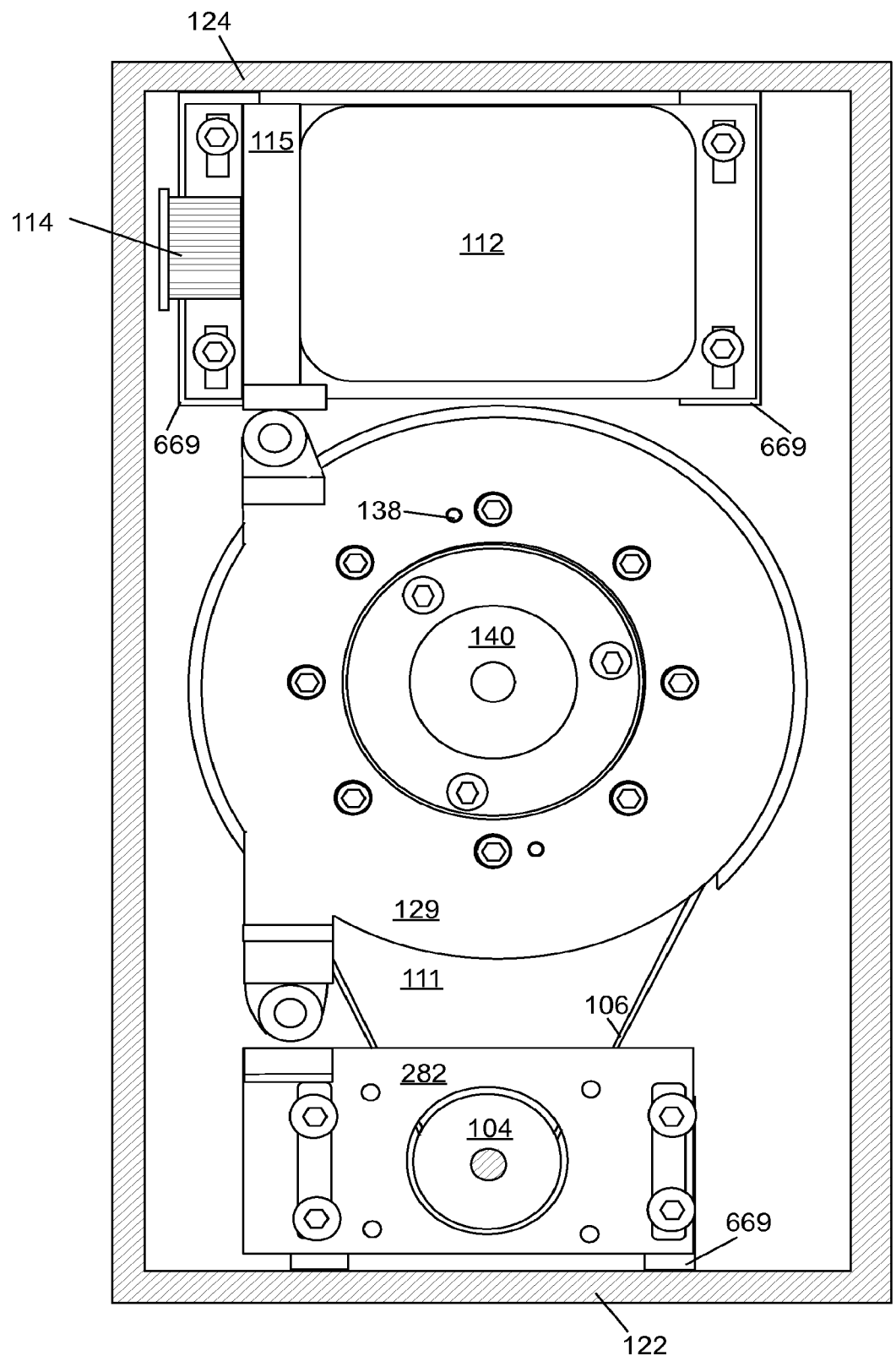
FIG. 58 illustrates a sectional top view of an embodiment of the positioning device with motor mount vises.

With reference to FIGS. 51-60 are an alternative motor mount retention apparatus using a screwed wedge technique that has been applied to CNC machining work holding vises. With reference to FIG. 60, tilt motor mount bracket 115 can have a sloped side that is pressed upon as a wedge 670 is lowered by turning screw 671. With reference to FIG. 51-53 are top, side, and front views of a compact work holding vise which pushes out jaws 673 as a screw 671 lowers wedge 670. To keep the separate pieces together, a spring or elastomer ring 674 can be in guides 675 to pull the jaws and wedge back together when the work pieces need to be removed from the vise; the positioning device does not need such features as tensioning is only applied once or twice at the factory, and on rare maintenance. With reference to FIGS. 54-57 are top, side, side sectional, and front views of a modified vise for linearly displacing and locking an adjustable component in one direction, as opposed to the bidirectional action of the standard vise. With reference to FIG. 56, a right side of wedge 670 can be straight and not apply lateral force that would otherwise displace the right jaw 673. With reference to FIGS. 58 and 59, pan bearing flange 129 can include straight-walled backstops to prevent wedge 670 from pressing into the immovable pan bearing flange 129, while also supporting the wedges as the tensioning belts resist displacement of the motor mount plates 282 and 115. As the screws 671 turn, the motor mount plates will slowly advance to tension the belts and non-permanent thread-locker can set the screws 671 in position to maintain belt tension throughout vibration and shock.

Figure 61:
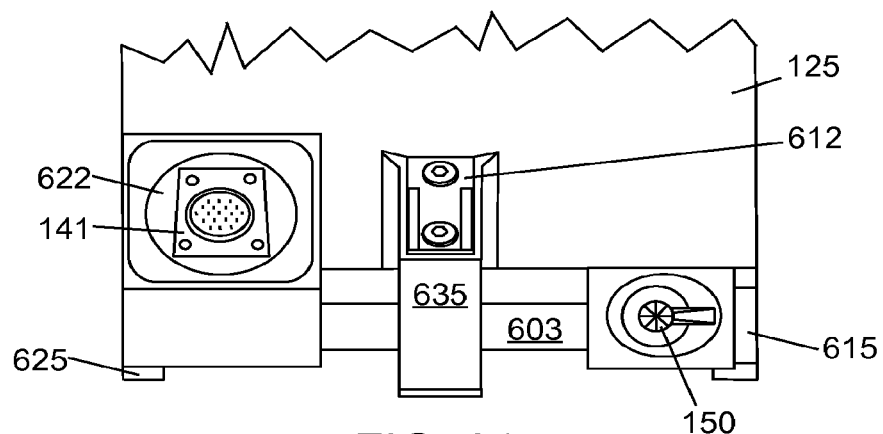
FIG. 61 illustrates a partial front view of an upper portion of a rapid installation toggle-clamp mounting for removable, portable equipment.
Figure 62:
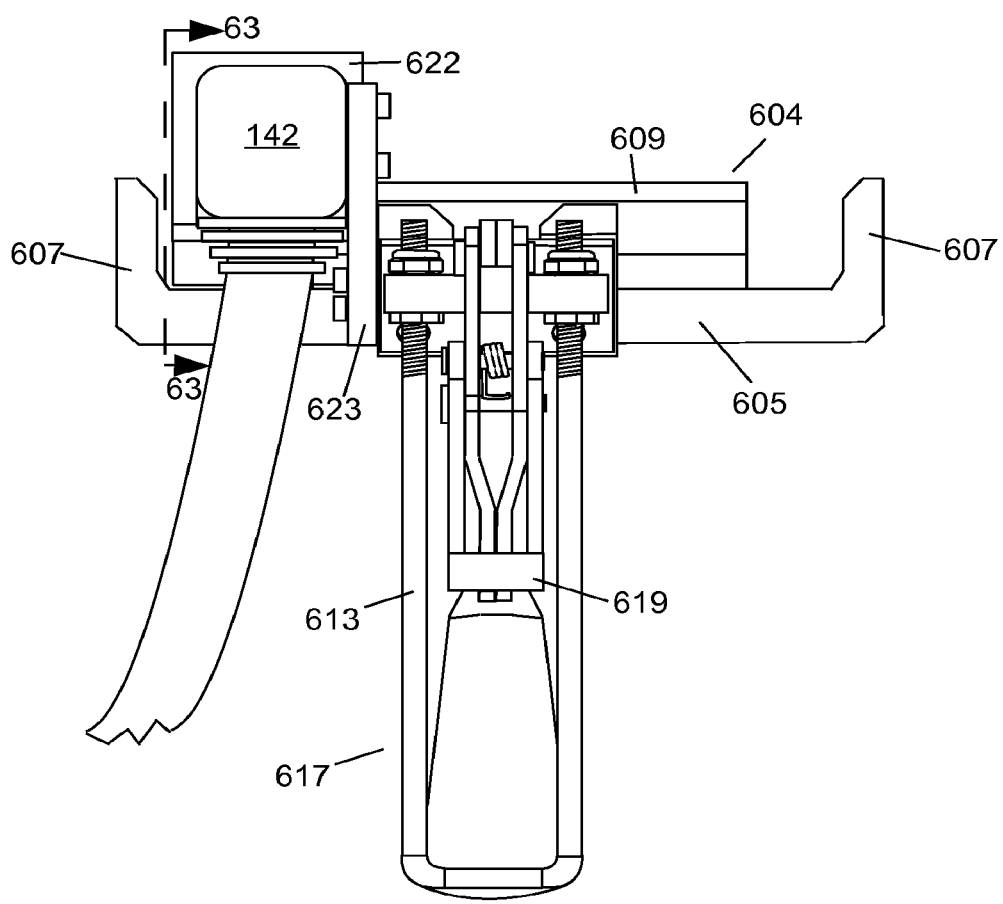
FIG. 62 illustrates a illustrates a partial front view of a lower portion of a rapid installation toggle-clamp mounting for removable, portable equipment.
Figure 63:
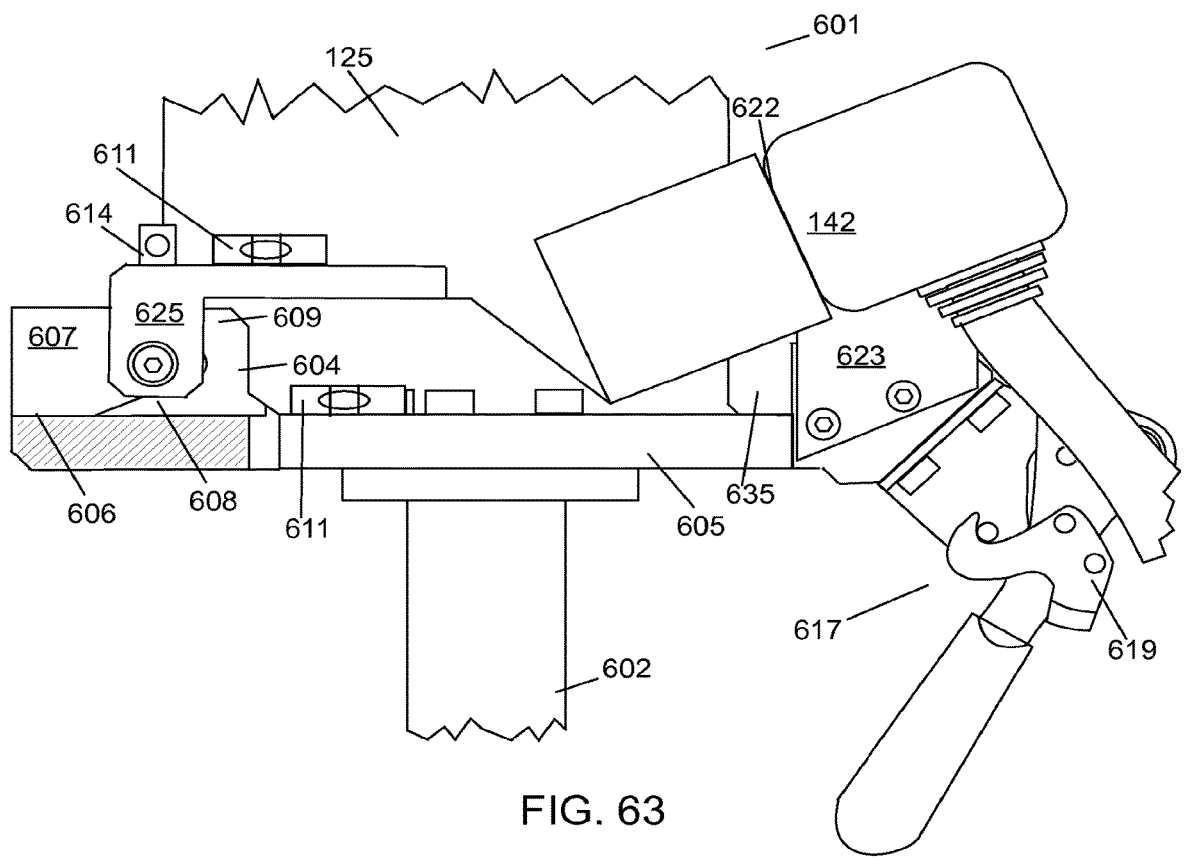
FIG. 63 illustrates a side sectional view of a rapid toggle-clamp mounting.

With reference to FIGS. 61-64, a pan shaft 125 can have features which mate with a mounting fixture 605 that can be rapidly locked down and released by a hand-operated toggle-clamp. With reference to FIG. 61, pan shaft 125 of positioning device 101 can stand on three legs: a right rear leg 615, a left rear leg 625, and a front center leg 635. With reference to FIG. 63, the legs can be placed atop a mounting plate 605 which is attached to a base such as tripod 602. To mount the pan shaft firmly in the mount, the pan shaft 125 can be pulled to the right, away from mount plate side 606, with a rod 603 that can slide up a slope 608 in mount plate 605 until it is obstructed by a wedge 604. With reference to FIG. 61, a hooked toggle point 612 is rigidly attached atop front leg 635. With reference to FIG. 62, a latch 613 of a toggle clamp 617 can engage the anchor 612 to pull pan shaft into the locking wedge 604 as the handle of clamp 617 is pulled to the closed and locking position. The locking draw stroke can also mate the electrical connector 141 to an external cable. To rapidly release the positioning device, the handle of clamp 617 can be pulled upward which can push the pan shaft 125 out of the wedge and disconnect the connector 141, then the latch 613 can be lifted off the toggle point anchor 612, permitting the positioning device to be removed from the mount 605.

Details of the Inventive Positioning System Design

The inventive positioning device is a device which can be mounted to both mobile and fixed platforms. A fixed platform is commonly a tall CCTV pole, a bracket permanently mounted into a building edifice, or a fixture in a robotic assembly line. The device mounting to such fixed platforms is typically a semi-permanent installation, with removal only to perform maintenance or replace the device. Similar to the tire on a vehicle, these installations are typically for long periods, must be secure, and are difficult and tedious to perform. Removal is further hampered by placing the devices atop mounts, high out of reach of vandals, along with using high-security bolts with thread-locking compound.

A mobile platform can be a manned or unmanned vehicle such as a police car, aircraft, ATV, boat, or robotic sentry. A mobile platform can also be a person or animal. The positioning device was conceptualized to solve the challenges of indoor and outdoor robotic devices, with outdoor positioners aiming payload devices, such as cameras and lasers, as an application with increasing demand yet underperforming technology. Mobile deployed positioning devices and robots have a high incidence of failure due to mechanical shock, such as being dropped on the ground, as well as from weather and electromagnetic hazards. Being particularly hardened against these threats owing to the novel bearing and power train employed, it is expected the positioning device claimed will have the most market penetration in this outdoor, mobile space.

A user need for compact, portable equipment such as the positioning device is the ability to quickly and easily install and remove the equipment from a mobile mounting platform. In the case of a Border Patrol unit, an agent may be driving an off-road vehicle through the desert with the positioning device attached to the roof or atop a mast, equipped with a night vision payload. When said agent reaches a surveillance hide to begin a mission, he may then desire to quickly remove the positioning device from the vehicle and mount it to a tripod positioned in the concealed hide position. The positioning device and mount must have interworking features to provide the payloads a stable, level, and backlash-free platform. Once a target is located with the positioning device, the agent may need to rapidly remove the positioning device from the tripod, reinstall it upon the vehicle, and begin a pursuit. Should the agent come under attack, such a rapid and easy dismount and mount process may be a life-saving feature, and also an equipment-saving feature since the device need not be abandoned in a hasty retreat. When the Border Patrol agent returns to the outpost, the compact, portable positioning device can be quickly and easily removed from the vehicle and secured in a storage locker out of reach of thieves, vandals, and exposure to the environment's hazards.

Prior art has predominantly used bolts and/or tongue-in-groove interfaces to mount mobile equipment. One need only watch the film A Christmas Story, the scene in which the main character is aiding the changing of a flat tire, to foresee the problems in using loose fasteners at night or in challenging conditions. Lack of ample illumination may prevent the operator from locating the fasteners on the mount, and they may misplace fasteners or tools in the process. In a covert situation, flashlights may not be an option, leaving the operator to rely on touch and spacial relations to perform the mount and dismount operation. Fasteners have an additional drawback as frequent mount and dismount cycles may strip the tool, bolt heads, and threads. In stressed situations such as battle, a medical procedure, or a tight production schedule on a robotics assembly line, human operators may not have the fine motor skills to operate tools, nor the cognitive capacity to remember and perform a complex mounting/dismounting sequence. Cold weather may also eliminate fine motor skills, and the operator may be wearing gloves that prevent manipulating small tools and complex mating geometry.

Some examples of prior art positioning devices and portable payload devices have eliminated most or all bolts from their mobile mount designs, but most of these solutions have supplanted the fine motor skill dependent bolting method with another fine motor skill dependent mating feature, and many still include small features such as ball lock security pins. Small security pins can be ball lock pins where a spring-loaded ball bearing is recessed into the shaft of a pin, while another type of security pin includes a spring-loaded plunger; in both cases, the ball or plunger pin aligns and snaps into place when a mating hole in the mating structure aligns with the ball or pin. These features can be difficult to engage and lock when the alignment hole is not very precisely aligned with the pin. Debris such as dirt and ice may cause the spring action to get stuck. The pin locking action may also produce an audible snap unsuitable for covert operations. The security feature can also be a simple pin or screw driver on a lanyard that inserts through holes in the positioning device and mounting fixture that align. In one example of prior art currently viewable at URL "http://www.youtube.com/watch?v=kWuvyTB6OxQ", a mobile surveillance trailer includes a quick-mount system comprising a compact positioning device with an attached mount plate, a mating shelf rigidly attached to the mast of the surveillance trailer, a straight security pin on a lanyard, and an electrical cable. The positioning device is designed to mount to fixed structures with bolts, but this implementation instead bolts into an accessory base plate. This plate and the shelf on the trailer have a tongue-in-groove mating permitting the positioning device base plate to slide into guides on the shelf. To prevent the baseplate from sliding along the grooves backwards, a simple security pin is dropped through aligning holes on the base plate and shelf. A cable for power and control is then connected to the positioning device. Operators may not be satisfied with this design. A mounting plate has been affixed to the standard positioning device, which has added weight. While it permits modularity to avoid using a mobile mount for fixed installations that do not need a quick-disconnect, it adds weight compared to a design that integrates the mounting geometry into the fixed shaft of the positioning device. The tongue-in-groove may not be ideal in the challenging situations described above. The mating interface is a tight fit between the tongue and groove, and the operator must carefully align the tongue into the grooved fixture before sliding the plate forward. Debris and ice on the grooved fixture may obstruct the mating plate, and these tightly interfacing tracks may not be able to interoperate if, as commonly occurs in the field of this device, the positioning device is dropped and the precision mating tongue is bent.

With reference to FIG. 63, illustrated is a rigid and backlash-free mounting apparatus 601 for equipment that must be quickly and easily installed and removed. This design can permit a mating procedure that requires no tools, few steps, and little or no fine motor skills. A variety of features on the fixed shaft 125 of the positioning device can attach and rigidly mate with a mounting fixture on or attached to the fixed or mobile platform 602. In the illustrated embodiment, the platform can be a tripod. With reference to FIG. 61, the base of the pan shaft 125 can include three legs 615, 625, and 635. Between two legs 615, 625 can be a rod or wedge 603, the mating rod ("rod"). This rod can be a separate piece that is threaded and rigidly attaches between the two legs 615, 625, or the rod 603 can be an integral feature between, and integral to, the legs 615, 625. With reference to FIG. 63, the rod 603 mates with a mating notch 604 ("notch") in a mating mounting plate 605 ("mounting plate") which can be attached to or integral with the mounting base platform 602. The positioning device 101 can be gripped by the installer, and the back legs 615, 625 with the rod 603 can make contact with an end 606 of the mounting plate. The mounting plate 605 can have upright guide posts 607 at this end 606 that are angled and beveled to catch, guide, funnel, or otherwise align the legs 615, 625 and rod 603 into a desired position as the operator slides the positioning device over mount plate 605. Such funneling features can accommodate and correct sloppy placement by the operator such as from using only gross-motor skills in a stressed environment, using gloves, or having poor visibility. Once aligned, the positioning device 101 can be pulled toward the operator, away from side 606, with the funnel features 607 continuing to guide and align the three legs without the fine interplay required by a tongue-in-groove. The rod 603 can then contact an upward slope 608 in the mounting plate 605 that elevates the pan shaft 125 off of its rear legs 615, 625. This slope 608 can have a curve or reverse in direction to form a "V" or "U" wedge 604 ("wedge") that blocks farther travel by the rod and attached positioning device 101. The top side 609 of this wedge 604 overhangs the mating area with the rod 603, an obstruction which can serve as a roof to shield the wedge from debris and weather. The rod and wedge surfaces can be precisely manufactured to be straight, flat surfaces to maintain precise, accurate alignment of the pan shaft 125 with the mounting plate 605 such that the positioning device can have a level platform. The mounting plate or pan shaft can include a bubble level 611 or levels to permit a level base for the positioning device 101, and the positioning device can include sensors such as a digital embedded compass to detect the mounting error. A third, frontal leg 635 on pan shaft 125 can be the same length as rear legs 615, 625 to mount level atop the mounting plate 605, or this front leg 635 can be longer than the other legs in an amount equal to the difference in vertical height that the bottom slope 608 of the wedge elevates the rod 603. The base of pan shaft 125 can also be slanted toward or away from the direction of the user's pulling action to optimize leg height, rod position, and wedge size. With the rod 603 tightly in the wedge 604, the positioning device 101 is constrained in two axes, but not in the axis in which it is pushed or pulled, nor is it rigidly held into place without further locking mechanisms.

Figure 64:
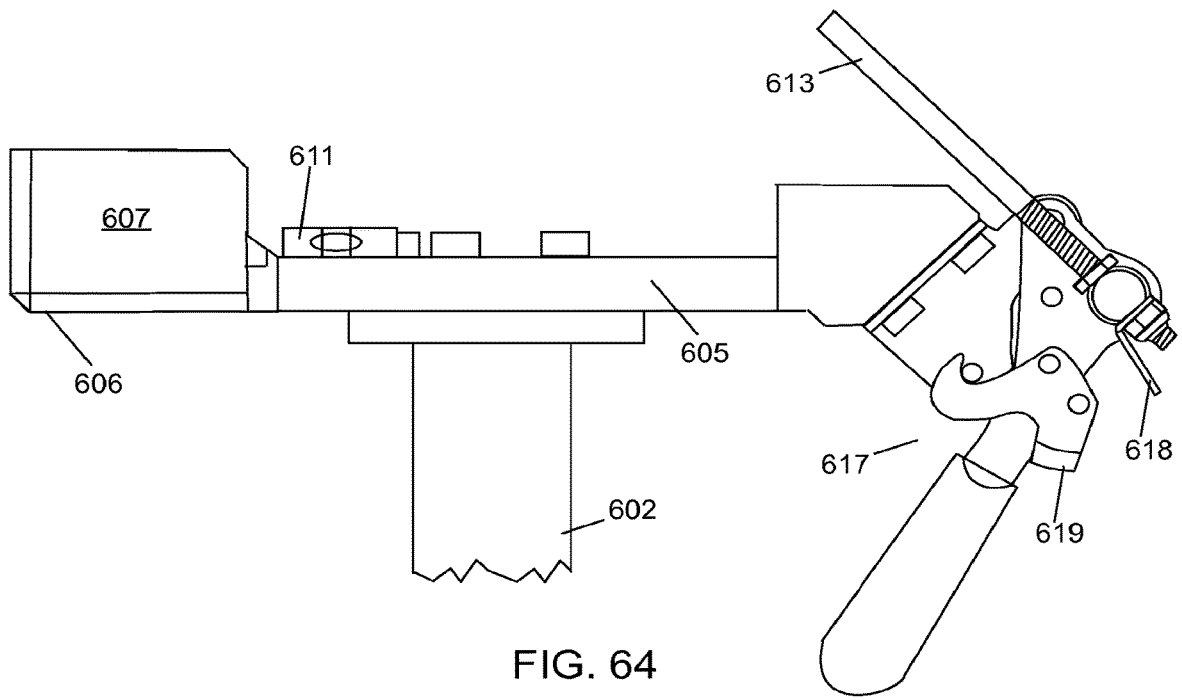
FIG. 64 illustrates a partial side view of a lower portion of a rapid toggle-clamp mounting.

To draw together and lock the positioning device into place, a hand operated toggle clamp can be used. Toggle clamps can have hundreds of pounds of clamping force that securely hold the positioning device in place throughout drops or a rough ride on an off-road vehicle, yet is a simple, tool-less design that has few operating steps and requires little or no fine motor skill to mount or dismount, with more details described in "EP 1169235 B1, Toggle-clamp for fastener". Toggle clamps suited for vibration, inverted position, slightly short of center clamping, and other variable conditions is described in "U.S. Pat. No. 5,165,148, Toggle Clamp with Locking Mechanism" and "EP 1967324 B1, Universal locking mechanism for a clamp". With reference to FIG. 64, a toggle clamp can be rigidly attached to a mounting surface, and can include a hook, latch, lasso, or magnet 613 ("latch") that can be extended toward an anchor point on the equipment. By pulling the clamp into a locking position, the equipment is pulled at it's anchor by the latch. Once fully drawn, the clamp can include a safety mechanism to prevent unintentional release of the clamp.

With reference to FIGS. 61 and 62, in the illustrated embodiment, a toggle clamp apparatus includes an anchor 612 that can be rigidly attached to pan shaft 125, with tapped threads, threaded inserts, or other fastening points on the shaft 125 as the standard mounting procedure. A toggle clamp 617 can be rigidly attached to the mounting plate 605. The clamp can be pushed open by the user to extend a hook type latch 613 which can engage with the anchor 612; the full draw of the toggle clamp 617 can be sufficient to pull the rod 603 up the slope 608 of the wedge 604 and can hold the rod securely in the wedge without a loose fit or play between the rod and wedge. With reference to FIG. 64, the toggle clamp 617 can include a thumb paddle 618 permitting one-handed positioning of the hook 613 so that an operator's second hand can draw and hold the rod 603 into place in the wedge 604. The toggle clamp 617 can also have a safety lever 619 that may prevent shock, vibration, or operator error from knocking the clamp 617 into the open position unintentionally. The funneling guide posts 607 in the mounting plate 605 as well as the wedge structure 604 can be thick and strong features that resist denting as opposed to a tongue-in-groove guide, and the rod's mating face can be somewhat shielded underneath the pan shaft 125, held between the two rear legs 615 and 625. There is little or no exposed, complex mounting geometry to be damaged from drops, and debris is less likely to work into the mating features.

With reference to FIG. 63, as an additional improvement, the operator can have an installation and removal procedural step eliminated by integrating a push-pull type electrical connector plug 142 into the mounting plate 605. The connector 142 can engage with a mating push-pull connector receptacle 141 in the pan shaft 125. The pan shaft legs 615, 625, 635, pan shaft slope 608, and mounting surface flanges 622 of the mating connectors 141, 142 can be sized and angled to cause the connectors to mate by the user's drawing action of the toggle clamp 617. The hook 613 length, draw stroke, separation between anchor 612 and the clamp, and wedge 604 geometry can be precisely tuned such that the full stroke of the clamp 617 performs a full mating of the connectors 141, 142, and a full mating of the rod 603 into the wedge 604. The rod, wedge, or both can be coated with a deformable coating, such as an elastomer, that provides grip between the rod and wedge while relaxing some of the constraint such that the connectors 141, 142 can have some play and tolerance in aligning their pins and sockets.

Mobile equipment such as the positioning device 101 can be heavy and tedious for operators to transport and handle. Fatigue and lack of gripping surfaces can lead to the equipment being dropped to the ground and damaged. Prior art has included drawer-type handles fastened to payloads or the positioning device for users to carry, but rigid handles are obtrusive and add weight. Prior art has also attached an eye-bolt to the positioning device for operators to stick a finger through and carry, but some fingers or gloved hands may be too large for the eye of the bolt, the steel bolt adds weight, and the tapped hole may be large to thread a large eye-bolt. A carry system familiar to military users of high performance surveillance equipment are rifle slings. One such sling system uses quick-connect/quick-disconnect 'QC/QD' hardware to attach and remove the sling in seconds, described by application "US 20120174458 A1, Detachable Swivel and Associated Mount". Similar rifle slings may be tailored for carrying objects other than firearms, such as that described in "U.S. Pat. No. 6,932,254 B2, Sling for carrying objects". Another carrying accessory offered by the referenced sling manufacturer is a Universal Wire Loop lanyard, viewable at URL "http://www.blueforcegear.com/universal-wire-loop/". These are all light weight, flexible, and removable carry systems that can make the positioning device more easy to transport and less prone to drop-induced damage.

With reference to FIG. 63 the positioning device 101 can include threaded holes or posts 614 to attach a carry handle, lanyard, or sling. In an embodiment, two posts 614 on pan shaft 125 can accept standard QC/QD hardware for rifle slings. In another embodiment, a smooth hole or post on pan shaft 125 can accept a loop of cordage or wire such as that on a Universal Wire Loop.

Moving on to a detailed description of the electronics system, With reference to FIG. 4, a block diagram of the positioning device 101 is illustrated. In order to use the positioning device 101 to position the payload devices 134 and 136, a power supply 571 can provide electrical power to the electrical components including the pan motor 102 and the tilt motor 112 within the housing 111. The power supply 571 may also provide power to the external controller 573 in many embodiments. The power supply 571 can be a battery, a generator, a connection to a power grid or any other suitable electrical power supply. Thus, the power supply 571 can have an AC or DC input and may provide output electricity as an AC or a DC voltage. In an embodiment, the positioning device 101 can have an internal isolated AC/DC or DC/DC converter 118 to provide conditioned power to the pan motor 102, the tilt motor 112, or any other electrical devices mounted on or within the positioning device 101. The choice of the power supply 571 voltage configurations and the converter 118 voltage configurations can be based upon various factors including: the compatibility of the motors, transmission losses in cable runs, and the power source (grid vs. battery). The external supply 571 is commonly a CCTV power supply operating off an electrical input of 110-220 VAC in the USA and producing an electrical output of 24-28 VAC, 12-28 VDC, or up to 57 VDC when the power supply 571 is a power-over-ethernet injector. The output of the power supply 571 can be selected as DC output for short cable runs and AC for long cable runs to minimize transmission losses. The internal converter 118 can be selected to supply conditioned AC or DC output to support the motors' native AC or DC operation, and the internal converter's 118 input can be selected as AC or DC based upon the output from the power supply 571.

The positioning device 101 may also be in communication with a controller 573 and an HID 575 to control the position of the devices 134, 136. An operator may input control commands into the HID 575. The command signals can be transmitted to the controller 573 which converts the command signals into individual control signals for the pan motor and the tilt motor. The user may also input device control signals into the HID 575 which are transmitted to the controller 573 which then transmits the control signals to the payload devices 134, 136. Some payload devices 134, 136 such as cameras, distance measuring devices, audio monitoring devices and other mechanisms can provide output signals. The output signals from the payload devices 134, 136 can be transmitted to the controller 573 and to the HID 575. In an embodiment, the HID 575 can be remote from the controller 573. In these embodiments, the controller 573 and HID 575 may each have transceivers for wired or wireless communications. The controller 573 can be an example of an external processing module, typically performing video processing and encoding, video recording to hard drives, auto tracking of moving objects, gyro-stabilization, control protocol translation, and media conversion which can be RS232/422 to fiberoptic or RF wireless. An additional internal controller 574 can be housed inside the housing 111 to drive the motors, sense shaft position, switch video channels, monitor environmental sensors such as temperature, translate protocols from various third party CCTV controls, and an advanced implementation of controller 574 can assume all tasks of external controller 573.

With reference to FIG. 36, the core technology of the inventive positioning device is the bearing system design, enabling a smaller, lighter, simpler, less expensive, more reliable product to be built around this bearing platform. The described embodiments of the positioning device can include bearings for panning payloads and can include bearings for tilting payloads. The four-point contact turntable bearing 391 has robust load handling capacity and may perform acceptably as the sole bearing supporting a rotary shaft. For devices deployed far from maintenance depots, or for deployments where reliability is paramount, such as battle and rescue, a second supporting bearing or bushing can be added to the shaft. With reference to FIG. 17, payload 136 is a distance from tilt shaft gear 131 that could induce high moment loads. Lack of concentricity in the tilt shaft 105 or misalignment could lead to grinding of the shaft 105 where it enters the bore in wall 123, and shaft deflection could deform dynamic shaft seal 152 on side 123 to the point leakage occurs. A second bearing or bushing 144 can be added in wall side 123 to constrain shaft deflection. Tilt shaft 105 bearing 144 can be a radial bearing with an outer race tightly press fit into a bore on housing side 123. A tight press fit is an interference fit where the softer mounting surface material warps and envelops the steel of the radial bearing race for a permanent installation. The bearing seating bore can be fabricated with a precision surface finished and dimensionally toleranced to a thousandth of an inch error or less to reduce the possibility of an undersized bore warping the bearing steel under the tons of force applied during the press installation and remaining thereafter as static load. In some cases, a manufacturing or assembly defect may occur where the bearing 144 may not be seated flush into the bore by the press fit installation, preventing the shaft from rotating with even, concentric motion. This uneven seating creates a misalignment error that can also impart uneven loads down the shaft sufficient to damage paired bearings or other shaft components. Press fit bearings may be improperly seated or damaged during or after installation to a degree that the system cannot function as intended. Because the precision mounting surfaces are deformed to create the interference fit, there are no second chances to reseat the bearing. The surfaces cannot have a new bearing press fit over them; any chassis or shaft with a tight press fit with the damaged bearing must be disposed of along with the bearing, resulting in catastrophically expensive repairs. The installation process can also include heating or application of tons of force that, applied improperly, can damage the bearing before it is even placed in service. Even if the product leaves the factory with perfectly press fit bearings, the deployed device may encounter shock, vibration, or contaminants that permanently damage or destroy the bearings. To reduce transmittance of damaging shaft loads into the radial bearing 144, the inner race can have a loose press fit with the tilt shaft 105 such that the shaft can be removed and does not impart damaging axial loads into the radial bearing. A loose press fit or slip fit has little or no deformation on the mounting bore or shaft, but is not as rigid a bond. Because the light press fit does not transfer axial loads into the bearing, this bearing 144 can use rolling elements and races optimized for radial and moment loads, such as a radial ball bearing. With reference to FIG. 30, bearing 144 can be a bearing with an outer race which has been installed into shaft mount bracket 145 and can have a tight press fit. Bracket 145 can be fabricated with a precision toleranced and surface finished bore for a proper fit with bearing 144. If the bearing 144 is improperly press fit, the bearing 144 and bracket 145 can be discarded before installation into housing 111. If the bearing has been damaged in service, the light press fit enables the tilt shaft 105 to slide past the inner race and bracket 145 can be removed from wall side 123 by removing the fasteners and alignment pins 138 (not visible) anchoring it into the wall side 323. With reference to FIG. 21, the outer race of radial bearing 143 includes an integral flange that can have mounting holes to rigidly attach flanged bearing 143 inside a bore on housing side 123. This integrated bearing may be simpler and less costly than mounting an unflanged bearing 144 into a separate bracket 145. The flange and mounting holes with fasteners add complexity to the wall side 323 and may not have as high load capacities and alignment as a press fit bearing, but the ability to remove flanged bearing 143 could prevent the highly integrated monocoque housing 111 from being disposed of along with a permanently press fit bearing 144 that has been damaged.

In a precision positioning device, even minor damage to rolling elements and races can lead to unacceptable friction and torque inconsistencies. A widely deployed example of prior art employs pairs of sealed radial bearings such as bearing 144, possibly deep-groove radial Conrad bearings, and damage to these positioning products has been reported by some customers as occurring often under the environmental threats and rough handling associated with outdoor, mobile robotics. Another purchaser of military surveillance gimbals also has recently expressed disdain with which existing pan-tilt positioning devices are failing quickly and repeatedly from damage to bearings after rough transport and handling by military personnel and vehicles. The failure mechanism is apparently bearing damage from high combined moment and thrust loads. Due to the permanence of the press fits, large assemblies of housing panels and shafts attached to the damaged bearings must be replaced along with the bearings, resulting in expensive, laborious repairs for the manufacturer or defense depot as well as long service outages to users.

Load vectors exerted onto bearings can be classified as radial, axial, moment, or a combination of the three, and can be applied unidirectional or bidirectional. A variety of bearing designs exist to tailor load capacity for a particular application. A significant discriminator in the selection process is the rolling element shape; contact bearings typically contain either spherical or cylindrical rolling elements. In general, a sphere can be made more accurate and for less cost than a cylinder. While tapered and crossed roller bearings can be found in heavy machinery, where their very high load capacities are required, ball bearings are better suited for smooth, precision robotics such as the positioning device 101. Radial ball bearings like balls 135 in bearing 144 are optimized to handle high radial loads, but are not the best option for handling the other load types. The deep-groove Conrad radial bearing includes axial load handling features but cannot handle moment or combined loads well unless paired with a second Conrad bearing further down the shaft. The ball separator cage of the deep-groove Conrad arrangement also prevents a high ball complement, resulting in low load capacity compared to other arrangements of the same bearing size. Angular contact bearings handle moment and axial loads better than the deep-groove radial type but are not equipped to handle radial load or bidirectional thrusts, therefore the common pairing of a single angular bearing with a radial bearing will still leave the equipment vulnerable to bidirectional axial loads. Because robotics such as the positioning device 101 can be subject to extreme shock and vibration in any direction, there can be no gaps in coverage of load vectors. A better all-around option is the four-point contact bearing as it handles each load direction, combined loads, and bidirectional loading well, with especially high resistance to moment and thrust loads With reference to FIG. 42 providing a detailed view of the rolling elements and races, a view of bearing 391 shows ball bearings 135 roll within grooves 393 formed in the inner ring 133 and the outer ring 137. The grooves 393 can have a shape that is recessed from the bearings 135 so that only the edges 399 of the groove are in physical contact with the ball bearings 135. The illustrated groove type is the Gothic Arch raceway. The bearing elements can be a single row of four-point contacted balls which can have a 30 degree contact angle. In an embodiment, the grooves 393 of bearing 391 can be gothic arched races with four points of contact upon the balls 135. This configuration is known as a four-point contact bearing and provides bearing support for radial, axial, moment and combined loads. The four-point Gothic Arch configuration may have lower stiffness and static load capacity than a cylindrical roller bearing, but it has lower starting torque and running frictional losses, when radial dynamic loads are low, which is critical for fine, smooth, slow motion tracking and aiming performed by long-range surveillance platforms and robotic arms. Because a light press fit is desirable between the tilt shaft 105 and supporting bearing 144, little to no axial loads will be seen by bearing 144, thus choosing bearing 144 as a radial bearing will optimize it for the loads it is likely to see. Bearing 144 can be a thin-section bearing to minimize size and weight, but must still be sized to account for anticipated radial and moment loads at this point.

Precision positioning applications require a very stiff bearing to maintain high repeatability of position indexing, and the slow, fine movements of precision positioning benefit from drives with low torque drag. In applications which require greater stiffness and lower torque that a four-point contact ball arrangement, yet still with a single row of rolling elements for a compact size and minimum weight, the single rowed crossed-roller bearing is the best alternative. A popular implementation of a flat mount bearing, the crossed roller bearing uses orthogonal rows of cylindrical rollers instead of balls to achieve very high load capacity for applications such as heavy industrial machinery. With reference to FIG. 45, a embodiment of an externally geared turntable bearing 391 includes an outer ring 137 and inner ring 133 which glide past each other via a single row of cylindrical roller bearings 335. Oriented in alternating axes of rotation within "V" shaped grooves 393, this positioning of the roller elements enables turntable bearing 391 to accept all combinations of thrust, radial, and moment loads. A cylindrical roller of approximately the same size as a ball has a greater load carrying ability than the ball alone, but the crossed roller orientation has a reduced moment and thrust capacity compared to the four-point contact design with ball bearings due to each roller carrying loads in only one direction while all balls in a four-point orientation work together to handle all directions at once. This moment and thrust disadvantage is offset by gains in stiffness and rigidity afforded by the larger contacting surface area and geometry of the roller element, and gains in rotational torque drag performance are achieved because each roller is oriented to transfer load in only a single direction instead of every direction. As implemented in the inventive device, turntable bearings of approximately 12" or less have fewer bearing elements and thus are not appreciably affected by the rotational torque losses of a four-point design over a crossed roller. The small size of the turntable bearing also prevents a reduced stiffness rating of the four-point configuration from adding up to unacceptably sloppy precision and repeatability demanded of large, long-range positioning devices.

Other detractors make the crossed roller more suited to embodiments where the turntable bearing outer diameter is 4 inches or larger. The cylindrical rollers are heavy, take up more space than ball bearings, are generally less precise than spherical balls, more expensive, and the assembled bearing has small central bores 167 for a given outer diameter. The center of turntable bearing 391 can be a cylindrical opening 167 that allows other components be positioned through the opening 167, such as wiring harnesses and slip rings, but this opening would be significantly constricted if the bulky cylindrical roller elements and races were to replace the compact ball elements in small embodiments of the positioning device 101.

Another detractor from adopting a cylindrical roller bearing such as a crossed roller arrangement is the two-piece outer ring of many flat mount and crossed roller bearings leaves a seam around the circumference which may negate the possibility of gearing the outer diameter. Teeth of both halves would have a gap in the middle, and teeth halves may not align sufficiently. Possibly one half of the split ring could overhanging the other half. A separate pulley press fit over both rings is not usually possible as the press fit preloads the split ring. With reference to FIG. 46, outer ring 237 is split and may not permit integral gearing. Further, the high load capacities of cylindrical roller bearings often require additional presser flanges and buttressing bores to achieve the rated load capacity, adding to weight, size, cost, and complexity. With reference to FIG. 37, ball bearing arrangements such as the gothic arched four-point contact bearing are less expensive while performing smoother motion in a smaller and lighter package than tapered or crossed roller bearings employed in prior art, the mounting holes 395 avoid the hazards associated with press fits, and balls can be loaded without split rings.

With reference to FIG. 46, a turntable bearing 391 has a multi-roller configuration orienting a row of cylindrical rollers 335 in each of the three load directions. This triple-roller bearing has full coverage of all loads, but is too bulky, heavy, and expensive for compact positioners; however, it may be necessary for proper load handling and stiffness of scaled up embodiments of the positioning device 101. A bearing manufacturer recently announced a dual-row roller bearing, with small cylindrical rollers, with the smallest diameter offered around 12"; such a bearing can have high stiffness, low torque, and very high load capacity as required by large positioning devices aiming long-range payloads.

A third suitable alternative to the four-point contact turntable bearing 391 is an integrated super-duplex angular contact bearing and race assembly. Where the external race is not split, an external gear profile can be hobbed into the race or a separate pulley ring can be rigidly attached around the race. The outer race can also be widened to create an outer ring, with mounting and alignment holes. With reference to FIG. 43, turntable bearing 391 has an outer ring 137 with mounting holes and can have an external gear profile on the outer circumference. An inner ring 237 is split to permit assembly, the rings held together and preloaded by a presser flange or fasteners. As with all bearings considered for use in the positioning device 101, the balls and races can be protected from contaminates by face seals 160, and additional protection can be offered with rigid shields 161 to enhance free-state bearing stiffness. The additional row of balls adds torque drag and weight, so balls 235 can be constructed of a lighter material such as silicon nitride. Silicon nitride balls are lighter than steel balls and can be lightly oiled instead of greased, increasing survivability under marginal lubrication. Silicon nitride balls are very stiff and do not conform to races like steel balls, having a smaller contact ellipse. This reduced contact reduces friction and starting torque which can enable smaller, finer movements of the shaft, though with the drawback that impact load capacity may be reduced approximately 30% in a single-row, four-point arrangement. While a poor selection for single-rowed embodiments of bearing 391 in high-shock environments, duplexed rows can overcome this weakness. Duplex bearing 391 can eliminate the ball separator 162 and particle shedding associated with separator rings by alternating silicon nitride balls 235 with slightly smaller steel spacer balls 135, though no preloading could be applied to the steel balls. With reference to FIG. 44, split inner ring 233 includes integral fasteners to fill the balls and assemble the ring with a preload to the balls 135. Ring 233 can include another hole pattern for mounting the bearing to a surface with fasteners. Outer ring 137 can be a one piece ring and can include an external gear profile. Balls 135 can be steel balls separated by separator rings 162 made of Delrin, brass, or similar low friction material. The two rows of balls can have two points of contact between each ball and the races at points 399. The contact points of duplex bearing 391 in FIG. 44 illustrate a face-to-face super-duplex angular contact bearing while the contact points of duplex bearing 391 in FIG. 43 illustrate a back-to-back super-duplex angular contact bearing.

An existing technique used to improve the reliability of rotary shafts with paired bearings is to team dissimilar bearings and vary the level of press fit. In dissimilar paired bearings upon a rotary shaft, the press fit on each race can be adjusted tight or loose in order to channel loads to the bearing equipped to handle them best; for example, a suboptimal decision in shaft design is to tightly press fit both bearings, often both radial bearings, upon the shaft. Thermal expansion and contraction of the shaft length can create an unintended axial preload in moderate temperature fluctuations, with extreme temperatures expanding or contracting enough to permanently deform the balls or races. Reducing the risk of this axial loading can require finer machining tolerances and derating of the operating loads of the product. Alternatively, one of the bearings can have a light press fit or slip fit upon the shaft so axial loads such as impacts or thermal expansion result in the shaft slipping past the bearing race it is lightly attached to. In FIG. 17, radial bearing 144 can have a loose press fit on the tilt shaft 105 so all or nearly all axial load channeled down the tilt shaft 105 can be handled by the four-point contact structure of tilt bearing 131. While angular and radial bearings can be paired on a shaft to utilize their respective strengths to handle combined loads, such as with a tightly press fit angular bearing tasked with axial and moment loads while a lightly press fit radial bearing handles radial loads, this delegation of loads between them may not be as simple or inexpensive as employing a single bearing designed to reliably survive all loads a device may conceivably experience. Tightly press fit bearings can also come dislodged, especially from improper mounting, and this disabled bearing may expose the second bearing to loads it is wholly unsuited to handle alone.

Tilt shaft bearing 131 can reliably handle significant loads seen on tilt shaft 105. Because the four-point contact bearing can handle all foreseeable loads alone, the radial bearing 144 may not be required. Where shaft deflection is a concern and an additional design safety factor is desired, bearing 144 can be a light, compact thin-section radial bearing, and can have a light press fit upon shaft 105 to channel most loads to the capable turntable bearing 131. This radial bearing can handle radial loads by constraining non-concentric shaft wobble and limit the moment arm length of shaft 105 from overloading the moment load capacity of the four-point contact turntable bearing. In embodiments where a shaft penetrates a second side of the housing such as tilt shaft 105 penetrating housing side 123 or pan-through shaft 425 of FIG. 34 penetrating through cover 413, a bearing or bushing can be installed around the shaft to permit smooth, constrained motion of the shaft through that second wall.

Turntable bearing 391 facilitates different mounting configurations to support a variety of shaft geometries to meet various design goals. With reference to FIG. 36, a detailed above view of a turntable bearing 391 is illustrated. With reference to FIGS. 37-41, cross section side views of a turntable bearing 391 are illustrated, with FIGS. 42-46 detailing views of portions of embodiments of the turntable bearing raceways. Like most contact bearings, the turntable bearings of FIG. 36-41 include bearing races 137 and 133 that rotate about each other via rolling elements such as ball bearings 135. Unlike most bearings, races 137 and 133 have been expanded to unusually wide proportions in order to include planar mounting lands 166 and 168 and holes 395 for fastening the races onto planar shaft and housing surfaces.

In order to facilitate different mounting configurations, the heights of the planar surfaces 166 and 168 of the inner ring 133 and the outer ring 137 can be offset; for example, if the turntable bearing 391 is rigidly mounted to a planar surface of an object such as the positioning device housing 111, a portion of either the inner ring 133 or the outer ring 137 can be rigidly attached to the planar surface. The portion of the turntable bearing 391 that is not attached can move relative to the fixed ring and should be able to rotate freely. The surface of the rotating ring can be recessed relative to the adjacent fixed ring for free rotation, otherwise ring planar surfaces of the same height would lead to contact and grinding of the ring which is not bolted to the flat mounting surface. There can be a small height difference between the rotating ring and the fixed ring for clearance from a flat, planar mounting surface. As illustrated in FIG. 41, in an embodiment, the inner ring 133 has planar surfaces 166 that are slightly higher than the adjacent surfaces 168 of the outer ring 137, creating a vertical clearance between the rings. The surface 168 of the outer ring 137 can be rigidly attached to a planar structure below, and the inner ring 133 will still be able to rotate freely, or vice-versa. These features also allow either the inner ring 133 or the outer ring 137 to rotate freely when the turntable bearing 391 is mounted to a large planar structure. With reference to FIG. 5, the pan turntable bearing 127 illustrated in FIG. 41 contacts the flat underside of pan bearing flange 129 with raised inner ring 133 while the slightly lower ring 137 can rotate without rubbing upper planar surface 168 on the underside of pan bearing flange 129. In other embodiments, the surfaces 166 of the inner ring 133 can be lower than the planar surfaces 168 of the outer ring 137. With reference to FIG. 40, the inner and outer rings can be the minimum thickness of strong material to handle the loads of the fasteners and rolling elements, and instead of building an offset into the bearing, the mounting surface can have a raised annular boss to offset one ring to rotate free of the mounting surface. With reference to FIG. 6, inner ring 133 is minimized in thickness while outer ring 137 maintains a thickness suited for the belt. An annular boss on the underside of pan bearing flange 129 projects downward, inside the bearing, to reach upper planar surface 166. Instead of building up the bearing ring thickness to create an offset as in FIG. 41, where such material may be heavy steel, a mounting surface of lighter material such as aluminum can supplant the steel by projecting inward to meet the bearing planar surface, reducing the total weight of the positioning device 101.

In FIGS. 6-12 and 14-16, the pan bearing 127 can be a turntable bearing that is configured with the inner ring 133 rigidly coupled to the housing and the outer ring 137 rigidly coupled to the pan shaft. Similarly, in the tilting device embodiments of FIGS. 17-22, the tilt shaft gear 131 can be a turntable bearing with the outer ring 137 rigidly coupled to the tilt shaft 105 and the inner ring 133 rigidly coupled to the wall of the housing. FIG. 17 illustrates the flexibility in shaft diameter sizing afforded by mounting each ring to a flange; tilt shaft flange 107 can step down in diameter to minimize the bore in wall side 121, or can be very wide like pan shaft 125. FIG. 13 is an exception illustrating that either ring can be coupled to the pan shaft; however, while such an embodiment would still greatly improve on prior art by permitting greater, comprehensive load handling and a simplified installation free of press fits, it would not have the additional benefits of integration and compaction afforded by the outer ring serving dual-purposed spinning freely as a shaft gear. Where shaft flange 229 has a geared pulley overhanging the outer ring to vertically compact the shaft, there may be more misalignment and reduced concentricity of the belt and pulley motion compared to the geared bearing.

Press fit bearings are mounted into precision bores and shafts that align the bearing and shaft components. Precision shoulders on these bearings are expensive and it is also costly to produce tight tolerances and high quality surface finishes on the bores they are mounted within. This is an expensive mounting compared to bolting down a flanged bearing, but is an effective way of aligning all shaft components. The field of the invention subjects bearings to damage and would benefit from the ability to salvage attached mounting structures via one or more removable races. Mounting-holed bearings use removable fasteners and usually mount to flat, planar surfaces and are technically known as flat-mount bearings. Turntable bearing 391 can include mounting holes 395 and, in an embodiment, the inner diameter of some or all of the mounting holes 395 can be threaded. Screws, bolts or other suitable fasteners can be placed through the mounting holes 395 to secure the turntable bearings 391 to other positioning device components. The inner ring 133 and outer ring 137 of the turntable bearings can have mounting holes 395 which can allow the turntable bearing 391 to be rigidly coupled to other objects with screws bolts or other fasteners. The mounting holes 395 can also negate having to provide presser flanges and bores for mounting the bearing 391, which can be necessary with many crossed roller and flat-mount bearings.

Shaft alignment is critical for precision aiming of payloads so an additional feature of the shafts is attachment of a rotary position sensing apparatus. This position sensor can be used to coordinate the driving of the motors to effect a desired rotational orientation of the payloads, while simple binary flags can trip limit switches to prevent over-rotation. In a device that has hard stops mechanically preventing rotation beyond a certain angles, such a limit switch can activate the motors or a brake to prevent slamming the shaft stop against the chassis stop. For shafts without a slip ring, with cables attached to or entering the shaft, over-rotation can cause excessive flex in the wires or even yank them free of their sockets. This rotary position sensing apparatus can include a disc or projecting feature rigidly attached to the shaft, with a read head to sense the position of the disc or feature as it rotates with the shaft. This feature can be an armature that interrupts an optical beam in the read head as it passes a pre-set position, or a magnet can be embedded in the armature to activate a Reed sensor or other magnetic sensor. Where cables are near the armature, there is a risk of the arm catching the cables and cutting them or catching them and pulling them out of their sockets. In this case, a contiguous disk can be used instead of the projecting arm. The disk can have holes at predefined references aligned with the read head to interrupt or pass the beam of an optical read head. The disc can also include one or more rigidly attached magnets to trigger a magnetic read head. More sophisticated position sensors include incremental and absolute encoders. Incremental encoders are typically a patterned disc with regularly spaced lines or features to pass or block a light beam, or similarly effect a magnetic field. Absolute encoders have more detail in the encoded pattern and electronics can process the read head to know the position without the startup calibration routine required for binary flags and incremental encoders.

With Reference to FIG. 17, earlier described are simple mechanical hard stops integrated into the tilt shaft and tilt shaft mounting flange 241, whereby flange surface 628 obstructs tilt shaft key 191. FIG. 22 includes a variation where tilt shaft flange pin 108 is obstructed by shaft mounting bracket 128, with another embodiment in FIG. 23 where pin 108 is on the opposite side of the tilt shaft flange 107 and strikes a feature 109 on the underside of cover 113. Because these stops can be damaged by rapid rotation of the shafts into them, warning sensors can be integrated with the shafts to monitor the shaft rotary position. A read head 146 is precisely located upon housing 111 to read features on tilt shaft flange 147. Flange 147 can be rigidly attached or removable, and can have a keyway or other alignment feature to reduce any alignment errors between the disc and the true shaft position. Where shaft mounts 128 and 145 are removable brackets, dowel pins 138 can aid in maintaining a true rotational reading between the shaft and read head. Similarly dowel pins or keyways in the coupling joint of tilt shaft 105 can keep a tight rotational relationship between the flange 147 and mechanical stops of tilt shaft pin 108 and roof stop 109. Alignment pins 138 in holes 396 of turntable bearing 131 also aid in angular alignment of the disc 147 such that it remains parallel to the reading slot of sensor 146. By using a sensor and tightly aligned shaft, controller 573 or integral motor control electronics in the motors can sense the shaft rotary angle and initiate braking to avoid a crash into the mechanical stops.

A benefit of turntable bearings like 391 is that they serve as combined bearings and gears in the same envelope. Bearings typically mount between a shaft and housing via their inner bore and outer circumference, but the addition of mounting holes leaves these surfaces free. Prior art press fits or fastens gears or pulleys onto shafts in addition to pairs of bearings, resulting in tall shafts with several precision stepped diameters. With the outer circumference free of the role of press fitting into the chassis or shaft, a geared ring can be press fit around the bearing exterior to create a gear or pulley out of the bearing. The geared ring could damage the coupled drive gears or belts if not installed very parallel. To avoid this source of error and added cost of the separate ring, hobbing gear teeth directly into the outer circumference of the flat-mount turntable bearing yields a the single package performing the combined roles of a bearing and gear/pulley. Such integration reduces system complexity, size, weight, and cost while improving reliability and serviceability. Integrally geared mounting holed bearings have been around in the form of slew ring bearings, but not in the form of bearing 391.

Slew ring bearings have been nearly exclusively used for geared drives by spur or worm gears as the typical applications have been massive, heavy, fixed in location, and thus not likely to develop backlash. A new class of slew rings is much smaller, used in applications including solar trackers and scientific turntables, hence "turntable bearing", yet these bearings continue to be predominantly gear-driven, heavy, and statically deployed in low-duty operation. In contrast, the present positioning system is directed towards a much smaller device that aims to be smaller yet through component integration. The turntable bearings in the inventive positioning device can be about 2.5 inches in diameter to about 12 inches in diameter; however, in some embodiments with heavier loads, larger slew or turntable bearings such as 24 inches in diameter or larger can be used. For small applications that are mobile and need near zero backlash and no exposure to teeth snapping or seizing, a synchronous belt driven turntable bearing offers a rugged, compact drive with greater dynamic combined load capacity than prior art's use of paired bearings, and the belted outer ring eliminates the need for a separate shaft gear and shaft complexity to mount the gear or cut it directly into the shaft. The compact turntable bearing with integrated pulley can achieve lower system cost, complexity, size, and weight than the prior art. It is also possible for the inventive positioning device to have a scalable design that can be used to create smaller or larger positioning devices, with correspondingly smaller or larger payload capacities. As the payloads increase in size and weight, the belt or teeth must increase in width and tooth profile to keep up with the weight increase. This leads to a thicker outer ring geared surface, and likely a larger gear diameter to increase the gear reduction ratio. As the turntable and belts scale up, the bearing load handling geometry will likely change from the single-rowed variants to the dual and triple rowed variants to not only handle the additional weight of larger payloads and a larger housing, but the rolling geometry must also consider if the larger payloads require reduced torque or added stiffness, such as when aiming long-range cameras with very tiny angular movements. Thus the four-point contact configuration is a great choice for the smallest positioning device, with the single-row crossed roller bearing a next best option where there aren't as high dynamic loads but stiffness is desired, with super-duplex angular bearings becoming the configuration of choice when size and cost are less of a concern than superior load handling and precision.

The beneficial improvements of the positioning device can be achieved by selecting either of the bearing configurations described or illustrated in FIGS. 42-46, for any diameter bearing. The variety of payloads, different load environments, and customer preferences for optimizing cost, weight, or other factors create too many variables to assign a particular bearing type to a specific range of diameters; rather general recommendations and best fits can be identified. The more important consideration is that the selected bearing configuration handle all types of loads, to at least a moderate degree, by itself. This permits a single bearing to replace a pair of bearings, or for a pair of bearings to operate independently on a shared shaft with an intermediary coupler, reducing cost and complexity, as well as preventing eventual failure of both bearings when a complementary paired bearing fails. While a low-profile thin-section bearing or bushing can be added to supplement the single turntable bearing, with a light fit on the shaft to permit disassembly, the large turntable bearing alone may handle all load vectors more reliably than some prior art bearing designs.

Another benefit of the turntable drive is the gear rotation can be consistently concentric. As with bearing installation, a pulley or gear may not be seated sufficiently flat upon the shaft when press fit, and this error can double in magnitude when the pulley is press fit onto a bearing race and this bearing assembly is subsequently press fit onto a shaft. This misalignment introduces a wobble or lop-sided rotation path where a balanced, concentric rotation is desired for proper belt tracking, gear mesh, and precision aiming of payloads. Such non-uniform motion can cause misalignment of meshing gear or belt teeth, uneven belt tension, and non-uniform torque output. In a precision aiming application, subtle inputs from the motors need predictable, repeatable, consistent output at the drive shaft. By flat-mounting the turntable bearing and hobbing the gear teeth onto the outer race, the drive's concentric motion is not jeopardized by press fits and achieves more consistent, efficient motion.

In an embodiment, the pan bearing and the tilt bearing can be compact slew ring bearings or turntable bearings. The turntable bearing 391 is precisely manufactured and may inherently have less play between the inner ring 133 and the outer ring 137 than normal bearings. The turntable bearings are a lower complexity, lower cost, smaller size and lower weight alternative to paired bearings and crossed-roller bearings which may also have very little play.

In an embodiment, it is an objective of the invention to view and track targets in excess of 5 km from the positioning device. This level of accuracy can be achieved with high preload bearings. A high preload reduces the vibration, which can improve the aiming of devices such as lasers and video cameras at long range and prevent blur in video. The invention is also required to be very quiet to prevent surveillance targets from realizing they are being targeted, and high preload bearings reduce audible noise output. Preloading a bearing introduces a permanent thrust load to reduce give or play that results from clearances between the internal components. Increasing preload has the benefits of increasing the stiffness of the structure and the tendency to displace under load and increasing rotational accuracy. The preload also has the benefits of reducing run-out, vibration, ball bearing skidding, and audible noise. Negatively, higher preload will increase break-free torque which results in less sensitivity to minute motor impulses used in fine motion such as long-range tracking. The tilt shaft and the housing of the positioning device may rotate at up to 1 rev/sec. At this speed, the prototype bearing's audible noise is only a faint, high frequency tone that is not expected to be audible through the sealed enclosure. The low speeds and low duty cycle of the inventive positioning device will not generate the heat of a bearing running continuously, and the low speeds are not expected to generate vibration of any significance into the payload devices. For these reasons the benefits of a high or even moderate preload are likely outweighed by the cost of the added break-free torque.

When the bearings are placed under preload, there is some elastic deformation of the bearings. One way to measure preload is through elastic deformation; for example, in an embodiment, the preload elastic deformation for the pan bearing and the tilt bearing can be about 0.0001 to 0.0006 inch. A positive preload will prevent false brinelling from occurring which may lead to premature failure of the bearing. The pan and tilt bearing preload is determined by the bearing manufacturer and may be adjusted upon request before fabrication. In an embodiment, the preload can be implemented by varying the size of the ball bearings used.

The preload can be determined by loading the bearing with undersized balls and measuring the clearance between the balls and the inner and/or outer ring. The undersized balls can then be removed and replaced with larger balls to obtain the desired bearing preload. The balls may have diameters that are sized in 0.0001 inch or smaller uniform increments. Thus, the proper ball diameter can be inserted into the bearing to provide the desired preload. If the preload needs to be changed, the balls can be removed from the bearing and replaced with different sized balls.

The low preload can reduce the torque drag on the tilt shaft and pan shaft such that very small movements may be made without any positional errors due to drag. In other embodiments, the replacement ball bearings with higher preload values may be necessary if wobble or play is observed in the tilt bearing or pan bearing. The wobble or play can be measured using lasers mounted on the positioning device. Another means for quantifying the preload is by strain which is a normalized measure of deformation representing the displacement between particles in the body relative to a reference length.

In a preferred embodiment, the bearings can have a large percentage compliment of bearings; however, a larger compliment of bearings may require a loading notch formed in the inner and/or outer ring. The notch in the inner and outer ring can be aligned to allow the balls to be placed into the grooves of the inner and outer rings of the bearing. This loading notch may not be required for smaller percentage compliment bearings; for example, a bearing having up to a 50% compliment can be assembled without a loading notch; however, a 67% compliment bearing may require a loading notch in order to install the balls into the bearings and will have higher load capacity because of the additional balls. In an embodiment, the balls and the inner and outer rings of the bearing may be plated with a hard metal such as thin dense chrome (TDC) which can provide hard contact surfaces between the balls and the four-point contact with the inner and outer rings.

The bearing can also include a ball separator that keeps the balls evenly distributed around the bearing and is installed between the inner and outer rings. In an embodiment, the separator can be made of Delrin or any other similar lubricious material. There may not be a significant difference in rotational resistance based upon the separator material; however, a single continuous separator which has a pitch that matches the bearing may have less rolling resistance than a segmented separator having open ends. Approximately 90% of the rotational resistance in the bearing can be from the four-point contact design and preload of the bearings, thus the separator may have may little effect on the rotational drag. A significant design challenge in effecting a smooth, precise positioning device is the elimination of shaft misalignment below perceptible levels. Types of shaft misalignment include rotary, axial, parallel, and angular. Rotary shaft misalignment results in payload 134 pointing to a different elevation angle than payload 136. Axial misalignment statically pushes or pulls (compression or tension) the shaft between bearing mount points, imposing an axial preload on structures such as tightly press fit bearings. In the case of deep-groove radial aka Conrad bearings paired on shafts of prior art, an improper axial preload can greatly reduce the radial load capacity of the bearing. Parallel misalignment can result from poor concentricity in the shaft or where a pair of bearing mounting bores are not perfectly straight; one hole is shifted off axis. It can impose a radial preload which can cause inconsistent rotation and reduced radial and combined load capacity. Angular misalignment can occur where bearing mounting bores or mating shaft ends are not perfectly parallel, whether press fit tight or loose. It imposes a moment preload and can reduce moment and combined load capacity of bearings. Axial, parallel, and angular alignment imperfections preload the shaft bearings out of intended design parameters, resulting in negative changes such as: increased bearing friction; increased starting torque; inconsistent velocity; reduced positioning accuracy and repeatability; increased false brinneling in high vibration environments; reduced maximum speed rating; reduced load capacity; improper meshing of belts and gears; and inaccurate rotary position sensing.

Misalignment is introduced into a shaft assembly in multiple ways. When a shaft is penetrating two bulkheads, there is typically a need to align the entrance point with the exit. There is often a bearing mounted to each bulkhead to support the shaft at two or more points, and misalignment between these bearings can damage them. In fabrication techniques such as molding of composites, curing of plastics, and compact embodiments with internal features inaccessible to milling tools, it may not be possible to control the final location of the bearing mounts within design parameters. Shafts with multiple pieces and mount points also suffer from tolerance stack-up, as well as increased risk of installation error. Misalignment can also be introduced by damage and deformation of the shafts, bearings, flanges, or housing.

There are multiple sources of shaft misalignment that can be introduced in the design phase. Rotary shafts often have stepped diameters, flanges, gears, or other features that prevent installation through bearing bores and bulkheads; a point that has already been made by explaining the installation directions of various shaft pieces. This requires the shaft be split into multiple pieces for assembly, but each piece interface adds imperfections that misalign the shaft. One of the more difficult puzzles for the positioning device is integrating a single tubular shaft with an attachable/removable flange. In an embodiment, tilt shaft 105 can be a shaft that passes through one side of the housing, through a removable rotary sensor flange 147, through a removable tilt shaft flange 107, and through a second side of the housing, leading to perfect rotary alignment between the payloads attached to each shaft end. The requirement of a large flange 107 to link the shaft to the turntable bearing prevents this from being a true one-piece shaft. The tilt shaft will require added structures to attach the removable flange 107 with a high degree of alignment and strength. The shaft must also have multiple steps in diameter to pass through each lip seal, bore, bearing, and the removable flanges 107 and 147. The rigid shaft would also have no compensation for misalignment between the bearings, requiring expensive tooling and fabrication to locate the bearings tightly, thus it may not be beneficial over a bisected shaft. Due to coordinating all of the pieces' diameters, their installation sequence, and lack of preload compensation, it is preferred shafts be radially separated into two or more sections for assembly into the chassis/housing. The interface of these two shafts introduces misalignment.

Separate shaft pieces are often necessary where multiple bearings cannot be press fit over the shaft in a single pressing, such as with a one-piece shaft. The shaft pieces are often fastened together with bolts, set screws, in-line pins, or integral clamping hubs. Where the shafts pieces must be angularly aligned to ensure payloads aim to the same angle, set screws, pins 138, and keyways are used. These additional mating structures increase the size, weight, complexity, and cost of the shaft. The assembled shaft pieces may not be as strong as a shaft made from a single piece of material; bolts and keyways will fail from torque and shock loads that would otherwise be transmitted via a one-piece shaft. Angular, axial, and parallel misalignment will also increase as the shaft is broken into more pieces, even when taking great care and expense to reduce tolerances and concentricity in the pieces. The added complexity increases opportunities for design errors and assembly errors. An assembly technician's error such as insufficiently torquing a bolt, or a high vibration environment, can lead to loose connections or shaft failure.

Mitigating the misalignment problem can be very expensive, usually by reducing the machining tolerances of all shaft and chassis parts, possibly upgrading to a finer ball grade, and spending more time and money on the assembly process. Before these expensive measures are taken, shafts of the inventive device can include inline alignment pins, clamps, keyways, and a shaft coupler to reduce misalignment at shaft end interfaces. With reference to FIG. 30, tilt shaft mounts 128 and 145 can have alignment pins 138 or other mating features in wall sides 321 and 323. To align shaft pieces of tilt shaft 105, the clamp in the center can include a set screw, inline pins 138, or a keyway to both mate and rotationally align the shaft ends. With reference to FIG. 33, the ends of tilt shaft 105 mate in a clamp structure where one shaft end envelopes and constricts over the mating end of the other shaft, tightened by a bolt. A set screw can also be used to penetrate through the larger shaft end and press into the smaller shaft end, but this is a weak connection and even a self-locking set screw can come loose under severe vibration and shock loads. Neither will inline pins nor keyways can prevent axial movement under heavy axial shock loads.

In addition to shaft interfaces, the bearings will not be perfectly aligned in their seating and will consequently preload each other. Simply bolting a bearing down will not remove susceptibility to: angular misalignment where the mounting surface is insufficiently flat, axial misalignment where the mounting surface depth and bearing cross-section are not axially controlled, or parallel misalignment where the mounting hole patterns are shifted off axis. To mitigate these additional sources of misalignment, bearing lands and mounting surfaces of the housing and shaft flanges can increase their flatness and dimensional tolerances, and precision located holes for alignment pins 138 can reduce parallel misalignment; however, these refinements add cost. With reference to FIG. 39, planar mounting surfaces 166 and 168 must be very flat to limit angular misalignment and alignment pin holes 396 enable precision locating the bearing to limit parallel misalignment. As the shaft is elongated and bearing mount points grow in separation, tolerances must reduce to keep misalignment within design parameters.

While small embodiments have short shafts that do not lead to intolerable misalignment, larger embodiments in high-performance positioning applications may be effected. Adequate alignment for small embodiments can be achieved through controlled planar tolerances on turntable bearing lands 166 and 168, similarly controlled flatness on mounting surfaces and bores, along with alignment pins and keyways. Higher precision tolerances are required as the shaft mount points grow farther apart. Due to the significant impacts on cost and performance, effort and expense is warranted to mitigate shaft misalignment. To avoid excessive cost in fabrication and assembly, a shaft coupler can be used as an intermediary part to mate shaft pieces. A coupler with a flexure deforms to neutralize misalignments while also absorbing light shocks and damping vibration.

A shaft coupler mates two shaft ends with a stronger link than may be achievable with direct shaft mating. Two aluminum shaft ends can have simple geometry, reducing cost, while the coupler can include the more complex mating features such as clamps, bolts, alignment pins, and set screws. The coupler can be of a material stronger than the shafts, such as a steel coupling for aluminum shafts, which can reduce the volume of the assembly by thinning the walls of clamps, keyways, and other stress-handling features. Many shaft couplers also have features that mitigate the significant problem of shaft misalignment.

The preferred shaft coupler type for integration into the inventive device must compensate for each anticipated type of misalignment, likely must be able to pass wiring through a hollow bore, and be conductive to electrically bond the two shafts. A shaft coupler with a hollow bore, high degree of misalignment tolerance, and electrical conductivity is a beam type a.k.a. 'helical' coupler. This type employs an integral flexure where the material in a central section is spiral cut into a helical coil; it's a single piece whereas many other types sandwich a separate rubber flex disc which is electrically isolating. The thin coil structure remains rigid yet has some spring action to accept and offset a few degrees of angular misalignment, and offset a few thousandths of an inch in parallel and axial misalignment. The helical structure can be made more flexible to permit sloppier machining tolerances and assembly precision, but this comes at a cost of reduced rigidity, torque capacity, axial load capacity, and fatigue strength. In the case of the inventive device where payloads attached to the shafts must remain closely in alignment with each other rotationally, and machining tolerances can be reasonably kept to +/−0.001-0.002" without excessive cost, a somewhat rigid flexure can absorb the expected small misalignments without the increased fatigue failure risk associated with thinner coils.

Such a coupler can be useful on a tilting embodiment or pan-through shaft embodiment where misalignment between two bearings is possible. With reference to FIG. 23, helical shaft coupler 188 mates tilt shaft pieces 186 and 187. The ends of the tilt shaft pieces can have keyways to align with keys in the coupler to maintain rotational alignment between the shaft pieces. Clamps at each end of the coupler can tighten around the ends of each shaft to transfer torque. Between the coupler clamps can be a spring-like bellows that can flex to absorb the static loads of a few degrees of misalignment in the shafts 186 and 187, while this bellows can also damp vibration travel along the tilt shaft. The coupler and its integral flexure are comparably delicate to the rigid shafts, and the flexure may be the weakest link in a given shaft assembly, especially from fatigue flexing of the bellows or axial impact loads, thus it's likely the first component to fail. Ideally coupler 188 can be sized to fail at a load threshold slightly below that which would damage attached bearings, acting much as a crumple zone, sacrificial link, or mechanical fuse to isolate the bearings and shafts from damage. Such coupler can be 7075-T6 aluminum, hardened steel, beryllium, or other high strength material to tune fatigue life and design the failure point to protect the shafts. While a coupler is a small bolt-on part, generally inexpensive, bearings and custom shafts are comparably expensive and require more time and cost to disassemble the positioning device and repair. Thus a shaft coupler increases system performance, with reduced or equivalent component costs, with additional cost savings over the life of the product via cheaper repairs.

If the application of the device cannot accept the low axial load capacity of the flexible coupling, radial bearing 144 can be replaced with a bearing that absorbs axial load such as the ungeared turntable bearing of FIG. 40; such dual turntable shaft would not share loads but can safely include an intermediary helical coupler to compensate for misalignment. The dual four-point bearings would increase the drive friction, and if the friction and added starting torque is unacceptable, a rigid inline coupler must be used, which will have limited misalignment correction.

An uncommon modification to the shaft coupler is a flange for angular position sensing. This flange can include markings, magnets, or other features that can be read by a read head mounted to the housing. This feature improves the true position of the features compared to a separate flange or encoder wheel which is fastened to the shaft, such as tilt shaft position disc 147 in FIG. 22, and this integration can decrease cost, complexity, installation labor, and increase reliability.

The positioning device rotates payloads via motors which rotate shafts via mechanical drives. The most common drive employed by pan-tilts has been the worm gear drive, and geared turntable bearings and slew rings are nearly exclusively geared for spur gears. While embodiments of the invention can adopt gear boxes upon the motor rotors, spur gears attached to the motor rotors, or a worm gear driving a turntable bearing, geared drives are subject to backlash and tooth damage under the vibration and shocks of mobile deployed equipment. In such an environment, it is preferable to adopt a belt drive.

While position precision, accuracy, and repeatability have been the primary optimizations sought in recent geared and belted drives, mobile deployment of positioners have illuminated the fact that accelerations and other perturbations such as a vehicle driving over potholes will demand more torque to stabilize the shaft position than a stable platform. Thus a mobile positioner must derate its load capacity for moving, dynamic operation upon boats, vehicles, aircraft, or other mobile platforms to account for the external accelerations. Prior art recognize the effect of accelerations by derating their products' advertised torque capacity for on-the-go operation. The current invention promises to pioneer belt-driven positioning into territory entrenched with complacent, heavy, gear-driven designs by offering greater torque to weight ratios and torque to volume ratios; belts that resist walking; tooth profiles that offer unprecedented torque in a position registration application; belt retention features; a low friction power train; environmental sealing that prevents moisture and debris from corroding bearings and settling on pulley surfaces; and motors which have fast response for stabilizing the shafts against external, dynamic accelerations.

Prior art belt drives were regarded as prone to losing position from ratcheting, requiring field servicing from the belt walking off track, and poorly suited for drives requiring both position registration and high torque. Recent advances in belt technology have doubled torque capacity for a belt having the same width and pitch; for example, standard curvilinear teeth profiles can have far more torque capacity than trapezoidal shaped teeth common in prior art belt driven positioning devices, but may not be suitable or optimal for precision positioning. Thus, trapezoidal teeth profiles may be better than standard curvilinear teeth for the inventive positioning device; however, in other embodiments, modified curvilinear teeth profiles have the performance benefits of both trapezoidal and standard curvilinear. Modified curvilinear teeth can provide double the torque capacity of trapezoidal profiles, and can be characterized as sacrificing a little position precision for a lot of torque capacity. Modified curvilinear also provides greatly improved position registration traits compared to standard curvilinear teeth. These belt characteristics have nearly eliminated position error and backlash from belt elongation as disclosed by U.S. Pat. No. 7,824,284, "Power Transmission Belt And Cord Adhesive System And Adhesion Method" and US patent Publication No. 2011/0005675 A1 entitled, "Power Transmission Belt And Cord Adhesive System And Adhesion Method" which are both hereby incorporated by reference.

Using fiberglass or carbon as tension fibers within the belts reduces the belt stretching and allows the belt tension to hold consistent circumference over time and operation. A properly tensioned belt maintains torque capacity, prevents ratcheting, prevents belt dust contamination, and the lack of torsional wind-up makes very precise motor inputs result in very precise pan or tilt shaft movements. The belt construction methods with fiber cords have also alleviated the propensity of belts to walk off track by introducing twists into the cords. Most synchronous belts are made with both "S" clockwise and "Z" counter-clockwise twist cord to minimize belt tracking forces on the pulley flanges.

The belts are flat and can include molded teeth on the belt and mating grooves of the outer diameter of the bearings and pan motor gear and tilt motor gear. The positive engagement of the teeth with the bearings and the motor gears produces a smooth rolling manner with low friction. This positive engagement results in exact shaft synchronization, elimination of slippage and speed loss, and synchronous operation at speeds higher than most chain drives. The synchronous belt drive is not a friction device. It is a positive engagement drive dependent upon the meshing of the belt teeth with the pulley grooves. Synchronous belts are up to 98% efficient in transmitting power and maintain that efficiency. The no-slip characteristic provides exact synchronization between a power source and a driven unit. Synchronous belt drives are extremely useful in applications where indexing, positioning, or a constant speed ratio is required. Belts have many advantages over gears or chain drives, including quieter operation, lower cost, higher efficiency lower mass than a gear or chain system. Also, timing belts do not require lubrication, which is essential with a timing chain or gears. The belts in the positioning device can have trapezoid shaped teeth or modified curvilinear profile teeth that engage corresponding trapezoid or curvilinear teeth on the outer diameter of the bearings or motor gears.

With reference to FIG. 35, a top plan view of an embodiment 401 of the positioning device illustrates tilt belt 116 wrapping around both tilt motor 114 and tilt shaft gear 131. The inner surface of the tilt belt 116 and the outer surface of the tilt shaft gear 131 can have corresponding teeth to prevent slipping between the tilt belt 116 and the tilt shaft gear 131. With reference to FIG. 34, a front cross section view of device 401 has sectioned tilt belt 116 and exposed front view of the tilt motor and tilt pulley not visible in other front sectionals disclosed. The inner surface of the tilt belt 116 and the outer surface of the tilt motor gear 114 can have corresponding teeth to prevent slipping between the tilt belt 116 and the motor gear 114. The pan shaft can have the same component arrangement, with pan motor 102 having a pan motor gear 104 that is coupled to the outer ring 137 of the pan bearing 127 with a pan belt 106. The inner surface of the pan belt 106 and the outer surface of the outer ring 137 can have corresponding teeth to prevent slipping between the pan belt 106 and the outer ring 137.

In a position registration device such as the claimed positioning device, accurate and repeatable tension must be applied to the belt, cable, or chain linkage to operate with the precision required for position registration applications. If a linkage is over tensioned, it may damage tensile reinforcement in the belt, increase wear, and possibly shear a tooth. Over tensioning may also overload other drive components such as bearings, shafts, and motors. Motor rotors rotate on bearings and have limited radial load capacity, excess tension can warp the rotor assembly and lead to eccentric rotation and inconsistent torque. In the case of under-tensioning, there may be reduced belt wrap, fewer teeth engaged, lower torque capacity, and ratcheting of the belt as teeth loosely slip out of their grooves. Ratcheting wears the belt teeth and causes the system to lose track of the motor and shaft rotary position.

To install and tension a belt, cable, or roller chain, prior art has mounted motors to plates which are adjusted to tension the belt, then locked down. Typically the motor mount plate has a slot which aligns with a threaded hole in the positioning device chassis, such slot sized to permit the plate and motor to move radially towards the shaft pulley for a belt wrapping, then move radially away from the pulley to remove slack. The adjust and lock-down method applies a force directly to an adjustable input or output shaft of the system. Similar to the spring-loaded pulley/idler method, a vector force analysis is recommended to ensure proper tensioning. Likewise, if the adjustment is made about a pivot point, be sure to calculate the moment developed. The load can be applied to the shaft in a variety of ways. Two commonly used methods are to attach either a static weight or spring scale to the adjustable shaft. Once the drive has been set, the sonic tension method is a common way to determine belt tension . . . . This method uses the sound waves generated by "plucking" a single span of the belt. A microphone is held just above the belt in the middle of the plucked span to measure frequency. As installed tension changes, the frequency changes. Through applying known installed loads to the belt, a graph is developed correlating frequency to tension. Once the frequency values are determined, belt tension can be adjusted to the proper value. (From a belt manufacturer's Precision Timing Belt Technical Manual)

Prior art has required technicians hand-tighten motors on the adjustable plates, usually resulting in inconsistent tension that creates inconsistent motion and torque capacity between products of the same model. Tooling can be developed to create a more consistent deflection, but removable tooling may not fit inside a tightly packed housing, nor will tooling address loss of tension after the device has left the factory. The motor mount plates are bolted down to hold position, with only the friction of the bolt head preventing the tensioned belt/chain from pulling the motor out of position. In the high shock and vibration environments of the positioning device's use, these bolts may loosen, or simply fail to prevent sliding. In newer belts with inelastic tension strands such as fiberglass, the elongation at full tension may be only 0.1-0.2% of the belt length in a small robot, so even a tiny slip can drastically reduce the grip of the belt and torque capacity of the drive.

One option to position the belt and maintain the position in the field is a cam pusher, but this inflexible displacement mechanism is intolerant of manufacturing inconsistencies, installation errors, and may apply a moment load into the motor plate upon engagement. Another method to tension a belt is an adjustable idler pulley paired with a fixed motor. The idler pulley can be manually positioned to adjustably deflect the belt a known-good-distance, then be locked into place. An outside idler pulley can also increase belt wrap at the motor drive pulley, increasing torque capacity, but this pulley adds volume, weight, complexity, and cost to the drive design. This idler solution can suffer the same inaccuracy and inconsistencies of hand-tightening an adjustable motor plate, and the idler mount may also suffer a failure from relying on bolt head friction to hold its position. While vibration may loosen bolt threads, shocks are more likely to exceed bolt head friction. A torsion member such as a spring can be used to apply a constant force of variable magnitude to vary the deflection of the idler. When the device experiences a shock, the spring can absorb and dampen belt shocks that could loosen the bolt heads; however, this variable tension can cause variable torque and positioning speed during shocks. A precision positioning device requires consistent torque during high shock events to maintain operation through all conditions.

With reference to FIG. 48, a front sectional view of a belt drive employs an adjust and lock-down motor assembly enhanced with a gear track assembly to incrementally tension a belt and retain tension under shock and vibration. A pan motor 102 is rigidly attached to a sliding motor mount plate 282. The plate can adjustably slide across a plate, shelf, or rail stand-offs 669 rigidly attached to the floor of housing 111. The housing rails 669 and motor plate 282 thickness are sized to align a motor gear 104 parallel and aligned to a shaft gear 127, with a belt 106 transferring power between the gears. The housing rails 669 can include at least two mounting points, such as threaded inserts, to lock down the motor plate 282. The motor plate can have slots overlapping with the threaded mount points to permit fasteners to be partially threaded into the rails 669, with the motor plate then adjusting within the constraints of the slots. The screws on the motor mount plate 282 with slots constrain yaw, pitch, roll, and Y and Z translation. There is only one degree of freedom that is left which is X, which an assembly technician moves the plate along to tighten the belts. With reference to FIG. 49, as the motor adjustment plate 282 moves radially away from the rotary shaft, a linear gear track 685 rigidly attached to the motor mount plate 282 can engage with a pawl 680 rigidly attached to the housing 111, or vice versa. A shoulder screw 684 fastened into the housing can contain a torsional spring 682 and the pawl 680, the pawl and spring rotating about the shoulder screw. In an embodiment, the shoulder screw 684 can be an 18-8 stainless steel precision slotted shoulder screw with ⅛" shoulder diameter and ⅜" shoulder length, with a 4-40 thread. The torsion spring 682 pushes the pawl 680, applying a constant force to keep the tip of the pawl in contact with the gear track 685. As the gear track moves past the pawl, the pawl catches and engages teeth in the gear track to prevent motion in the opposite direction. The gear teeth can be angled to allow the pawl 680 to glide over them in one direction and lock in the other direction. With each click of the pawl, the motor mount 282 discretely increments tension into the belt 106. Because the belts described have very little elastic deformation, the gear and pawl engagement may be a narrow range of motion, and the teeth of gear track 685 and the tip of pawl 680 can be very fine to make very small increments in the tension of belt 106. Technicians can achieve very repeatable tensions in the belt 106 by incrementing discretely. To prevent damage to fine teeth of linear gear 685 and the pawl 680, these features can be materials such as titanium, tool steel, or other very hard, wear resistant material. A measurement tool such as a sonic tension meter can be used to verify proper tension without a human hand holding down the motor plate 282; one can measure a few times and adjust accordingly before the fasteners are fully tightened to lock the motor 102 into position. The gear track assembly and bolt heads can then work together to maintain tension throughout high vibration and shock. To disengage the gear 685 and pawl 680, there can be a projecting feature, a pawl lock pin 681, that sticks up and can be pulled to move the pawl 680 away from the gear track, or the pawl can have a hole in it for a tool to insert and pull away the pawl from the gear 685. This feature 681 will allow release of the pawl 680 to slacken the belt 106.

With reference to FIG. 59, in another embodiment of an adjustable motor mount, a screw 671 can be turned to drive a wedge 670 between the housing and the tilt motor mount plate 115, with a similar screw-wedge arrangement for the pan motor assembly. U.S. Pat. No. 4,921,378 A, "Rotary-pallet system", published May 1, 1990, describes an arrangement of wedges that are adjusted to precisely and firmly clamp fixtures and metal stock to be precisely CNC machined. With reference to FIGS. 51-53 is a wedge vise. As the screw 671 is tightened, the wedge 670 is driven between jaws 673, displacing them. With reference to FIG. 52, a wedge 670 is angled on a left and right side to equally displace a pair of jaws 673. This is effective in a CNC jig where a threaded hole for screw 671 can be precisely located at the midpoint between two parts, but tensioning a belt is not as predictable. Should one jaw 673 make contact with an immovable surface before the other jaw, continued screwing of bolt 671 can impart a moment load into the threads as the first jaw presses into the immovable surface. With reference to FIG. 56, a left side of the wedge 670 can be angled so only the left jaw 673 will be displaced leftward, while the second jaw cannot be angled. Because the right side of the wedge is vertical, there is no wedge action applying a sideways force. When the left jaw 673 makes contact with a surface, it will induce a sideways load towards the right, but the right jaw 673 serves as a backstop to equalize force on the threads of bolt 671. The right jaw can be a rigid mount point for the vise. To anchor the jaws into a semi-permanent place, the jaws can have holes for fasteners. With reference to FIGS. 54-67, a jaw 673 can include a pair of fasteners to anchor it. Lower profile jaw anchors can be alignment pins, a dovetail, tongue-in-groove, or other keying. As with all fasteners employed in the positioning device, the screw 671 can have thread-locking compound applied to prevent loosening in the field, preferably a non-permanent formula to permit error correction and maintenance.

With reference to FIG. 58, the angled jaws 673 have been integrated into the pan bearing flange 129 and motor mount plates 115 and 282. With reference to FIG. 60, a partial side view sectional of the positioning device 101 illustrates a tilting assembly where turning of bolt 671 can lower wedge 670. A mating slope jaw 673 on tilt motor mount 115 slides the motor radially away from the tilt axis as the wedge forces itself downward. An abutment jaw 673 on pan bearing flange 129 can serves as a backstop to prevent the opposing force of the tilt motor mount from side-loading the bolt 671 and misaligning the threads. As the bolt is tightened, the tilt motor mount 115 and attached tilt motor 112 move away from the tilt axis, incrementally taking out the slack in tilt belt 116. A non-permanent thread-locking compound can be applied to the motor mount screws and wedge bolt 671 before tensioning to prevent shock and vibration from releasing the fixed position. With reference to FIG. 59, wedge 670 can contact the housing 111 via an abutment on pan bearing flange 129 while a jaw 673 is opposed by the tension of the pan belt 106 constraining the motor 102 and attached mount plate 282. As the screw 671 is tightened, the wedge 670 is driven between jaw 673 and the abutment of pan bearing flange 129. As the jaw spreads, the motor mount plate 282 is radial displaced. The ends of vise jaws 673 can have rough, serrated surfaces to grip the housing and motor mount plate 282. With one or more of the described motor adjustment features, a positioning device with a tensioned power train can be precisely tensioned and hold that tension throughout rough service in the field.

The field of robotics and electronics operating in outdoor and industrial environments have high failure rates due to ingress of dust and moisture. With reference to FIG. 30, in order to protect the internal components within the housing 111, dynamic seals 152, static seals 156, and air valve 150 can be used to isolate the internal components from the external environment. The seals and internal pressurization can provide an air and liquid fluid barrier which prevents gas, liquids and solid contaminants, such as dust, from entering or remaining within the housing 111.

Solid contaminants ("dust") within the housing 111 can damage electronics, obstruct optical devices, and gum-up the smooth motion of the positioning drive mechanisms. Dust can increase friction and increase running and break-free torque for the rotating mechanisms, and can eventually lead to drive mechanism failure. These dust particles can work their way into lubricants within moving components such as motors and bearings, drying them out and creating a viscous, abrasive grit. This can reduce the grease's heat transfer ability, permitting hot spots and thermal expansion in precision moving parts. The particles create mini speed bumps between bearing elements where smooth, gliding motion is required, leading to wear of the precision polished surfaces of the bearing elements. These undesirable effects would be observed in the positioning device 301 as increased vibration, slip-stick chatter, and torque drag.

While an objective of the invention is to sufficiently protect all enclosed components from environmental threats, bearings 391 and 144 can include face seals as a second line of defense from exposure to fluids, gas and dust. With reference to FIG. 42, the balls 135 and raceways of bearing 391 can be covered and protected by face seals 160. The face seals 160 can be installed over the raceways as the primary seal against contaminants. The inner diameter and the outer diameter of the face seals 160 can fit and slide within grooves 397 formed in the inner ring 133 and the outer ring 137 and the face seals 160 can also be recessed relative to the planar surfaces of the inner ring 133 and the outer ring 137. These face seals 160 can provide additional protection for the bearings 135 from exposure to fluids, gas and dust. While a sealed enclosure may provide adequate protection, the face seals 160 can also protect the bearing during shipping and assembly. Face seals 160 can be made of various materials including: Buna-N nitrile, a black rubber or polytetrafluoroethylene ("PTFE"). Because of its lubricious properties, PTFE can permit the bearings to survive a wide range of chemicals and extreme environments without inducing excessive drag and slip-stick chatter associated with high stiction drives of prior art.

Dust on the teeth of meshing spur or worm gears attack with similar results of wear, vibration, and frictional torque loss; additionally the increased wear on teeth accelerates development of backlash in the drive. In a belt drive, dust on teeth of belts and pulleys can reduce the mechanical grip, reducing the torque output achievable before belt ratcheting/slip occurs. Dust can also blanket or insulate the internal electronic components which can lead to overheating and failure. The positioning device can also include optical encoders and limit switches which may not operate properly if covered with dust. Any optical payloads integrated into the housing will also be susceptible to dust depositing on optical surfaces, reducing image quality or laser transmission efficiency.

With reference to FIG. 23, fluids and condensing gasses ("moisture") that ingress into the housing 111 via actions such as full immersion in water, exposure to rain, humid air, or out gassing of etchants trapped within the enclosed circuit boards can short-circuit electronics, condense onto optical surfaces, corrode metals, breed fungus, and damage the rotating mechanisms. Moisture is of particular concern in a device utilizing a variety of materials in contact with each other to optimize weight and strength—such as carbon fiber and titanium or aluminum and steel, pairs which have a high galvanic potential between themselves—as the presence of moisture is a catalyst for galvanic corrosion. Corrosion in fasteners can seize joints such that they hamper servicing of the equipment, with snapped-off bolts resulting in permanent damage and extensive repair efforts. The positioning device can embed threaded fasteners such as Keenserts and Helicoils to reduce the impact of corrosion at fastener joints, but other components would still be susceptible. Bearing components have highly polished precision surface areas that are detrimentally affected by corrosion caused by moisture. Corrosion can seize up motion, pit the smooth surfaces resulting in more vibration of the rotating components and material loss due to corrosion can reduce the load capacity of the bearings. Moisture on the teeth of the belts can reduce the mechanical grip with mating gears. Water can also short-circuit or corrode the internal electronics and condensation interferes with optical encoders, limit switches, and fogs optical lenses of payloads integral with the housing 111.

Round static seals have been used in prior art to seal gaps between shafts and the housing but these elastomer rings do not seal against both surfaces; the elastomer wears rapidly, the rings coil and extrude from their groove, and the seals often fail to contain even light fluid and gas pressures. The positioning device 101 includes one or more shafts which move in intermittent, dynamic rotations, and utilize dynamic rotary shaft seals 152 to achieve adequate protection from the environment.

The dynamic seals 152 can be installed between moving parts to limit ingress of dust and moisture; for example, a dynamic seal 152 can be installed between the housing 111 and the pan shaft 125, and dynamic seals 152 can also be installed around the tilt shaft 105 and the housing 111. The top of the pan shaft 125 fits within a recessed area of the housing 111 and the seal 152 is around the pan shaft 125 close to the bottom of the housing 111. The seals 152 are also around the tilt shaft 105 just inside both the first side 121 and the second side 123 of the housing 111.

In FIGS. 5, 6, 11, 23, 34, the pan shaft 125 can be substantially the same and the seal 152 is also identical or substantially the same. In FIG. 5, the seal 152 is in a recessed area in the bottom of the housing 111, and a larger diameter step in the shaft 125 can narrow the entrance to the seal gland to shield the seal 152 from direct debris strikes and blast impulses. In FIGS. 12-14, a small diameter pan shaft 225 is used and the seal 152 can be the same as those used on the larger diameter pan shaft 125 except for being constricted in diameter to maintain contact with the shaft 225. In FIG. 13, pan shaft 225 does not have a step or flange to shield the sealing gland entrance but an annular flange 155 can be attached to the entrance of the gland to provide a shield. Similarly, with reference to FIG. 22, the seal 152 on the second side 123 of the housing is identical to the seal 152 in FIG. 23, except it has been radially expanded to seal the larger diameter of the tilt shaft 105 of FIG. 23. Cost savings and inventory efficiencies can be realized by sizing tilt shaft 105 diameters in contact with the seals 152 to be identical, resulting in identical seals 152, thus a single part number for seal 152.

Dust and moisture from the external environment can often attempt to ingress housing 111 under high force such as hurricane winds, pressure washer jets, sand storms, or explosions. With reference to FIG. 47, a dynamic rotary shaft seal is illustrated in a sealing gland. The dynamic seal 152 has a "C" shape with the open portion of the seal facing the ambient volume and the closed portion facing the interior of the housings. In this configuration, if the ambient pressure is higher than the internal pressure, such as with hurricane-force winds or battlefield explosions, the ambient pressure will tend to expand the diameter of the seals 152. In contrast, if the internal pressure is higher than the ambient pressure, the seal 152 can be compressed and the internal gases can escape before the static seals extrude or the housing explodes. Where the positioning device 101 is exposed to low pressures such as troughs of blast waves or when mounted to an aerial vehicle at high altitudes, dynamic seals 152 can be duplex seals with a ")(" orientation. Duplex seals include an internal facing "C" seal to keep pressure inside the housing. In an embodiment, the internal volume of the seals 152 can be filled with a spring or other mechanical device 252 that exerts an inner diameter inward force on the shaft to improve the sealing of the seals 152; however, the added force on the seals 152 can also produce rotational friction and vibration of slip-stick chatter. The rotational friction should not be high enough to cause positioning errors in the pan shaft 125 or the tilt shaft 105. The seals 152 can be PTFE lip seals, o-rings, gaskets, seals or other mechanisms which prevent gas and particles from entering or exiting the housing.

With reference to FIG. 30, the housing 311 can also include static seals which can be o-rings, gaskets, seals or other mechanisms which prevent gas and particles from entering or exiting the housing 111. Static seals 156 can be installed between faying edges of mating parts to prevent passage of environmental hazards. Common static seals can fail through gas permeability of the elastomer, chemical exposure, weathering, abrasion, torsional coiling inside the groove, and loss of compression due to loose fasteners or bowing of insufficiently stiff gland walls. Design errors can also lead to seal failure, such as faying edges that are insufficiently thick and stiff, insufficiently flat, or have a surface finish that permits gas molecules to leak past microfissures that pass across the seal contact zone with the groove. As static seals are points of failure in a sealed volume, an inventive feature of the positioning device is a simplified, monocoque housing with reduced seam length to reduce points of static seal failure. In the illustrated embodiment, device enclosure 301 may only have a top cover 313 and a main housing piece 311. Thus, the only static seal required for the housing shell 311 is for the top cover 313. The positioning device 301 can use at least six static o-ring seals including a first seal between the housing 311 and cover 113 at the top, a second seal for the flange of an air pressurization valve 150 in the pan shaft, a third seal for the cap over the valve step of the pressurization valve, a fourth seal for the electrical connector 141 on the pan shaft, and backup o-ring seals on shaft mount brackets 128 and 145 of the tilt shaft 105. The backup o-rings in the shaft mounts can prevent leakage from gasses that hit the lip seal and expand outward, trying to pass between the housing's interior wall and the shaft mount brackets bolted into the wall. Cast or molded construction which can more easily integrate or embed the tilt shaft mount brackets 128 and 145 into the walls than milled fabrication, such cast or molded housings can also adopt exterior dynamic seal glands like the pan shaft 225 sealing gland to eliminate the need for internal backup o-rings on the mounts. By machining the air valve directly into the pan shaft, the air valve flange seal is eliminated, thereby reducing static ingress paths to only three o-rings and thus improving sealing performance further. With reference to FIG. 29, device 201 would not need the backup o-rings in the brackets as the dynamic seals are exterior to the housing. In other embodiments, the static seals can be gaskets, elastomer rings or any other suitable sealing mechanisms. This design simplifies the construction and sealing of the positioning device and creates a housing 211 that is more robust against environmental threats than other designs that require more connected housing components.

To counteract external forces of pressurized contaminants and air attempting to blast their way into the protected interior, the housing 211 can be pressurized with a conditioned gas through air valve 150. The positive pressure of the internal gas can provide an opposing force to counter exterior pressures which threaten to extrude dynamic seals 152 and static seals 156, which can result in failure of the sealing system. The shaft seals 152 and static seals 156 can hold the conditioned gas inside as well as keep the ambient gas and particles outside the housing 211, with duplex dynamic seals preferable to contain the internal pressurization when the positioning device 201 is deployed in low pressure environments. In the instance of a defective, leaky dynamic or static seal, the positive internal pressure will leak out the conditioned internal gas before contaminant laden external air can leak in. The housings can be pressurized to about 16-20 psi absolute in land-based deployments, and in preferred embodiments, the internal gas does not leak out. In other embodiments, a higher pressure within the housing 211 may not lead to gas egress, if the seals are duplex and/or spring loaded to physically compress the seal against the shaft—which can have the drawback of added torque drag. The seals 152 can be covered with a lubricant so that the tilt shafts 105 and the pan shafts 125 rotate smoothly against the seals 152 without damaging the seals 152. The dynamic seals 152 can also be made of a lubricious material such as a wear-optimized PTFE based polymer blend which can rub off to self-lubricate the moving contact areas.

Dust and moisture can also be introduced into the housing 211 during manufacturing assembly and routine maintenance. In addition to the air mass sealed inside the enclosure when cover 113 is fastened down to seal the fully assembled unit, the internal devices and components contain latent moisture within their materials. Moisture can be trapped between layers of circuit boards including the motor electronics, any onboard payloads, the internal DC/DC converter 118, enclosed controller 574, or other electronic systems. The latent moisture from circuit boards, plastics, wires, and other components can even exceed the humidity stored in the air mass sealed within the enclosure 111, so simply filling the unit with dry air may not remove sufficient moisture to last an acceptable product lifetime. While a clean room assembly environment can prevent some contamination at the factory floor, it is an expensive measure and cannot be practically duplicated for field servicing. Preferably, the housing 211 can be purged before pressurizing the sealed unit with gas, and the purging and pressurizing gas can be a dry, inert gas such as nitrogen. The purging and filling can occur through air valve 150 located on pan shaft 125, or the air valve can be located on housing 211 or cover 113 with the drawback of the valve's mass burdening the pan motor with additional rotational mass that is otherwise not seen when the valve is on the fixed pan shaft base. A purging process such as the Brownell Method of nitrogen enriched purging can be used to extract moisture from the enclosed air and any latent moisture within materials of components such as circuit board etchants trapped between board layers. The remaining conditioned gas sealed within the enclosure 211 can have many benefits: far fewer particulate contaminants such as dust; a reduction in potential for corrosion; a lower dew point to prevent condensation and optical fogging; and reduced static electricity. The gas may be pressurized to improve the sealing performance of the static seals 156 and dynamic seals 152.

In addition to dust and moisture, electromagnetic hazards in the external environment can ingress the housing 211 to disrupt or destroy enclosed electronics, melt or vaporize mechanical components, or electrocute service technicians. Hazards can include: power faults, lightning, electrostatic discharge, electromagnetic pulse, naval shipboard degaussing charges, and radiated energy such as radar and directed energy weapons. Electronics enclosed within the housing can also be hazardous emitters of EMI/RFI that can escape through seams and penetrations to interfere with external equipment such as communications transceivers. This internal energy can energize the housing shell pieces such that they radiate as a dipole antenna if not electrically bonded. A strategy employed to mitigate both ingress and egress of electromagnetic energy can be generalized as minimization of seams and penetrations with electrical bonding between housing pieces, yet these design guidelines are at odds with some common practices in design optimization for manufacturing which dictate small machines be broken into many parts to enable easy access for human hands and tools to assemble and service the device rapidly. The inventive device addresses this challenge via embracing the simplified housing 211 and cover 113—yielding a two-piece shell where prior art is more commonly three or more assembled pieces with many seams, penetrations, and radiating antenna—without compromising access for assembly and maintenance due to the component integration and lack of press fits in turntable bearings 131 and 127. With a minimized total seam length, the shields in the different shell pieces can be more easily electrically coupled together. The shielding can be an electrically conductive material or mesh of electrically conductive material. Electrical bonding between seals at faying surfaces of components can use conductive static seals such as elastomer o-rings doped with metallic particles or carbon nanotubes. By surrounding the internal components with a housing of conductive material or mesh, a "Faraday Cage" can be formed which can protect the internal electrical and electronic components from static and non-static electric fields. This shielding can protect the internal components in the event that the positioning device is exposed to lightning, radio waves and electromagnetic radiation, while also protecting exterior devices from EMI generated by the positioning device 201. While this high degree of shielding is uncommon in prior art, it is becoming a mandatory requirement in newly fielded defense and homeland security equipment via standards such as MIL-STD-461G.

Because dust, moisture, and electromagnetic energy can be so hazardous to the positioning device, an enclosure with a minimum of entry points has been devised, and the necessary seams and openings have been plugged with dynamic seals 152 and static seals 156. In FIG. 23, housing 111 can be a contiguous shell will only a cover 113 and one or two holes for tilt shaft 105. The positioning device can have a housing 111 having a minimal total length of seams. In a simple form, the housing 111 may have a bottom and four sides 121, 122, 123, 124 that are all fabricated out of a single piece of material. The pan shaft 125 can extend through a hole the bottom of the housing 111 and the tilt shaft can extend through a hole or holes in the sides of the housing 111. All internal components can be installed through the top opening and shaft bores. This monocoque construction minimizes the number and total length of static seals required by the housing 111, which reduces points where environmental hazards and radiated electromagnetic noise may leak. Pressurization and purging will be more effective with an enclosure with fewer leak points, and the pressurized unit can be expected to operate for a longer duration before the positive internal pressure inevitably leaks out. By minimizing the number of components, the housing 111 of the positioning system 101 can be stronger and have fewer seams and seals through which environmental threats can enter or exit the housing 111. This design simplifies the construction and sealing of the positioning device and creates a housing 111 that is more robust than other designs that require more connected housing components.

Another benefit of the integrated, simplified housing of the inventive positioning device is the housing 111 can have enhanced resistance to mechanical vibration, shocks, and impacts. In an embodiment, the first side 121, second side 123, third side 122 and fourth side 124 are all fabricated from the same piece of material or are otherwise a single, contiguous structure. The positioning device can have a monocoque construction where the housing 111 provides the external surfaces as well as the load bearing structure. Enclosures constructed of various pieces fastened together may not efficiently channel vibration between mating pieces and can set up unpredictable resonances caused by indirect load paths and internal shockwave reflections at faying surfaces. Mating joints are also subject to fatigue failure around fasteners and loosing of the fasteners. Mechanical shocks and impacts must be channeled from any contact point, including payloads, into kinetic sinks to dissipate the shock, and the kinetic path must be minimized and channeled through components designed to handle foreseeable shock loads. Enclosures fabricated from multiple pieces can deform or crack their joints under high shock loads, and the device tends to absorb much of the energy rather than dissipate it into a kinetic sink or channel it into the base structure to which it may be mounted. Because the monocoque housing has a single outer shell piece to which the shaft turntable bearings are mounted, shock loads have short kinetic paths to dissipate into the strong housing shell or channel into the mounting base. A housing constructed of composites, plastic, or beryllium alloys may be superior in dampening shock and vibration without the permanent deformation that can occur in malleable materials such as aluminum. This monocoque housing 111 design may create a great challenge for assembly, and may not be possible to assemble without the adoption of the mounting-holed turntable bearings, obstruction-free drop-down installation afforded by vertical or outward drafted interior walls, removable tilt shaft mounts, and a well orchestrated assembly procedure. With reference to FIG. 10, integrating pan bearing flange 129 into the floor of housing 111 can produce an even greater level of integration and structural rigidity as long as a carefully planned assembly procedure is choreographed. The positioning device 101 can be especially shock and vibration resistant when the integral housing 111 is paired with the shock and vibration resistant motor mounts previously disclosed.

Yet another valuable benefit of the simplified housing is an easier, feasible transition from fabrication of milled metal construction to cast or molded construction. It is common in the field of the invention to initially mill/machine the fabricated parts from aluminum stock, then adopt metal casting, plastic molding, or composite fiber molding of the body shell pieces to dramatically reduce per-unit prices. The milled pieces have high per-piece costs, but ongoing R&D can make changes often without any loss other than the part itself. The drawbacks to casting and molding are: the molds, dies and tooling are very expensive front-loaded investments; the investment can be lost if the design changes in a way that the tooling cannot accommodate; a cast metallic part is structurally weaker than cold-rolled billet and heat treated billet; and a cast or molded part will still need secondary machining or processing for precision surface finishes, features, and thread tapping. Additional challenges to transitioning from milled to molded construction include alterations to the part designs: features of the design must be changed to include outward draft angles in walls to prevent a mold die from sticking; small corner radiuses must be expanded; undercuts may not be possible; and wall thickness must be regulated prevent improper lamination in composites or cure warping in plastic construction. The transition to a casting or molded construction is more daunting for a product made of several body pieces because multiple molds and tooling sets must be created at once and tolerance stack-up can lead to parts which do not mate well. To be competitive in volume manufacturing, the cost savings of cast and molded parts are a necessary step which can be very difficult and costly for prior art composed of multiple body pieces. If the quantity of parts to be cast or molded could be reduced by integration, there would be fewer molds and associated secondary machining and processing, as well as increased reliability from fewer parts reducing tolerance stack-ups.

With a transition to casting or molding contemplated in the conceptualization stage, rather than the alpha or beta prototype release stage, the benefits of a two-piece housing body are maximized. Because there are only two pieces to the housing, there are fewer molds and tooling than a comparable multi-piece design. This requires less capital allocation in the early stages, before sales are supporting the development, thus the transition away from machining large billets can be initiated sooner in the product life cycle. Because there are only two pieces, there is less risk from warpage and tolerance stack-ups preventing precision alignment of bolt holes and mating flanges. The positioner housing 111 has only one mating flange to post machine, and fewer threads to tap for fastening the body shells together. The use of mounting-holed turntable rings and, in some embodiments, removable shaft mounts negate secondary machining of precision bores and shoulders into a cast metal piece's walls. Because the tilt shaft 105 has a more direct kinetic path for load transfer between itself and the pan shaft base 125, the body shell piece 111 is a superior structural member, not simply a housing, and continues to provide ample load bearing capacity with walls no longer strengthened by heat treating and cold rolling of milled metal stock. Because mold dies can require draft angles and minimized undercuts to remove the die from the molded part, housing 111 can accommodate both milled and molded construction without significant modification to the design. With reference to FIG. 30, housing 311 can have outward drafted or vertical interior walls and can have outward exterior wall drafts, and can have removable shaft mounts 128 and 145 to facilitate the molding die and molding process. In FIG. 29, tilt shaft mounts can be integral features of the housing walls, but must not imped the action of a mold die or obstruct the installation of other internal components. Where even higher part integration can occur, as with housing 111 of FIG. 10 which integrates pan bearing flange 129 with the housing floor, it may be more economical and a device performance benefit to avoid or shorten the machining prototype phase and instead develop a cast metal rapid prototype which will be a closer step towards the traditional castings of full production. The adoption of the monocoque housing, enabled by the turntable bearing power train and well crafted assembly procedure, provides undeniably valuable benefits for performance, cost and manufacturing time as it is realized in finished goods for sale.

It will be understood that the inventive system has been described with reference to particular embodiments; however additions, deletions and changes could be made to these embodiments without departing from the scope of the inventive system. Although the order filling apparatus and method have been described include various components, it is well understood that these components and the described configuration can be modified and rearranged in various other configurations.

What is claimed is:

1. A motor drive assembly comprising:
   a motor for rotating a shaft, the motor attached to a motor plate wherein the motor plate is in sliding contact with a surface of a housing of the motor drive assembly;
   a wedge coupled to a wedge bolt and the housing, the wedge having an angled side and a straight side wherein the angled side of the wedge is in sliding contact with a sloped side of the motor plate and the straight is in sliding contact with an abutment;
   a first rail attached to the base wherein the motor plate is in sliding contact with a surface of the first rail; and
   wherein tightening the wedge bolt causes the angled side of the wedge to slide against the sloped side of the motor plate and move the motor plate away from the wedge bolt.

2. The motor drive assembly of claim 1 further comprising:
   lock down bolts that extend through slots in the motor plate, wherein the motor plate slides over the first rail to a desired position and the lock down bolts rigidly secure the motor plate to the first rail at the desired position.

3. The motor drive assembly of claim 1 further comprising:
   a gear coupled to the shaft of the motor; and
   a belt that rotates around the gear;
   wherein wedge, the wedge bolt and the housing control the position of the motor to maintain a proper tension on the belt.

4. The motor drive assembly of claim 3 further comprising:
   a second gear in physical contact with the belt.

5. The motor drive assembly of claim 4 wherein the second gear is coupled to an output shaft.

6. The motor drive assembly of claim 1 further comprising:
   a gear coupled to the shaft of the motor; and
   a chain that rotates around the gear;
   wherein the wedge bolt and wedge hold the motor plate and the motor in a position that maintains a proper tension on the chain.

7. A motor drive assembly comprising:
   a motor rigidly attached to a surface of a housing of the motor drive assembly;
   an idler pulley attached to an idler pulley plate wherein the idler pulley plate is in sliding contact with the surface of the housing of the motor drive assembly;
   a wedge coupled to a wedge bolt and the housing, the wedge having an angled side and a straight side wherein the angled side of the wedge is in sliding contact with a sloped side of the idler pulley plate and the straight is in sliding contact with an abutment; and
   a first rail attached to the housing of the motor drive assembly wherein the idler pulley plate is in sliding contact with a surface of the first rail;
   wherein the wedge bolt is tightened to force the angled side of the wedge to slide against the sloped side of the idler pulley plate to move the idler pulley and idler pulley plate away from the wedge bolt.

8. The motor drive assembly of claim 7 further comprising:
   lock down bolts that extend through slots in the idler pulley plate wherein the lock down bolts are moved within the slots and the idler pulley plate is moved to a position on the first rail;
   wherein the idler pulley plate the rigidly secured to the first rail with the lock down bolts.

9. The motor drive assembly of claim 7 further comprising:
   a gear coupled to the shaft of the motor; and
   a belt that is rotated by the motor around the gear;
   wherein the wedge bolt is adjusted to move the wedge to a position that maintains a proper tension on the belt.

10. The motor drive assembly of claim 9 further comprising:
    a second gear in physical contact with the belt.

11. The motor drive assembly of claim 10 wherein the second gear is coupled to an output shaft.

12. The motor drive assembly of claim 7 further comprising:
    a gear coupled to the shaft of the motor and a chain;
    wherein the motor rotates a chain that rotates around the gear and the wedge bolt is adjusted to move the wedge to control a position the idler pulley to maintain a proper tension on the chain.

* * * * *